(12) United States Patent
Morishita et al.

(10) Patent No.: US 7,315,934 B2
(45) Date of Patent: Jan. 1, 2008

(54) DATA PROCESSOR AND PROGRAM FOR PROCESSING A DATA MATRIX

(75) Inventors: Hiroyuki Morishita, Hirakata (JP); Atsushi Ito, Suita (JP); Satoshi Takashima, Ibaraki (JP); Hideshi Nishida, Nishinomiya (JP); Kozo Kimura, Toyonaka (JP); Tokuzo Kiyohara, Osaka (JP); Akira Miyoshi, Hirakata (JP); Hiroshi Kadota, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 463 days.

(21) Appl. No.: 10/377,328

(22) Filed: Feb. 28, 2003

(65) Prior Publication Data

US 2004/0010321 A1    Jan. 15, 2004

(30) Foreign Application Priority Data

Mar. 6, 2002   (JP)   ............................. 2002-061047
Mar. 13, 2002  (JP)   ............................. 2002-068716

(51) Int. Cl.
    *G06F 15/76*   (2006.01)
(52) U.S. Cl. ........................................ 712/11
(58) Field of Classification Search .................. 712/10, 712/11, 16, 22, 1, 28, 29; 345/592, 593, 345/611; 708/102, 520
See application file for complete search history.

(56) References Cited

U.S. PATENT DOCUMENTS

| | | | | | |
|---|---|---|---|---|---|
| 3,573,854 | A | * | 4/1971 | Watson et al. | 712/237 |
| 4,296,469 | A | * | 10/1981 | Gunter et al. | 710/306 |
| 4,586,037 | A | * | 4/1986 | Rosener et al. | 345/418 |
| 5,086,500 | A | * | 2/1992 | Greub | 713/401 |
| 5,374,903 | A | * | 12/1994 | Blanton | 331/4 |
| 5,664,215 | A | * | 9/1997 | Burgess et al. | 712/23 |
| 6,119,223 | A | * | 9/2000 | Witt | 712/244 |
| 6,182,203 | B1 | * | 1/2001 | Simar et al. | 712/22 |
| 6,785,800 | B1 | * | 8/2004 | Yamaura et al. | 712/22 |
| 2002/0106136 | A1 | | 8/2002 | Oka et al. | |
| 2003/0007565 | A1 | | 1/2003 | Morishita et al. | |

FOREIGN PATENT DOCUMENTS

JP    2001-084229    3/2001

* cited by examiner

*Primary Examiner*—Aimee J. Li

(57) ABSTRACT

A data processor has sixteen processing elements that each include a register file and an arithmetic logic unit. A network unit connects between the register files of the processing elements and the arithmetic logic units of the processing elements. The network unit has a selector for simultaneously performing a plurality of data transfers which are each made from a register file of one processing element to an operation unit of another processing element. With the provision of this selector that can perform such simultaneous data transfers, the processing efficiency of the processing elements can be maintained even if a change occurs in operand assignments and the like.

17 Claims, 74 Drawing Sheets

EQUATION 1: PIXEL VALUE OF X7 = a0X7 + a1(X6+X8) + a2(X5+X9) + a3(X4+X10) + a4(X3+X11) + ···
  stage1    stage2       stage3       stage4        stage5

EQUATION 2: PIXEL VALUE OF X8 = a0X8 + a1(X7+X9) + a2(X6+X10) + a3(X5+X11) + a4(X4+X12) + ···
  stage1    stage2       stage3        stage4        stage5

EQUATION 3: PIXEL VALUE OF X9 = $a_0 X_9 + a_1(X_{10}+X_8) + a_2(X_{11}+X_7) + a_3(X_{12}+X_6) + a_4(X_{13}+X_5) + \cdots$
                                   stage1      stage2          stage3          stage4          stage5

EQUATION 4: PIXEL VALUE OF X10 = $a_0 X_{10} + a_1(X_9+X_{11}) + a_2(X_8+X_{12}) + a_3(X_7+X_{13}) + a_4(X_6+X_{14}) + \cdots$
                                   stage1        stage2            stage3           stage4          stage5

FIG.13

| | PE0 | PE1 | PE2 | PE3 | PE4 | PE5 | PE6 | PE7 | ... | PE13 | PE14 | PE15 |
|---|---|---|---|---|---|---|---|---|---|---|---|---|
| r7 | a4 | a4 | a4 | a4 | a4 | a4 | a4 | a4 | | a4 | a4 | a4 |
| r6 | a3 | a3 | a3 | a3 | a3 | a3 | a3 | a3 | | a3 | a3 | a3 |
| r5 | a2 | a2 | a2 | a2 | a2 | a2 | a2 | a2 | | a2 | a2 | a2 |
| r4 | a1 | a1 | a1 | a1 | a1 | a1 | a1 | a1 | | a1 | a1 | a1 |
| r3 | a0 | a0 | a0 | a0 | a0 | a0 | a0 | a0 | | a0 | a0 | a0 |
| r2 | OPERATION RESULT OF PE0 | OPERATION RESULT OF PE1 | OPERATION RESULT OF PE2 | OPERATION RESULT OF PE3 | OPERATION RESULT OF PE4 | OPERATION RESULT OF PE5 | OPERATION RESULT OF PE6 | OPERATION RESULT OF PE7 | | OPERATION RESULT OF PE13 | OPERATION RESULT OF PE14 | OPERATION RESULT OF PE15 |
| r1 | X16 | X17 | X18 | X19 | X20 | X21 | X22 | X23 | | X29 | X30 | X31 |
| r0 | X0 | X1 | X2 | X3 | X4 | X5 | X6 | X7 | | X13 | X14 | X15 |

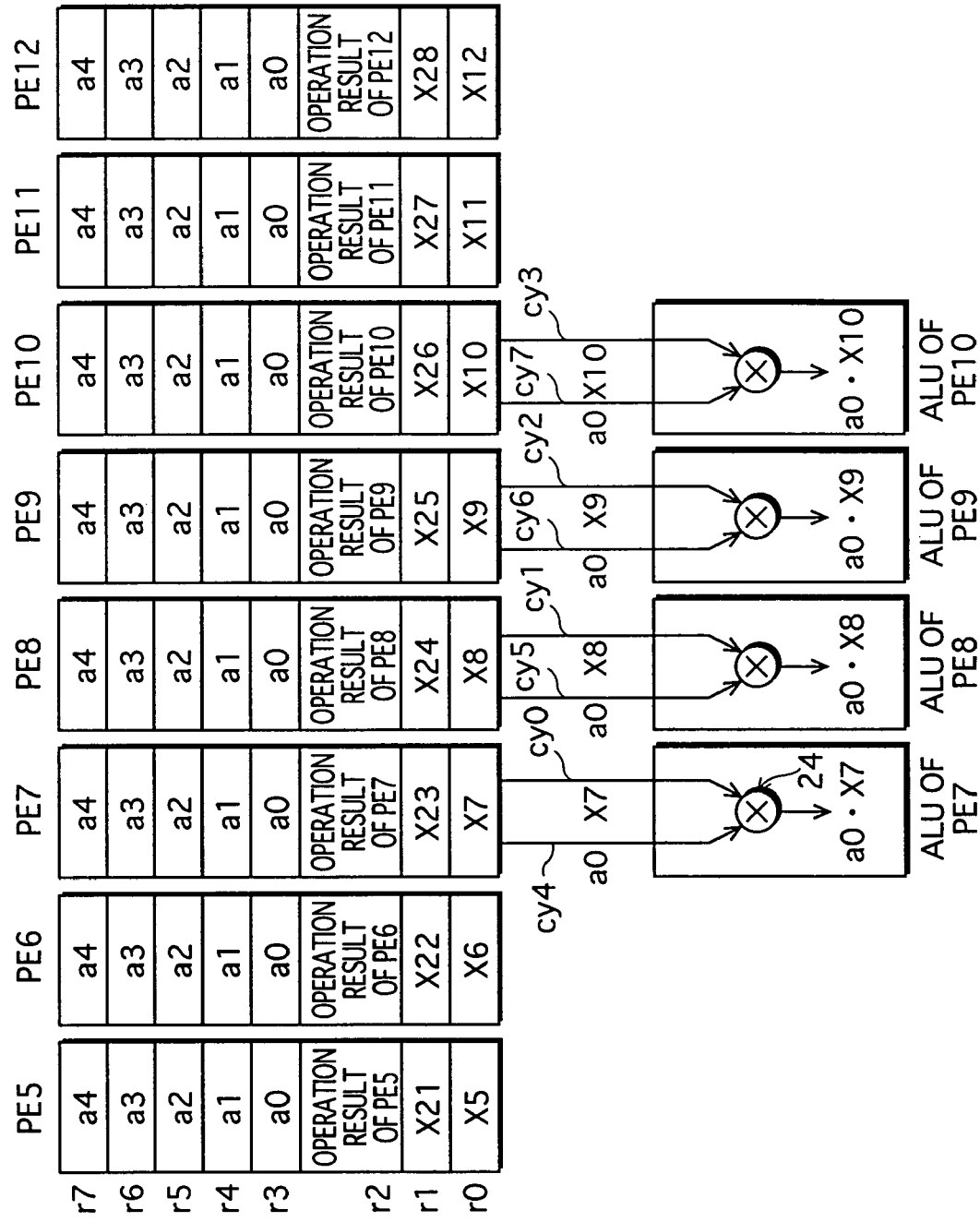

ALU OF PE7

ALU OF PE8

ALU OF PE9

ALU OF PE10

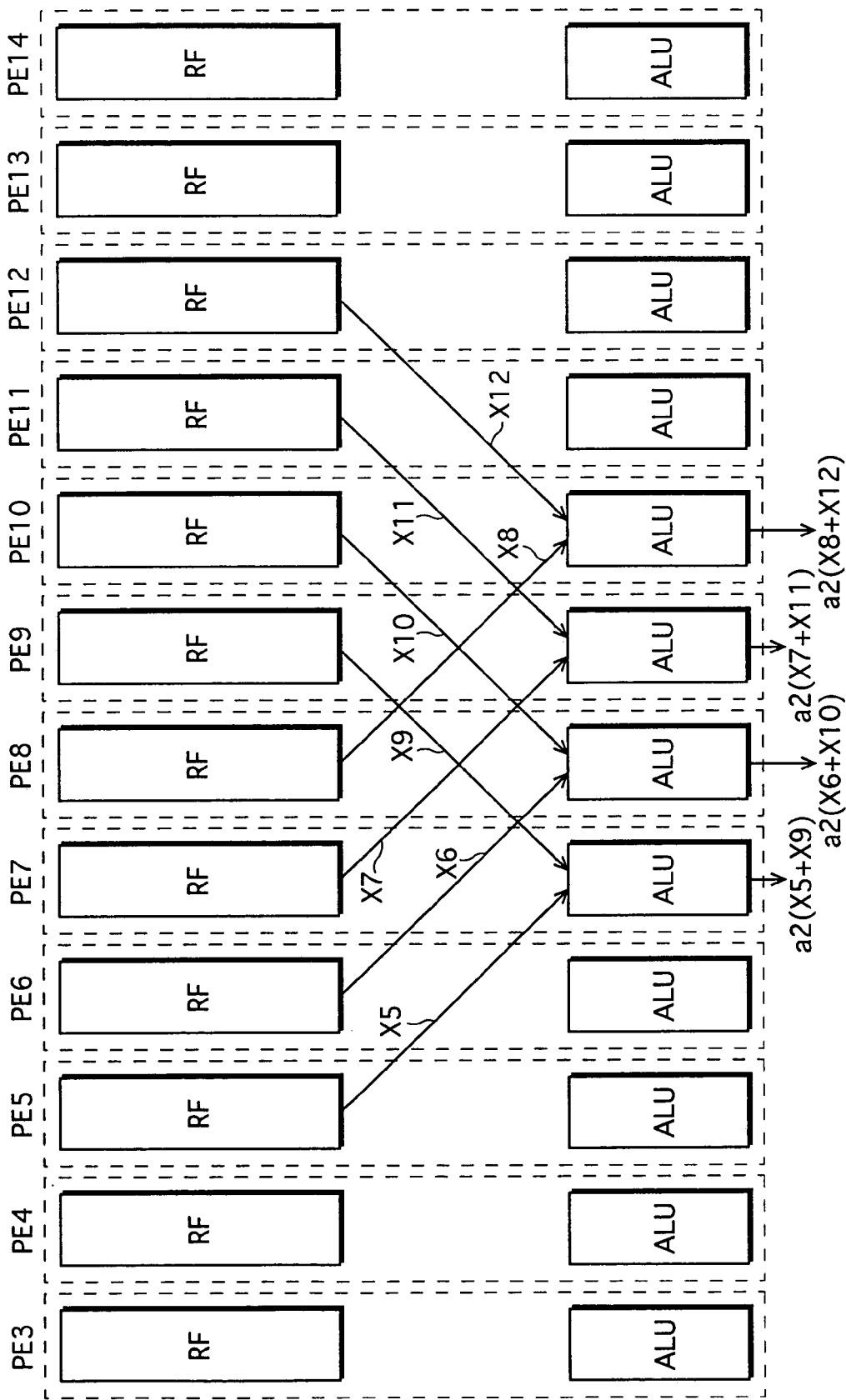

ALU OF PE7

ALU OF PE8

ALU OF PE9

ALU OF PE10

ALU OF PE7

ALU OF PE8

ALU OF PE9

ALU OF PE10

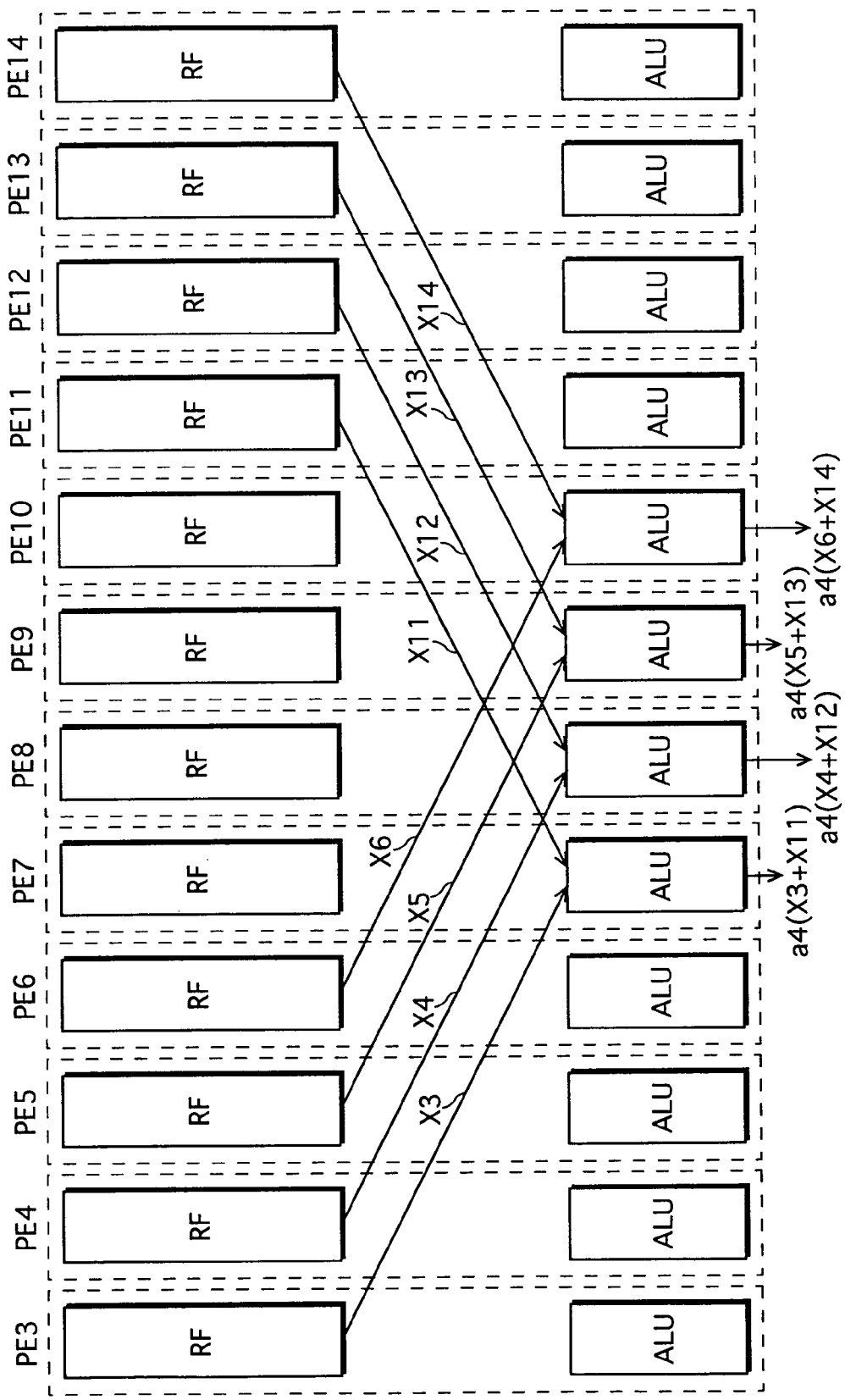

ALU OF PE7

ALU OF PE8

ALU OF PE9

ALU OF PE10

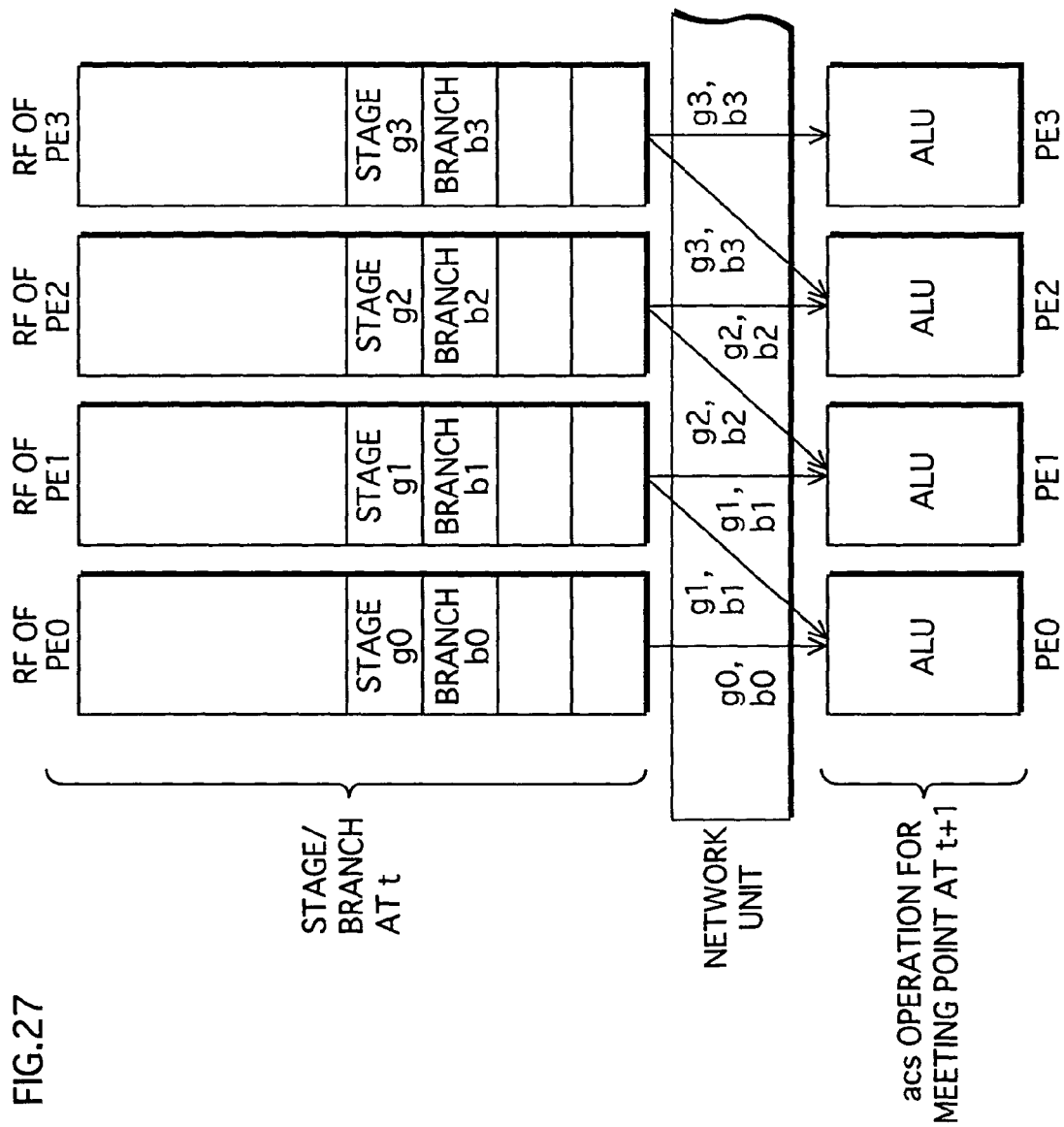

FIG.32A
FIG.32B
FIG.32C
FIG.32D

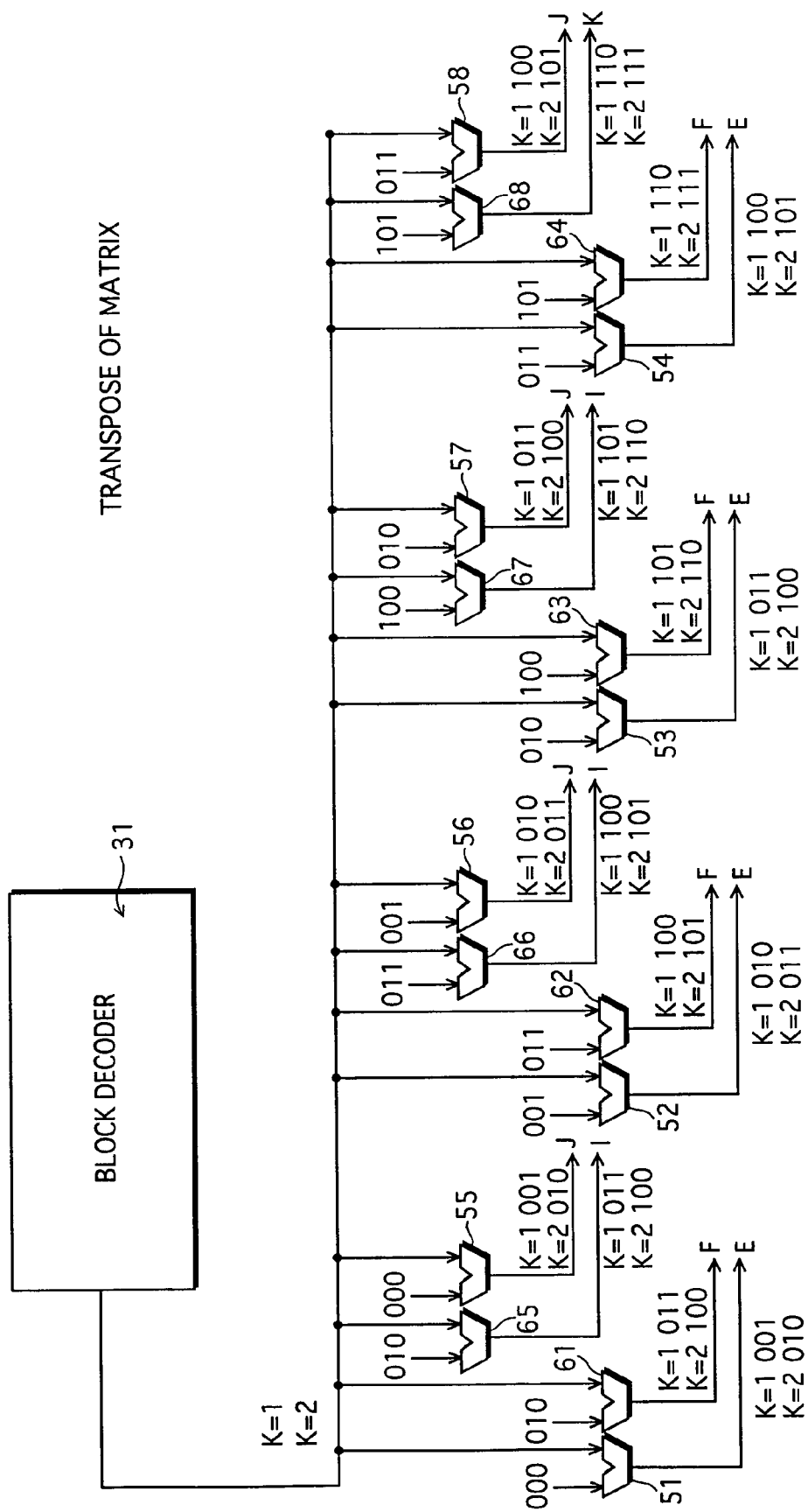

| PE0 | PE1 | PE2 | PE3 |
|---|---|---|---|
| (0,0) | (0,1) | (2,0) | (0,3) |
| (1,0) | (1,1) | (1,2) | (3,1) |
| (0,2) | (2,1) | (2,2) | (2,3) |
| (3,0) | (1,3) | (3,2) | (3,3) |

READ TO OUTPUT PORT C

|    | PE0 | PE1 | PE2 | PE3 |
|---|---|---|---|---|
| r0 | (0,0) | (0,1) | (2,0) | (0,3) |
| r1 | (1,0) | (1,1) | (1,2) | (3,1) |
| r2 | (0,2) | (2,1) | (2,2) | (2,3) |
| r3 | (3,0) | (1,3) | (3,2) | (3,3) |
|    | ↓ (0,2) | ↓ (1,3) | ↓ (2,0) | ↓ (3,1) |

WRITE FROM INPUT PORT Y

|    | PE0 | PE1 | PE2 | PE3 |
|---|---|---|---|---|
| r0 | (0,0) | (0,1) | (0,2) | (0,3) |
| r1 | (1,0) | (1,1) | (1,2) | (1,3) |
| r2 | (2,0) | (2,1) | (2,2) | (2,3) |
| r3 | (3,0) | (3,1) | (3,2) | (3,3) |

I/O REGISTER no scsel0 r0, r1

FIG.49A
- NETWORK SHIFT INSTRUCTION
  scsfti,r0,r1,r2,3
FIG.49B
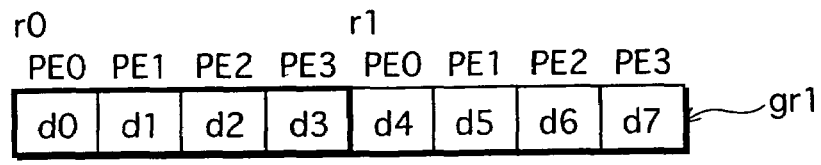
FIG.49C
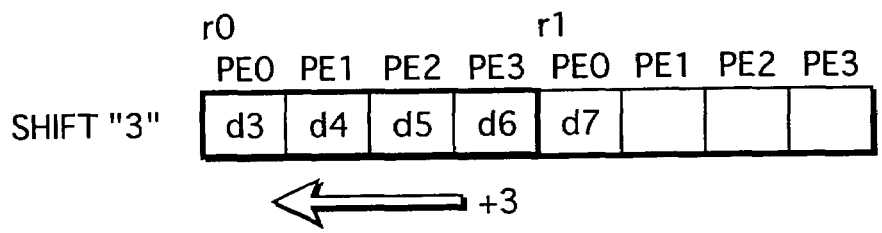
SHIFT "3"
FIG.49D
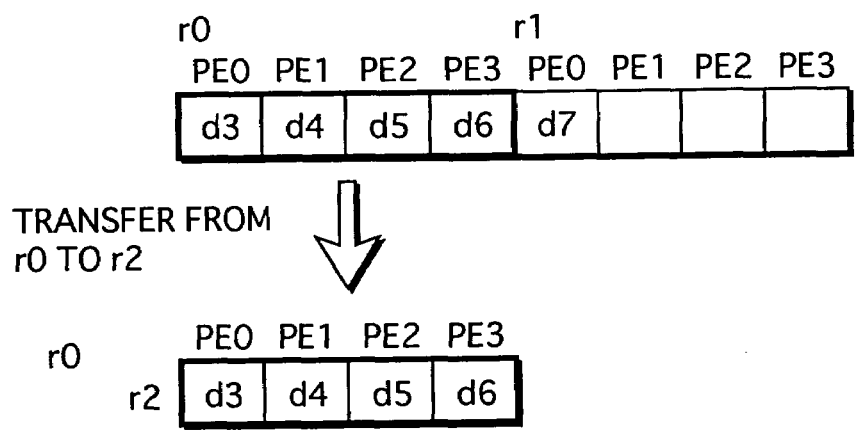
TRANSFER FROM r0 TO r2

FIG.50A
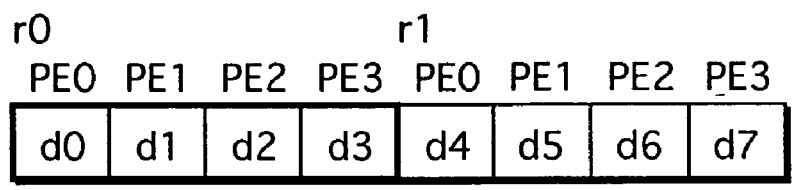
- NETWORK SHIFT INSTRUCTION
  scsfti   r0,r1,r2,-2
FIG.50B
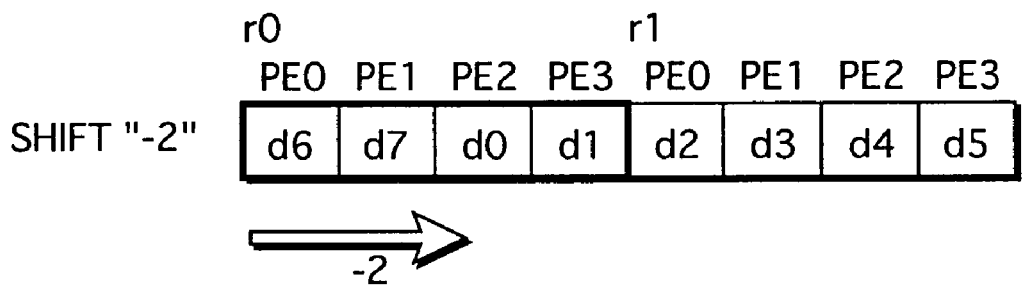
FIG.50C
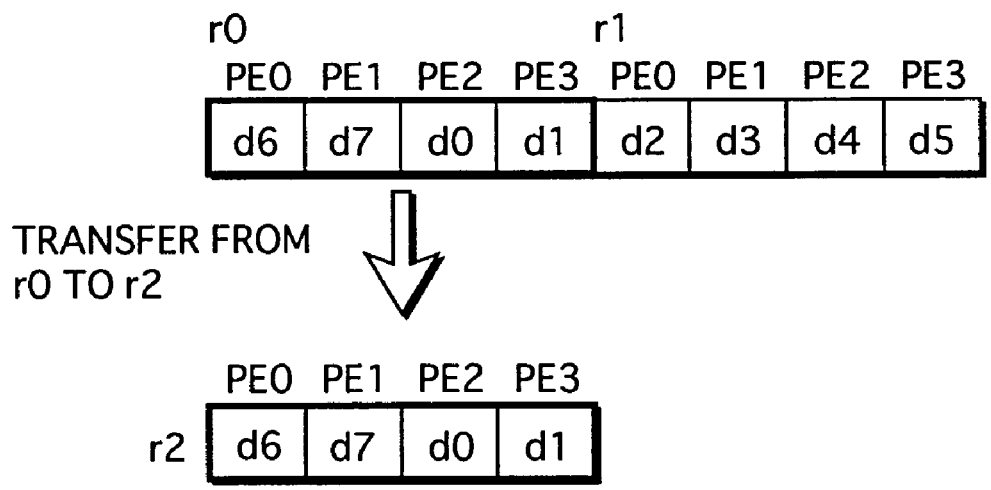
FIG.50D

FIG.61

|   |   |   |   |   |   |   |   |   |   |   |   |   |   |   |   |
|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 |
| 17 | 18 | 19 | 20 | 21 | 22 | 23 | 24 | 25 | 26 | 27 | 28 | 29 | 30 | 31 | 32 |
| 33 | 34 | 35 | 36 | 37 | 38 | 39 | 40 | 41 | 42 | 43 | 44 | 45 | 46 | 47 | 48 |
| 49 | 50 | 51 | 52 | 53 | 54 | 55 | 56 | 57 | 58 | 59 | 60 | 61 | 62 | 63 | 64 |
| 65 | 66 | 67 | 68 | 69 | 70 | 71 | 72 | 73 | 74 | 75 | 76 | 77 | 78 | 79 | 80 |
| 81 | 82 | 83 | 84 | 85 | 86 | 87 | 88 | 89 | 90 | 91 | 92 | 93 | 94 | 95 | 96 |
| 97 | 98 | 99 | 100 | 101 | 102 | 103 | 104 | 105 | 106 | 107 | 108 | 109 | 110 | 111 | 112 |
| 113 | 114 | 115 | 116 | 117 | 118 | 119 | 120 | 121 | 122 | 123 | 124 | 125 | 126 | 127 | 128 |
| 129 | 130 | 131 | 132 | 133 | 134 | 135 | 136 | 137 | 138 | 139 | 140 | 141 | 142 | 143 | 144 |
| 145 | 146 | 147 | 148 | 149 | 150 | 151 | 152 | 153 | 154 | 155 | 156 | 157 | 158 | 159 | 160 |
| 161 | 162 | 163 | 164 | 165 | 166 | 167 | 168 | 169 | 170 | 171 | 172 | 173 | 174 | 175 | 176 |
| 177 | 178 | 179 | 180 | 181 | 182 | 183 | 184 | 185 | 186 | 187 | 188 | 189 | 190 | 191 | 192 |
| 193 | 194 | 195 | 196 | 197 | 198 | 199 | 200 | 201 | 202 | 203 | 204 | 205 | 206 | 207 | 208 |
| 209 | 210 | 211 | 212 | 213 | 214 | 215 | 216 | 217 | 218 | 219 | 220 | 221 | 222 | 223 | 224 |
| 225 | 226 | 227 | 228 | 229 | 230 | 231 | 232 | 233 | 234 | 235 | 236 | 237 | 238 | 239 | 240 |
| 241 | 242 | 243 | 244 | 245 | 246 | 247 | 248 | 249 | 250 | 251 | 252 | 253 | 254 | 255 | 256 |
| 257 | 258 | 259 | 260 | 261 | 262 | 263 | 264 | 265 | 266 | 267 | 268 | 269 | 270 | 271 | 272 |
| 273 | 274 | 275 | 276 | 277 | 278 | 279 | 280 | 281 | 282 | 283 | 284 | 285 | 286 | 287 | 288 |

BEFORE INTERLEAVE →

AFTER INTERLEAVE →

FIG. 62

| Block | Order of bits in bit sequence | Group Number 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| 1 | 1 | 1 | 18 | 35 | 4 | 21 | 38 | 7 | 24 | 41 | 10 | 27 | 44 | 13 | 30 | 47 | 16 |
| 1 | 2 | 17 | 34 | 3 | 20 | 37 | 6 | 23 | 40 | 9 | 26 | 43 | 12 | 29 | 46 | 15 | 32 |
| 1 | 3 | 33 | 2 | 19 | 36 | 5 | 22 | 39 | 8 | 25 | 42 | 11 | 28 | 45 | 14 | 31 | 48 |
| 2 | 4 | 49 | 66 | 83 | 52 | 69 | 86 | 55 | 72 | 89 | 58 | 75 | 92 | 61 | 78 | 95 | 64 |
| 2 | 5 | 65 | 82 | 51 | 68 | 85 | 54 | 71 | 88 | 57 | 74 | 91 | 60 | 77 | 94 | 63 | 80 |
| 2 | 6 | 81 | 50 | 67 | 84 | 53 | 70 | 87 | 56 | 73 | 90 | 59 | 76 | 93 | 62 | 79 | 96 |
| 3 | 7 | 97 | 114 | 131 | 100 | 117 | 134 | 103 | 120 | 137 | 106 | 123 | 140 | 109 | 126 | 143 | 112 |
| 3 | 8 | 113 | 130 | 99 | 116 | 133 | 102 | 119 | 136 | 105 | 122 | 139 | 108 | 125 | 142 | 111 | 128 |
| 3 | 9 | 129 | 98 | 115 | 132 | 101 | 118 | 135 | 104 | 121 | 138 | 107 | 124 | 140 | 110 | 127 | 144 |
| 4 | 10 | 145 | 162 | 179 | 148 | 165 | 182 | 151 | 168 | 185 | 154 | 171 | 188 | 157 | 174 | 191 | 160 |
| 4 | 11 | 161 | 178 | 147 | 164 | 181 | 150 | 167 | 184 | 153 | 170 | 187 | 156 | 173 | 190 | 159 | 176 |
| 4 | 12 | 177 | 146 | 163 | 180 | 149 | 166 | 183 | 152 | 169 | 186 | 155 | 172 | 189 | 158 | 175 | 192 |
| 5 | 13 | 193 | 210 | 227 | 196 | 213 | 230 | 199 | 216 | 233 | 202 | 219 | 236 | 205 | 222 | 239 | 208 |
| 5 | 14 | 209 | 226 | 195 | 212 | 229 | 198 | 215 | 232 | 201 | 218 | 235 | 204 | 221 | 238 | 207 | 224 |
| 5 | 15 | 225 | 194 | 211 | 228 | 197 | 214 | 231 | 200 | 217 | 234 | 203 | 220 | 237 | 206 | 223 | 240 |
| 6 | 16 | 241 | 258 | 275 | 244 | 261 | 278 | 247 | 264 | 281 | 250 | 267 | 284 | 253 | 270 | 287 | 256 |
| 6 | 17 | 257 | 274 | 243 | 260 | 277 | 246 | 263 | 280 | 249 | 266 | 283 | 252 | 269 | 286 | 255 | 272 |
| 6 | 18 | 273 | 242 | 259 | 276 | 245 | 262 | 279 | 248 | 265 | 282 | 251 | 268 | 284 | 254 | 271 | 288 |

FIG.64

DATA PROCESSOR AND PROGRAM FOR PROCESSING A DATA MATRIX

BACKGROUND OF THE INVENTION

1. Field of the Invention

The present invention relates to a data processor, and to improvements for efficiently performing media processing, such as decoding of image or audio data, and demodulation processing of communicated data.

2. Background Art

When performing media processing such as decoding of image or audio data or demodulation processing of communicated data, it is often necessary to process data arranged in the form of a matrix, that is, a two-dimensional array of N rows and M columns. To process a data matrix at high speed, data processors which perform media processing tend to employ an architecture that is suitable for parallel data processing. It is commonly believed that high-speed processing of a data matrix can be achieved by a quantitative expansion, i.e., by increasing the number of processing elements (hereafter simply referred to as "PE"). A PE is a hardware expansion unit which includes an operation unit and a register for feeding data to the operation unit. Conventional data processors for media processing are architectured to adapt to parallel processing by incorporating PEs corresponding to the number of operations to be executed in parallel.

A construction of a data processor for processing a data matrix having 16 rows and 16 columns is explained below. A matrix of data elements with 16 rows and 16 columns is stored in a memory device. The 16 columns of the matrix are assigned in a one-to-one correspondence with 16 PEs. Each time 16 data elements which constitute one row are read from the memory device, the 16 PEs simultaneously process the data elements which belong to the assigned columns. This enables 16 data elements of one row to be processed in one cycle. By performing the same for 16 cycles, the processing of the 16 by 16 data matrix is completed.

Here, parallel execution of 16 operations is possible only if the operation units of the 16 PEs are simultaneously fed with data elements which they use as operands. Suppose the operation unit of each PE uses a data element which belongs to a column other than the one assigned to it, as an operand. In such a case, it is necessary to change the arrangement of data elements in the matrix before supplying them to the PEs. If such a rearrangement takes time, it becomes impossible to supply the data elements simultaneously to the PEs. This causes a significant drop in processing efficiency of the PEs. Thus, an architecture having a plurality of PEs is vulnerable in that the processing efficiency drops significantly if a data element which belongs to one column needs to be fed to a PE corresponding to another column.

Particularly in media processing, there are a number of instances where a changing of places between data elements is necessary. If the processing efficiency decreases every time such a changing is made, it is impossible to meet strict specifications required of digital electrical household appliances. To solve this problem, developers of data processors take the trouble of narrowing down the types of operations to be performed by PEs in media processing and redesigning the architecture for each type of operation. With the developers getting caught up in the trouble of such redesigning, it is widely considered to take a long time to develop data processors for media processing.

SUMMARY OF THE INVENTION

The present invention aims to provide a data processor which can maintain processing efficiency even when a change occurs in operand assignments and the like.

The stated object can be achieved by a data processor including: n processing elements which each include a register file and an operation unit, n being an integer no less than 2; and a selector operable to simultaneously perform n transfers, each of the n transfers being a transfer of data from a register file in one processing element to an operation unit in another processing element.

Each of the n transfers performed by the selector is made from a register file of one processing element to an operation unit of another processing element. Combinations of transfer sources and destinations of these n transfers can be set freely. When the register file of each of the n processing elements stores m data elements which constitute a different column of a data matrix having m rows and n columns, the operation unit of each of the n processing elements can be fed with not only a data element stored in the register file of the same processing element but also a data element stored in a register file of a different processing element. Hence the processing efficiency can be maintained even when a data element of one column needs to be fed to a processing element corresponding to another column.

Here, the register file in each of the n processing elements may have m registers for storing m data elements which constitute one column of a data matrix having m rows and n columns, m being an integer no less than 2, wherein the data to be transferred by the selector is a data element stored in any of the m registers.

By reading data elements from registers of the register files of the n processing elements and transferring them to the operation units of the n processing elements, it is possible to continuously supply data elements to the operation units of the n processing elements. This allows not only a process of adding up data elements in a column direction but also a process of adding up data elements in a row direction, to be conducted smoothly.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 13 shows an example of the storage contents of RFs when symmetrical filtering is performed;

FIG. 14 shows reads/writes of RFs and operations of ALUs which are performed in stage 1 shown in FIG. 12;

FIG. 17 shows inter-PE transfers performed by the network unit in stage 3;

FIG. 21 shows inter-PE transfers performed by the network unit in stage 5;

FIG. 27 shows function assignments when Viterbi decoding is performed;

FIG. 32 shows registers in four RFs from which data should be read;

FIG. 35 shows changes of outputs to RFs as variable k output from the block decoder varies;

FIG. 36 shows registers in RFs from which data should be read, as the outputs of adders shown in FIG. 34 change;

FIG. 49 shows example settings of a network shift instruction and how reads/writes of RFs are performed according to the network shift instruction;

FIG. 50 shows another example of a network shift instruction;

FIG. 61 shows bit sequences before and after block interleaving;

FIG. 62 shows the order of bits in a bit sequence obtained by rearranging a block-interleaved bit sequence based on a rotation rule;

FIG. 64 shows an example structure of storage units of a first buffer memory unit shown in FIG. 63;

DESCRIPTION OF THE PREFERRED EMBODIMENTS

Embodiments of a data processor of the present invention are described below.

First Embodiment

Figure 1:
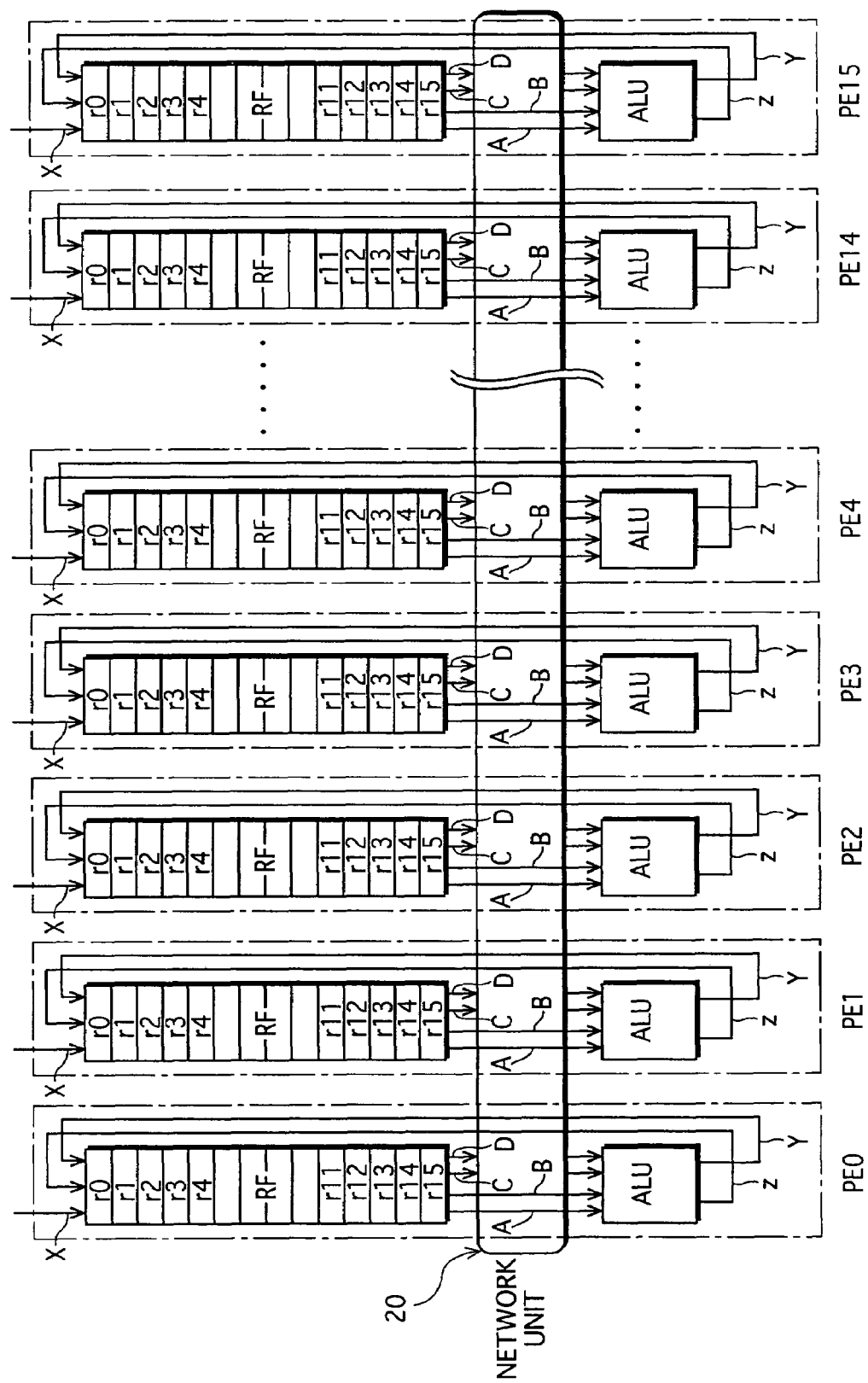
FIG. 1 shows an inner construction of a data processor to which the first embodiment of the invention relates.

FIG. 1 shows a construction of a data processor to which the first embodiment of the invention relates. This data processor is constructed to process a matrix made up of 16 rows and 16 columns. The data processor includes PEs, namely, PE0 to PE15, that are as many as the columns of the matrix. Each PE includes an ALU (arithmetic logic unit) and a RF (register file). The ALU and RF of each PE are both connected to a network unit 20.

The ALUs of the sixteen PEs perform operations using data elements stored in the RFs of the PEs as operands. Since the sixteen PEs each have one ALU, sixteen operations are executed in parallel.

The RFs of the sixteen PEs each have registers r0 to r15, as many as the rows of the matrix. Since the sixteen PEs each have one RF, the matrix with 16 rows and 16 columns are stored in these 16×16 registers in the data processor.

Paths A and B are connecting lines for transferring two data elements from the RF of one PE to the ALU of the same PE. Paths Y and Z are connecting lines for transferring two data elements from the ALU of one PE to the RF of the same PE. Paths C and D are connecting lines for transferring two data elements from the RF of one PE to the ALU of another PE via the network unit 20.

The network unit 20 transfers 32 data elements each from the RF of one PE to the ALU of another PE via path C or D.

The following describes the ALU and RF which constitute each PE, in greater detail.

The ALU simultaneously performs two operations using, as operands, two data elements transferred from the RF of the same PE via paths A and B and two data elements transferred from the network unit 20 via paths C and D. The ALU outputs two operation results obtained by simultaneously performing the two operations, to input ports Y and Z of the RF of the same PE.

Figure 2:
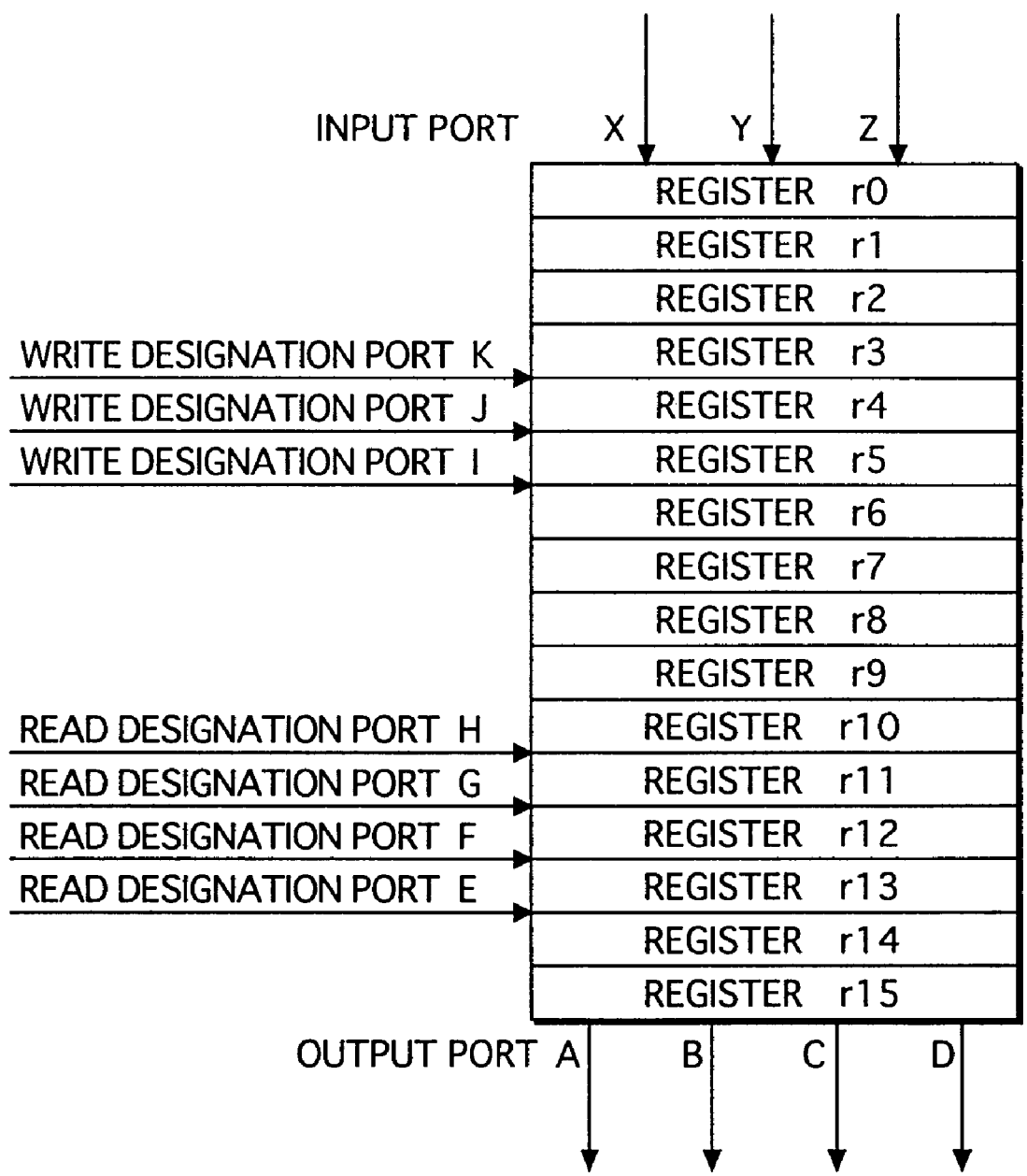
FIG. 2 shows a detailed inner construction of a RF shown in FIG. 1.

FIG. 2 shows an inner construction of the RF. As illustrated, the RF has sixteen registers r0 to r15, four output ports A, B, C, and D, and three input ports X, Y, and Z, and is capable of four reads and three writes. The size (word) of one register is 2 bytes (=16 bits), so that the sixteen registers can store data up to 16×2 bytes. Here, "four reads" means four data elements are read from four registers and output to four output ports A, B, C, and D. In other words, data elements are simultaneously read from four out of sixteen registers r0 to r15. Two output ports A and B out of four output ports A, B, C, and D are connected to the ALU of the same PE, whereas remaining two output ports C and D are connected to the network unit 20. Accordingly, the RF can supply two of the sixteen data elements stored therein to the ALU of the same PE via output ports A and B, and two of the sixteen data elements stored therein to the ALUs of other PEs via output ports C and D. Four read designation ports E, F, G, and H are used to designate the four registers from which data elements should be read.

Meanwhile, "three writes" means three data elements are fed from three input ports X, Y, and Z and written to three registers. In other words, data elements are simultaneously written to three out of sixteen registers r0 to r15. Of three input ports X, Y, and Z, input port X is connected to a memory device (not illustrated) which stores the matrix, and two input ports Y and Z are connected to the ALU of the same PE. Three write designation ports I, J, and K are used to designate three registers to which data elements should be written.

Figure 3:
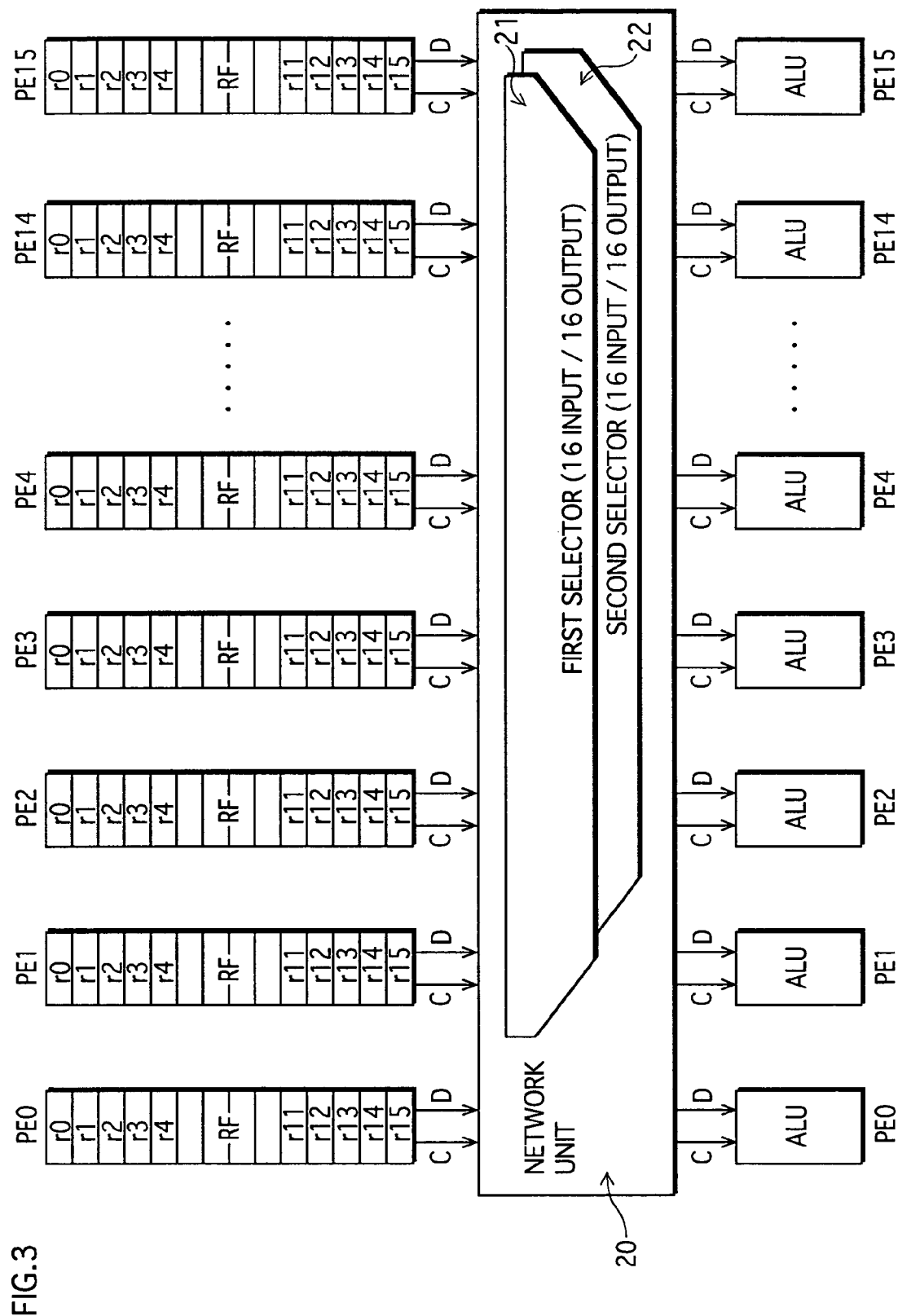
FIG. 3 shows an inner construction of a network unit shown in FIG. 1.

FIG. 3 shows an inner construction of the network unit 20. As illustrated, the network unit 20 includes two 16-input/16-output selectors, namely, a first selector 21 and a second selector 22.

Figure 4:
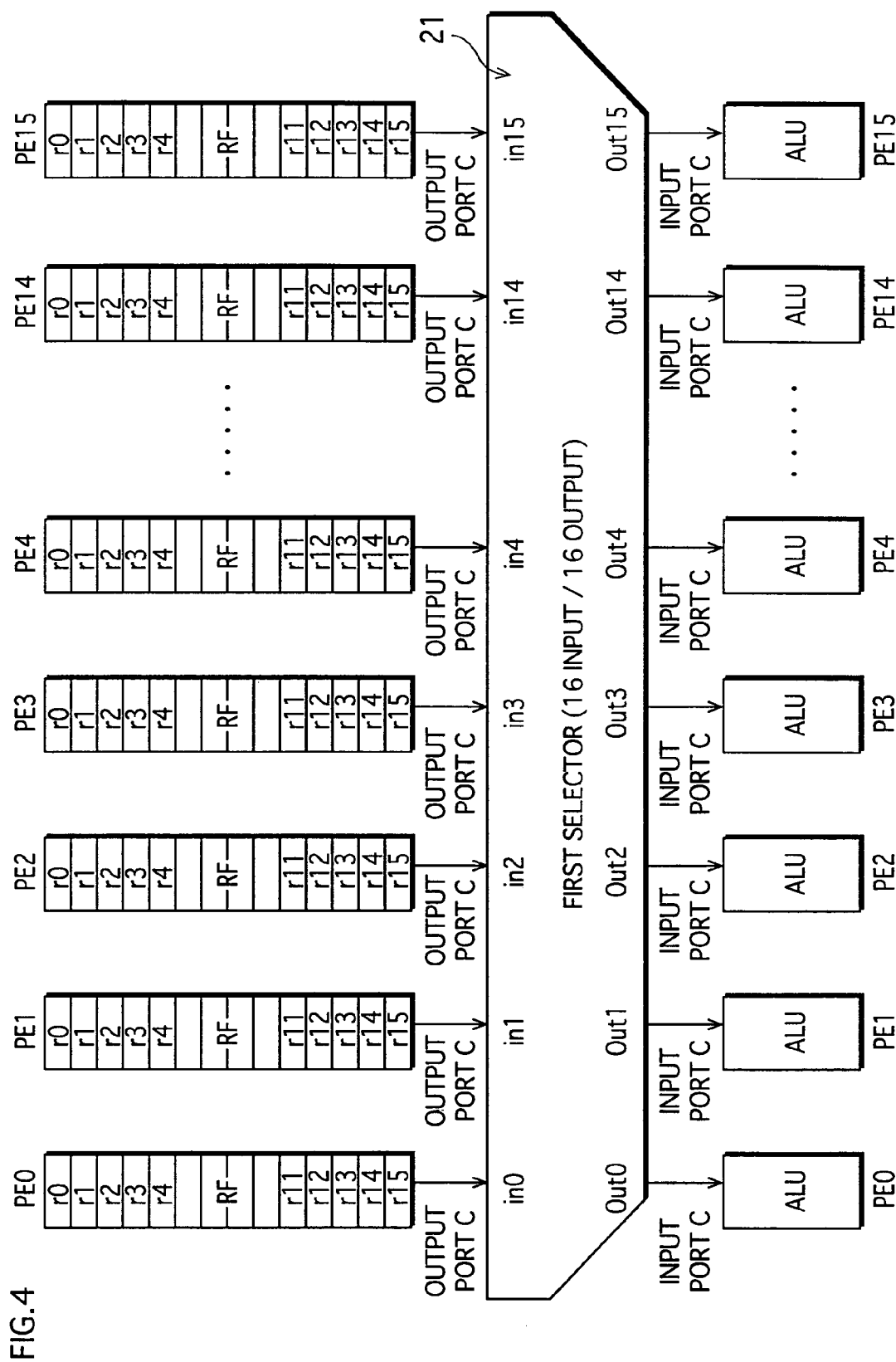
FIG. 4 shows a first selector shown in FIG. 3.

FIG. 4 shows the first selector 21 out of the two selectors provided in the network unit 20. The first selector 21 has sixteen input ports in0, in1, in2, in3, in4, ..., in14, in15 and sixteen output ports Out0, Out1, Out2, Out3, Out4, ..., Out14, Out15. Sixteen input ports in0, in1, in2, in3, in4, ..., in14, in15 correspond one-to-one to the sixteen RFs. Which is to say, output port C out of four output ports A, B, C, and D of each RF is connected with a corresponding one of input ports in0, in1, in2, in3, in4, ..., in14, in15 of the first selector 21. Also, sixteen output ports Out0, Out1, Out2, Out3, Out4, ..., Out14, Out15 of the first selector 21 correspond one-to-one to the sixteen ALUs. Which is to say, input port C out of four input ports A, B, C, and D of each ALU is connected with a corresponding one of output ports Out0, Out1, Out2, Out3, Out4, ..., Out14, Out15 of the first selector 21.

In more detail, output port Out0 of the first selector 21 is connected to input port C of the ALU of PE0. Output port Out1 is connected to input port C of the ALU of PE1. Output port Out2 is connected to input port C of the ALU of PE2. Also, input port in0 of the first selector 21 is connected to output port C of the RF of PE0. Input port in1 is connected to output port C of the RF of PE1. Input port in2 is connected to output port C of the RF of PE2.

Figure 5:
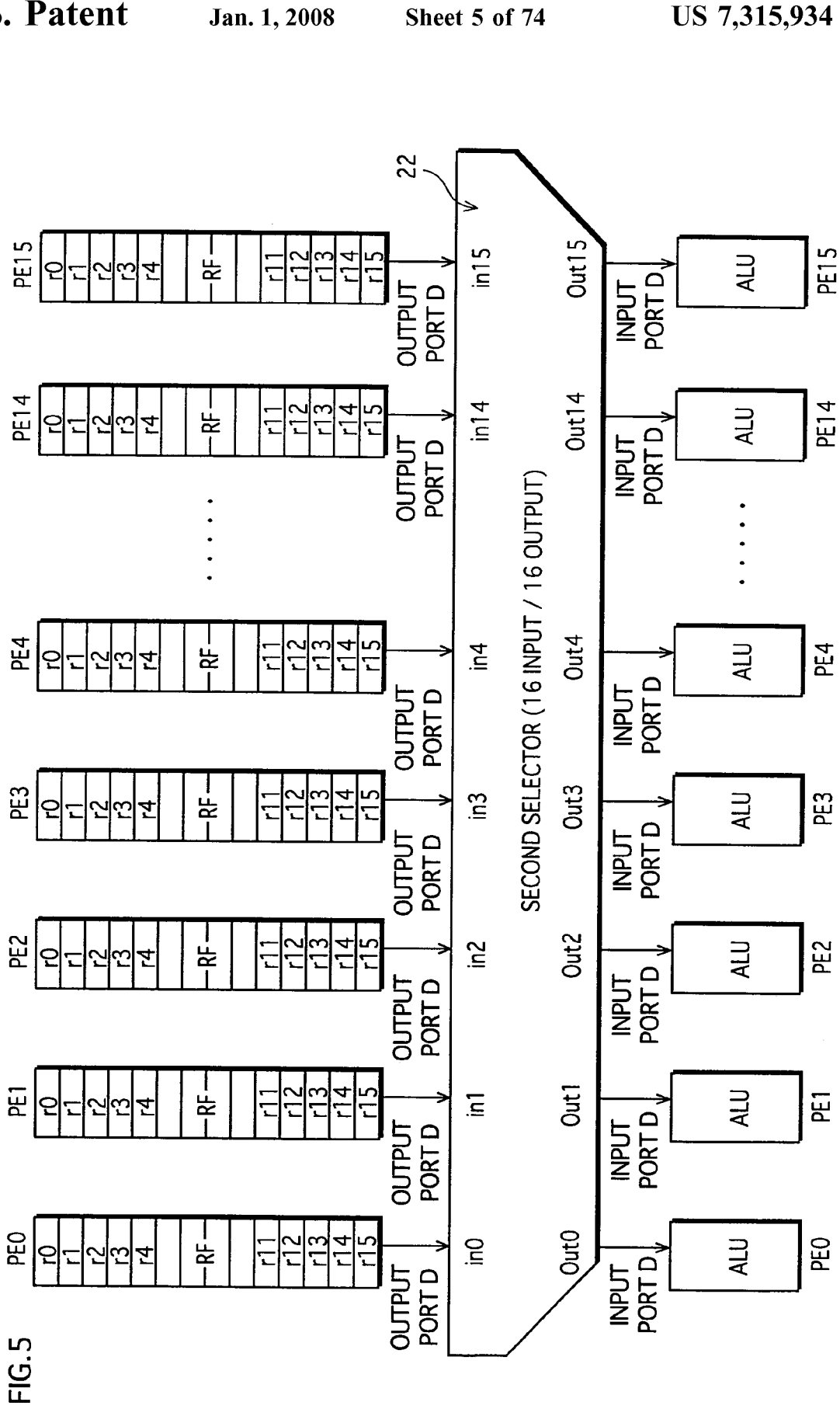
FIG. 5 shows a second selector shown in FIG. 3.

FIG. 5 shows the second selector 22. Like the first selector 21, the second selector 22 has sixteen input ports in0, in1, in2, in3, in4, ..., in14, in15 which correspond one-to-one to the sixteen RFs. Output port D of four output ports A, B, C, and D of each RF is connected with a corresponding one of sixteen input ports in0, in1, in2, in3, in4, ..., in14, in15 of the second selector 22. The second selector 22 also has sixteen output ports Out0, Out1, Out2, Out3, Out4, ..., Out14, Out15 which correspond one-to-one to the sixteen ALUs. Input port D of four input ports A, B, C, and D of each ALU is connected with a corresponding one of sixteen output ports Out0, Out1, Out2, Out3, Out4, ..., Out14, Out15 of the second selector 22.

In more detail, output port Out0 of the second selector 22 is connected to input port D of the ALU of PE0. Output port Out1 is connected to input port D of the ALU of PE1. Output port Out2 is connected to input port D of the ALU of PE2. Meanwhile, input port in0 of the second selector 22 is connected to output port D of the RF of PE0. Input port in1 is connected to output port D of the RF of PE1. Input port in2 is connected to output port D of the RF of PE2.

With the above connection relationship of sixteen input ports in0, in1, in2, in3, in4, ..., in14, in15 and sixteen output ports Out0, Out1, Out2, Out3, Out4, Out14, Out15, each of the first selector 21 and the second selector 21 simultaneously executes sixteen data transfers, so that sixteen outputs from output ports C or D of the RFs are transferred to input ports C or D of the ALUs. Here, the network unit 20 may perform two data transfers from one RF, or perform two data transfers to one ALU. Thus, data elements stored in one RF can be simultaneously transferred to two or more ALUs.

Figure 6:
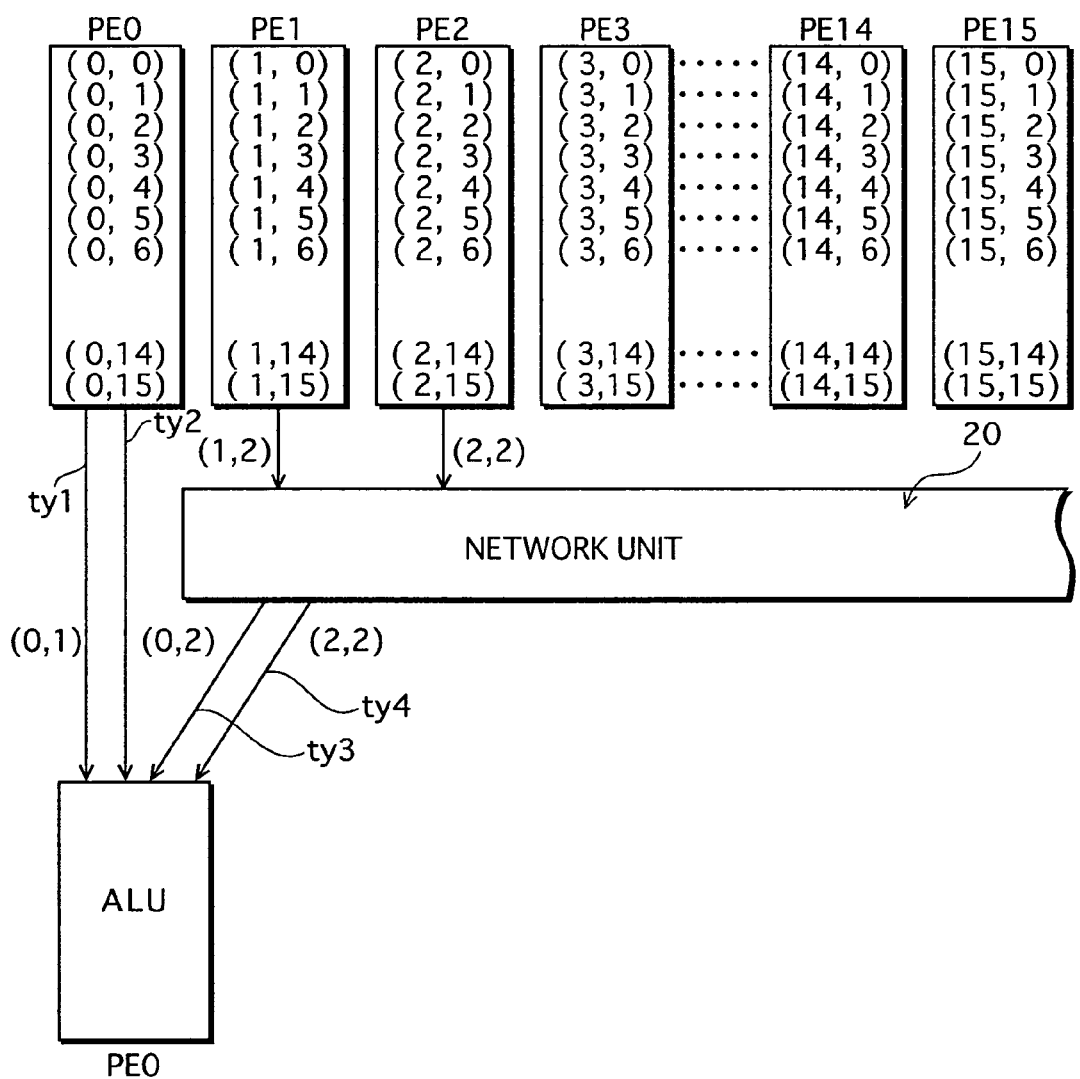
FIG. 6 shows an example of data transfers by the network unit.

Each RF can simultaneously output four data elements, and the network unit 20 can transfer two of these four data elements to the ALUs of other PEs. Therefore, data can be supplied as shown in FIG. 6, as one example. Let data(i, j) denote a data element stored in register r(j) in the RF of PEi. Data(0,1) and data(0,2) are supplied from the RF of PE0 directly to the ALU of PE0, as indicated by arrows ty1 and ty2. Also, data(1,2) and data(2,2) are supplied from the RFs of PE1 and PE2 to the ALU of PE0 via the network unit 20, as indicated by arrows ty3 and ty4. This being so, the ALU of PE0 has the four data elements, i.e., data(0,1) and data(0,2) from the RF of PE0, data(1,2) from the RF of PE1, and data(2,2) from the RF of PE2, as operands.

According to this embodiment, the ALU of each of the plurality of PEs can use not only data elements stored in the RF of the same PE but also data elements stored in the RFs of the other PEs, as operands. This allows the variety of operands to be widened.

Though the number of input ports of each of the first selector 21 and the second selector 22 in the network unit 20 is set at n which is the same number as the RFs, the number of input ports is not limited to such. The number of input ports may be smaller than n or greater than n. An example of a selector having input ports more than n is given below. Since the RF of each PE has four output ports A, B, C, and D, g output ports out of four output ports A, B, C, and D (g being an integer that satisfies $2 \leq g \leq 4$) are assigned to the first selector 21 (the second selector 22) to thereby form a g·n-input/n-output selector. Such a selector is equipped in the network unit 20 to transfer data elements from g×n input ports to n output ports.

Second Embodiment

The second embodiment of the invention relates to improvements when the data processor is used for two applications that are motion compensation and filtering.

Figure 7:
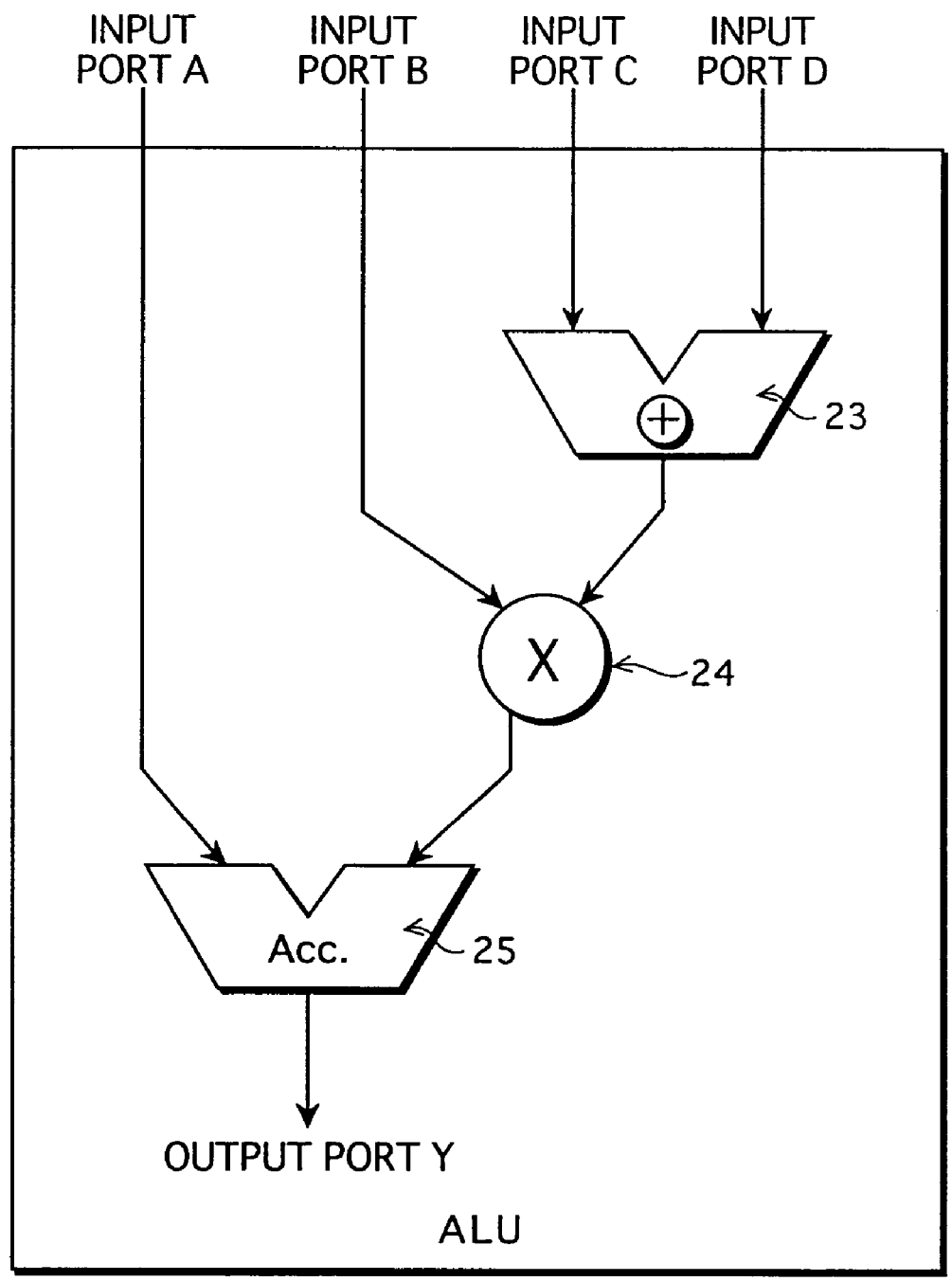
FIG. 7 shows an inner construction of an ALU shown in FIG. 1, to which the second embodiment of the invention relates.

An inner construction of an ALU for performing motion compensation and filtering is explained below. The ALU of this embodiment uses four data elements input via four input ports A, B, C, and D as operands A, B, C, and D, to compute A+B×(C+D). FIG. 7 shows an inner construction of an ALU to which this embodiment relates. In the drawing, the ALU includes an adder 23 for adding operand C and operand D, a multiplier 24 for multiplying the sum C+D by operand B, and an accumulator 25 for adding operand A to the product B×(C+D) to obtain A+B×(C+D). Note that in this specification a construction element which has an addition function can perform not only an addition but also a subtraction.

Motion compensation and filtering are carried out by the data processor that includes the above constructed ALUs and the RFs and network unit 20 described in the first embodiment, as follows.

First, an example of using the data processor for motion compensation is given below. Motion compensation includes motion compensation for P-pictures and motion compensation for B-pictures. A P-picture is image data expressed by a difference from a past reference picture. Motion compensation for a P-picture is achieved through a process of adding the pixel values of the P-picture to the pixel values of a past reference picture. A B-picture is image data expressed by a difference from a past reference picture and a future reference picture. Motion compensation for a B-picture is achieved through a process of adding the pixel values of the B-picture to the pixel values of past and future reference pictures.

Figure 8:
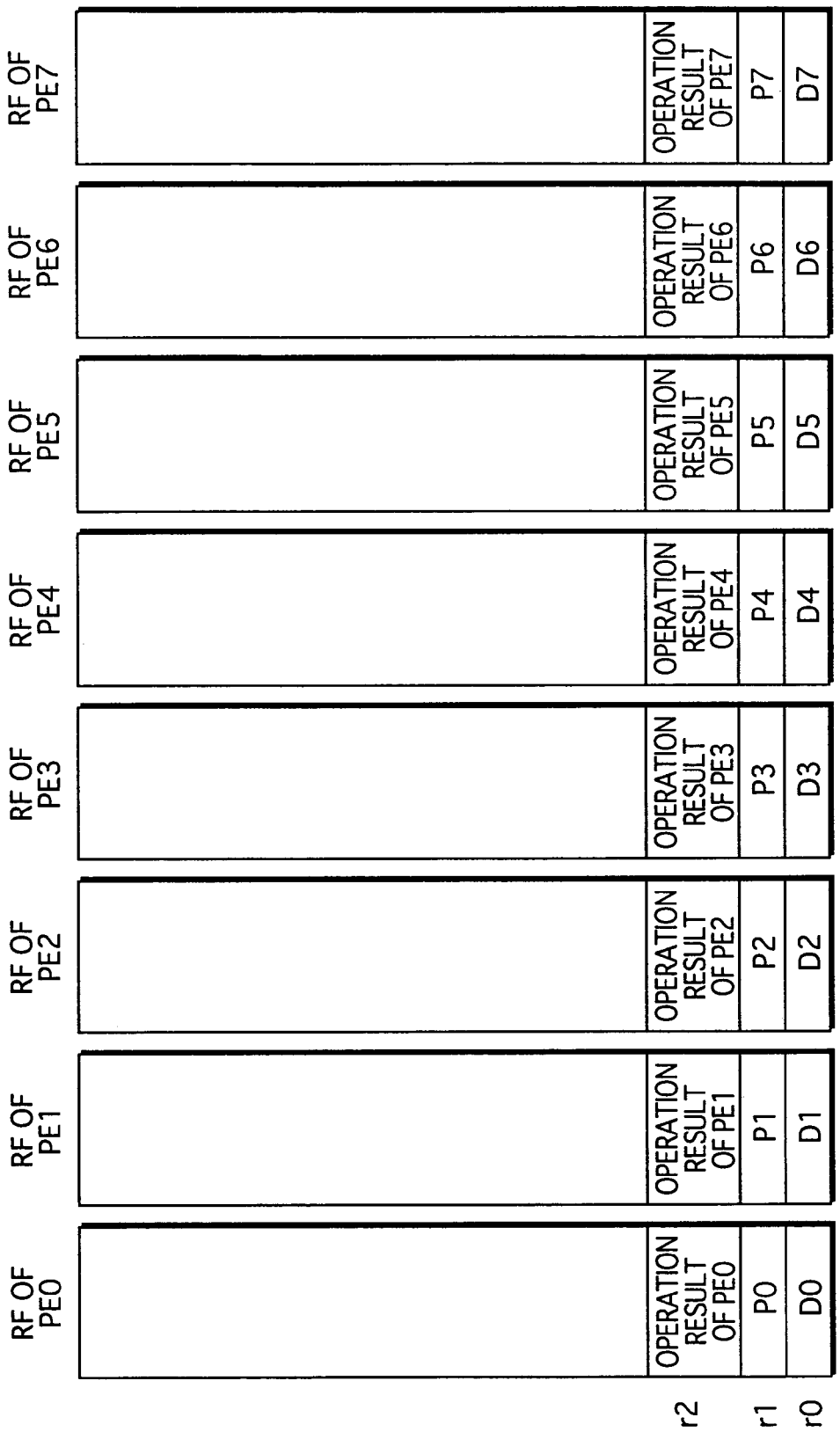
FIG. 8 shows an example of the storage contents of RFs, when the data processor is used for motion compensation for a P-picture.
Figure 9:
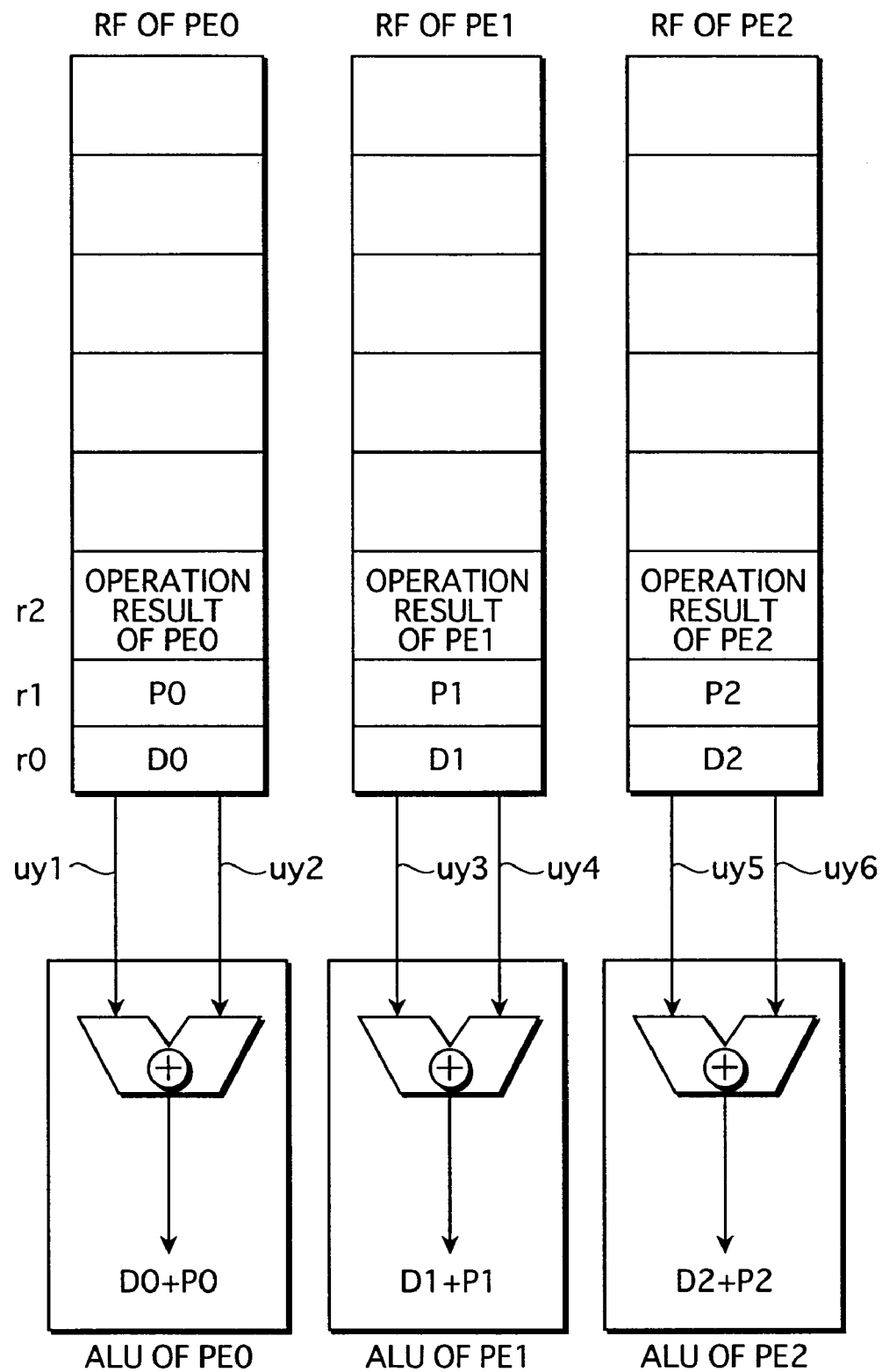
FIG. 9 shows operations performed by ALUs for motion compensation for a P-picture.

FIG. 8 shows an example of using the data processor for motion compensation for a P-picture. In the drawing, D0 to D7 represent pixels on one line of a difference image, and P0 to P7 represent pixels on one line of a past reference image. In this example, D0 to D7 are stored in registers r0 in the RFs of PE0 to PE7 respectively, and P0 to P7 are stored in registers r1 in the RFs of PE0 to PE7 respectively. These pixels are transferred from the RFs of PE0 to PE7 to the ALUs of the same PEs. FIG. 9 shows processing performed by the data processor in motion compensation. D0 and P0 are transferred to the ALU of PE0 as indicated by arrows uy1 and uy2. D1 and P1 are transferred to the ALU of PE1 as indicated by arrows uy3 and uy4. D2 and P2 are transferred to the ALU of PE2 as indicated by arrows uy5 and uy6.

In FIG. 9, each ALU adds the transferred pixels to each other. In detail, the adder 23 in the ALU of PE0 adds D0 and P0, the adder 23 in the ALU of PE1 adds D1 and P1, and the adder 23 in the ALU of PE2 adds D2 and P2. In this way, the original image is reconstructed from the P-picture.

Figure 10:
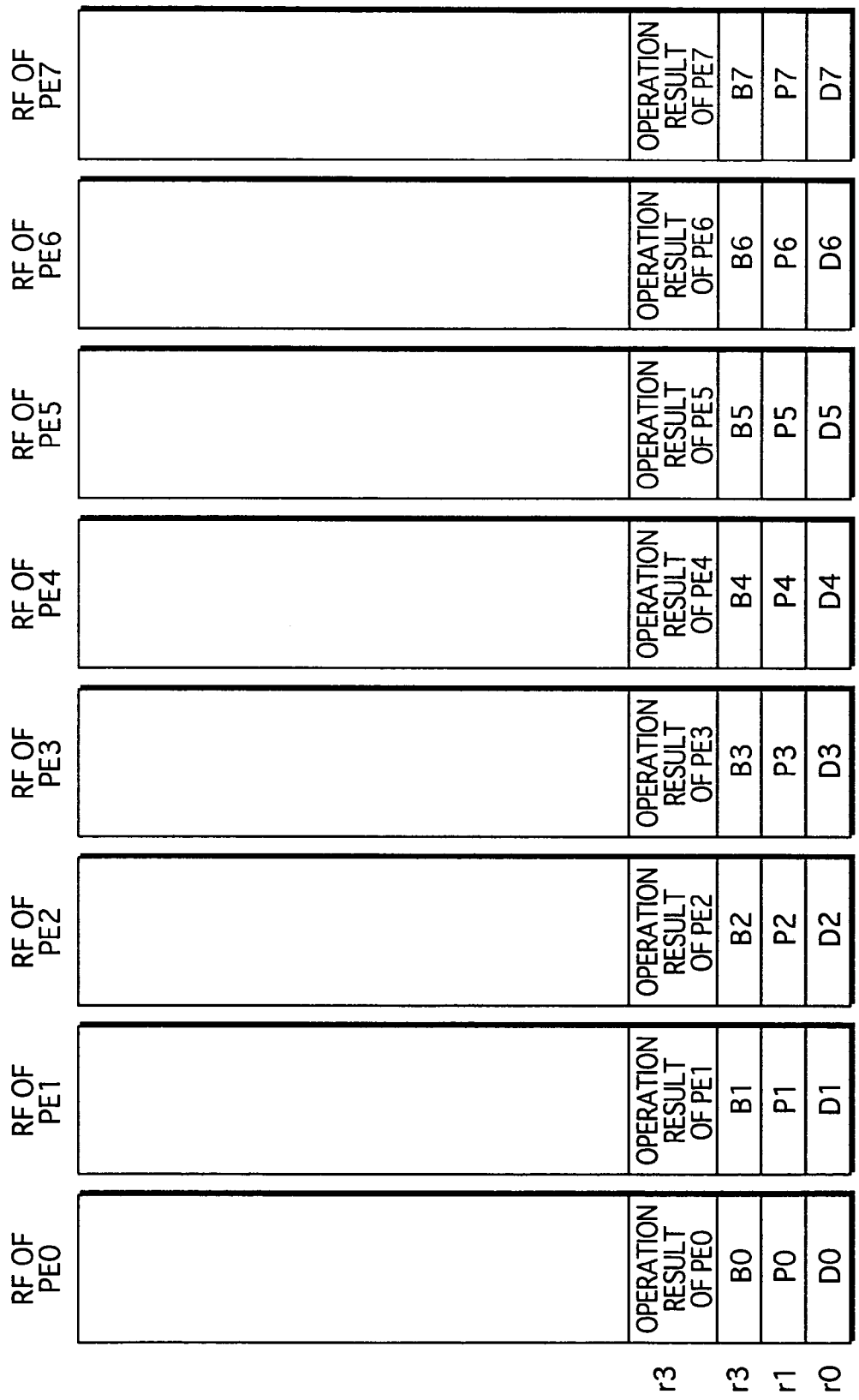
FIG. 10 shows an example of the storage contents of RFs, when the data processor is used for motion compensation for a B-picture.
Figure 11:
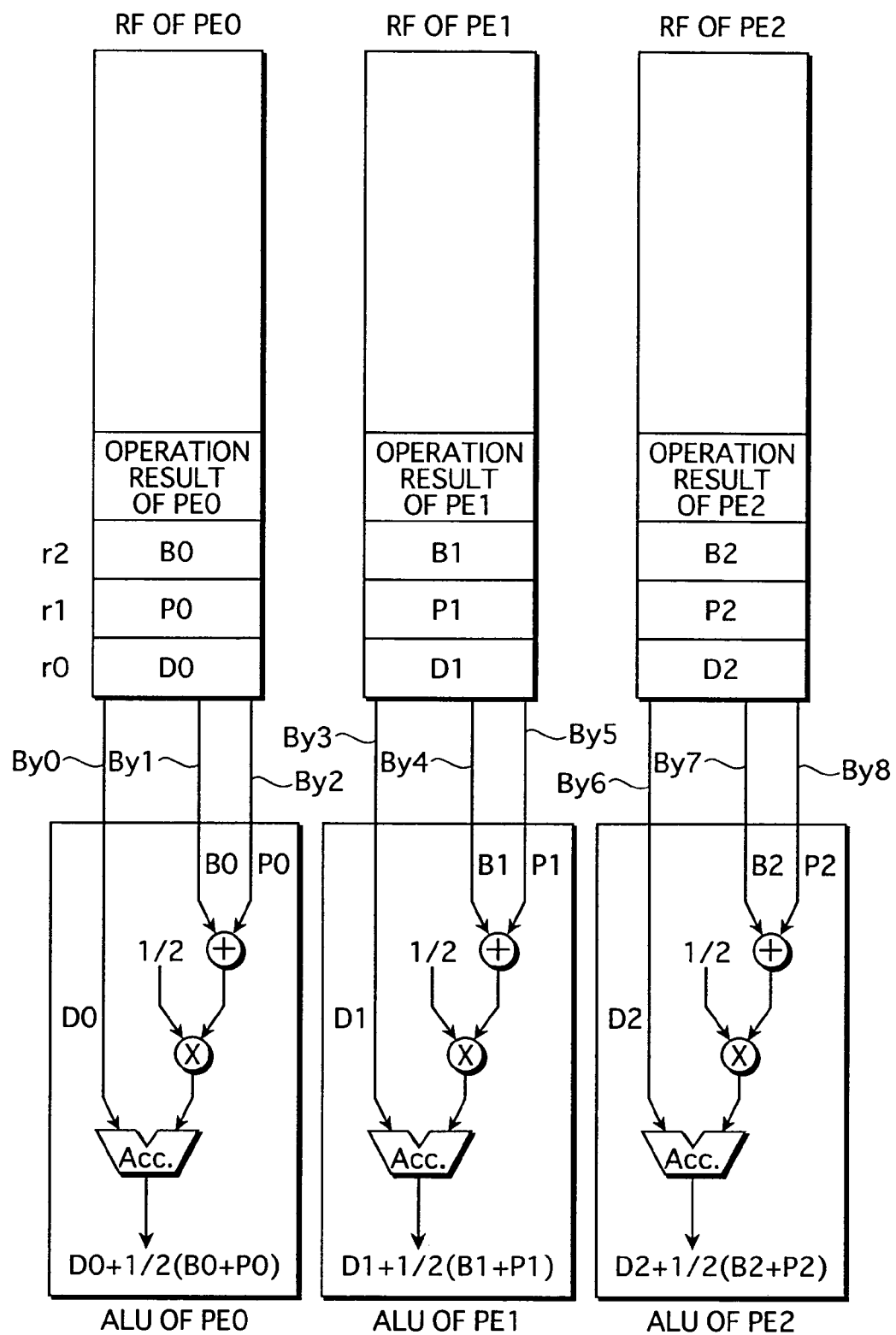
FIG. 11 shows operations performed by ALUs for motion compensation for a B-picture.

FIG. 10 shows an example of the storage contents of the RFs in the case of motion compensation for a B-picture. Like that shown in FIG. 8, D0 to D7 are stored in registers r0 in the RFs of PE0 to PE7, P0 to P7 are stored in registers r1 in the RFs of PE0 to PE7, and B0 to B7 are stored in registers r2 in the RFs of PE0 to PE7, respectively. The RF of each PE transfers these pixels to the ALU of the same PE. FIG. 11 shows processing performed by the data processor in this case. The RF of PE0 outputs D0, B0, and P0 to the ALU of PE0, as indicated by arrows By0, By1, and By2. The RF of PE1 outputs D1, B1, and P1 to the ALU of PE1, as indicated by arrows By3, By4, and By5. The RF of PE2 outputs D2, B2, and P2 to the ALU of PE2, as indicated by arrows By6, By7, and By8. The ALU of each PE executes the following operation on the transferred pixels. In the ALU of PE0, for instance, the adder 23 adds B0 and P0, the multiplier 24 multiplies the sum B0+P0 by ½, and the accumulator 25 adds D0 to the product ½·(B0+P0). In this way, the original image is reconstructed from the B-picture.

Figure 12A:
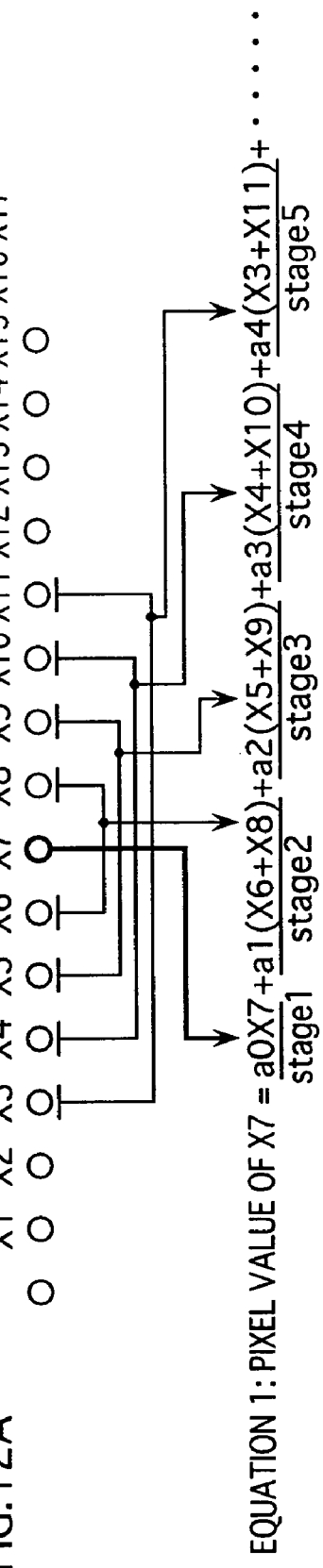
FIG. 12 shows computing equations used when filtering is performed on four pixels X7, X8, X9, and X10 out of 32 pixels X0 to X31 which are present on one line.
Figure 12B:
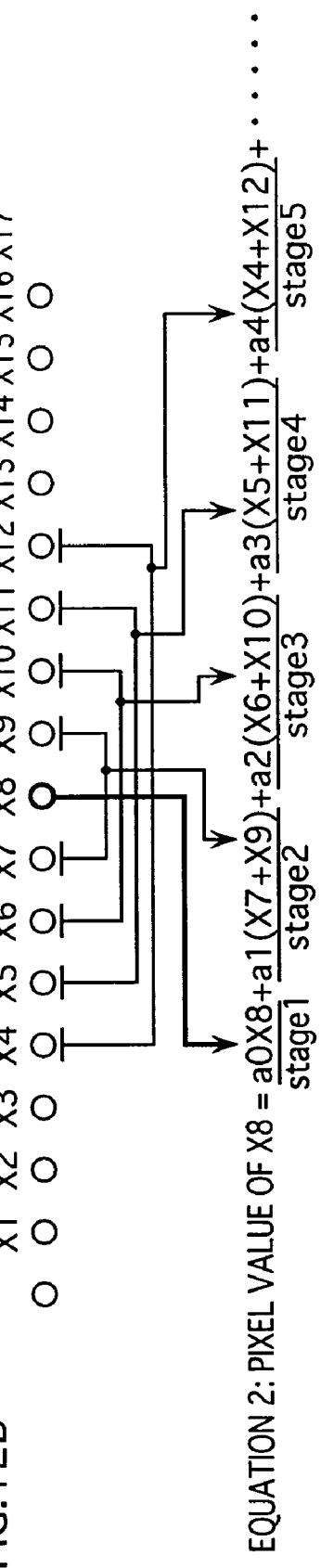

Next, an example of using the data processor for filtering that is often performed in video compression/decompression or resizing is given below. To resize an image, a filter that has symmetrical filter coefficients, such as a FIR (Finite Impulse Response) filter, is effective. Suppose a symmetrical filter is applied to pixel Xj. Then a filter coefficient by which pixel Xj+i is to be multiplied is the same as a filter coefficient by which pixel Xj−i is to be multiplied. An operation example when a symmetrical filter is applied to pixels X0 to X31 which lie on one line is given below. FIG. 12 shows equations used when filtering is performed on four pixels X7, X8, X9, and X10 out of 32 pixels X0 to X31 that exist on one line. FIGS. 12A-12D respectively show examples of computing pixel values of X7, X8, X9, and X10 using a symmetrical filter. In FIG. 12A, X7 is multiplied by filter coefficient a0, X6 and X8 are multiplied by filter coefficient a1, X5 and X9 are multiplied by filter coefficient a2, X4 and X10 are multiplied by filter coefficient a3, and X3 and X11 are multiplied by filter coefficient a4. Here, X6 and X8 are multiplied by the same filter coefficient because they are symmetrical with respect to X7. The same applies to X5 and X9, X4 and X10, and X3 and X11.

Equations 1, 2, 3, and 4 shown in FIGS. 12A-12D are used when a symmetrical filter is applied to X7, X8, X9, and X10. The data processor divides each of these equations into a plurality of terms, and simultaneously calculates the corresponding terms of the equations. In equations 1 to 4 shown in FIGS. 12A-12D, stage1 is executed on X7, X8, X9, and X10 simultaneously. Following this, stage2 is executed on X6, X7, X8, X9, X10, and X11 simultaneously. Following this, stage3 is executed on X5, X6, X7, X8, X9, X10, X11, and X12 simultaneously. Following this, stage4 is executed on X4, X5, X6, X7, X10, X11, X12, and X13 simultaneously. FIG. 13 shows an example of the storage contents of the RFs when a symmetrical filter is applied to the four pixels. In the drawing, X0 to X15 are stored in registers r0 in the RFs of PE0 to PE15, and X16 to X31 are stored in registers r1 in the RFs of PE0 to PE15.

Registers r2 in the RFs of PE0 to PE15 are used for storing operation results of the ALUs of PE0 to PE15 respectively. In detail, register r2 in the RF of PE0 is used for storing an operation result of the ALU of PE0. Register r2 in the RF of PE1 is used for storing an operation result of the ALU of PE1. Register r2 in the RF of PE2 is used for storing an operation result of the ALU of PE2. Register r2 in the RF of PE3 is used for storing an operation result of the ALU of PE3.

Also, filter coefficients a0 to a4 are stored respectively in registers r3 to r7 in the RF of each of PE0 to PE15. In detail, filter coefficients a0 to a4 are stored in registers r3 to r7 in the RF of PE0, in registers r3 to r7 in the RF of PE1, and in registers r3 to r7 in the RF of PE2. Since the filter coefficients and the pixel values are stored in this way, the ALU of each PE can obtain desired pixel values and coefficients from the RF of the same PE and from the RFs of other PEs via the network unit 20.

A symmetrical filter is executed in the following manner. An operation for symmetrical filtering includes four terms that are stage1 to stage4. First, an operation of stage1, that is, a0·X7, a0·X8, a0·X9, and a0·X10, is executed.

(Stage1)

FIG. 14 shows reads/writes performed by the RFs and operations performed by the ALUs in stage1. To perform a symmetrical filter on X7, X8, X9, and X10, the ALUs of PE7 to PE10 respectively read X7, X8, X9, and X10 from the RFs of PE7 to PE10, as indicated by arrows cy0, cy1, cy2, and cy3. The ALUs of PE7 to PE10 also read filter coefficient a0 as indicated by arrows cy4, cy5, cy6, and cy7. The multiplier 24 in the ALU of PE7 multiplies X7 by a0, the multiplier 24 in the ALU of PE8 multiplies X8 by a0, the multiplier 24 in the ALU of PE9 multiplies X9 by a0, and the multiplier 24 in the ALU of PE10 multiplies X10 by a0. a0·X7, a0·X8, a0·X9, and a0·X10 obtained as a result of these multiplications are written to registers r2 in the RFs of PE7 to PE10 respectively.

(Stage2)

Figure 15:
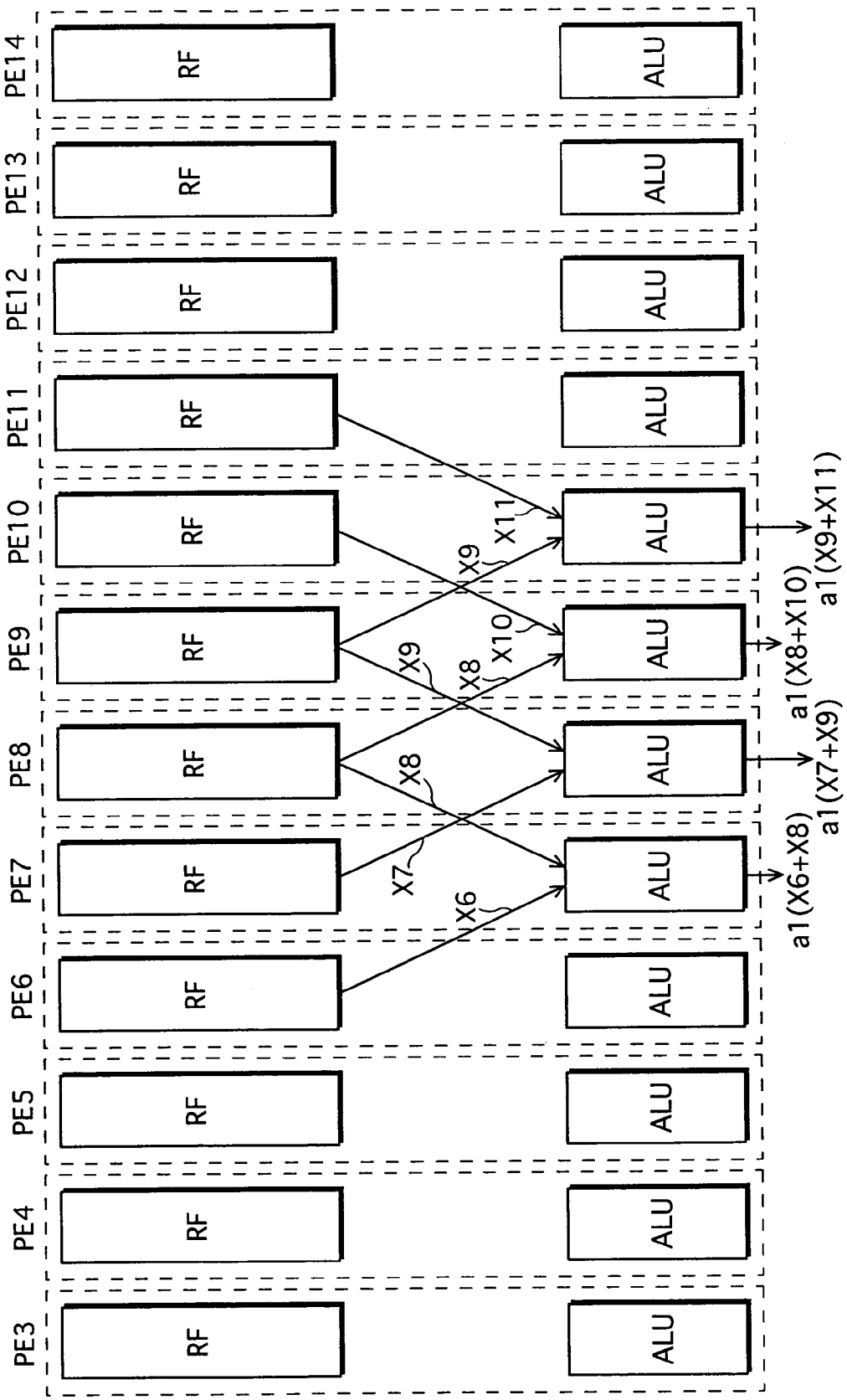
FIG. 15 shows inter-PE transfers performed by the network unit in stage 2.

FIG. 15 shows inter-PE transfers performed by the network unit 20 in stage2. In stage2, the ALU of each of PE7 to PE10 needs pixels adjacent to the target pixel. Accordingly, the network unit 20 transfers the adjacent pixels as shown in the drawing. Which is to say, the network unit 20 transfers X6 and X8 stored in the RFs of PE6 and PE8 to the ALU of PE7. The network unit 20 also transfers X7 and X9 stored in the RFs of PE7 and PE9 to the ALU of PE8. The network unit 20 also transfers X8 and X10 stored in the RFs of PE8 and PE10 to the ALU of PE9. The network unit 20 also transfers X9 and X11 stored in the RFs of PE9 and PE11 to the ALU of PE10. FIG. 16 shows operations performed by the ALUs of PE7 to PE10 in stage2. In the drawing, the operation results a0·X7, a0·X8, a0·X9, and a0·X10 of the ALUs of PE7 to PE10 in stage1 are transferred from the RFs of PE7 to PE10 to the ALUs of the same PEs, as indicated by arrows ey0, ey1, ey2, and ey3. Likewise, filter coefficient a1 is transferred from the RFs of PE7 to PE10 to the ALUs of the same PEs, as indicated by arrows ey4, ey5, ey6, and ey7. Meanwhile, X6 and X8 are transferred from the RFs of PE6 and PE8 to the ALU of PE7 via the network unit 20, as shown in FIG. 15. Likewise, X7 and X9 are transferred from the RFs of PE7 and PE9 to the ALU of PE8, X8 and X10 are transferred from the RFs of PE8 and PE10 to the ALU of PE9, and X9 and X11 are transferred from the RFs of PE9 and PE11 to the ALU of PE10. The ALU of each PE performs a multiplication and additions using the transferred pixel values and filter coefficient.

Figure 16A:
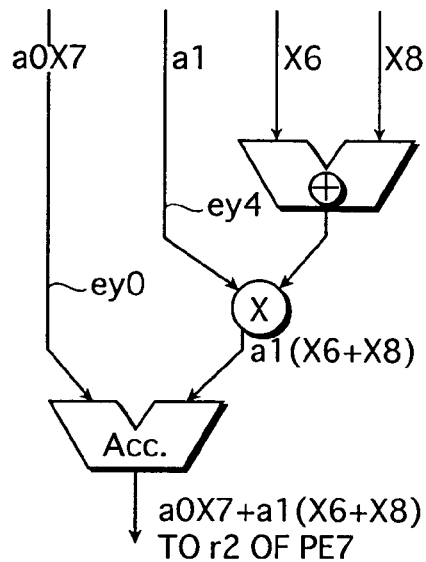
FIG. 16 shows operations performed by ALUs in stage 2.

FIG. 16A shows the ALU of PE7. In the ALU of PE7, the adder 23 performs an addition of X6+X8, the multiplier 24 performs a multiplication of a1·(X6+X8), and the accumulator 25 performs an addition of the operation result a0·X7 of stage1 to a1·(X6+X8). The operation result a0·X7+a1·(X6+X8) is written to register r2 in the RF of PE7.

Figure 16B:
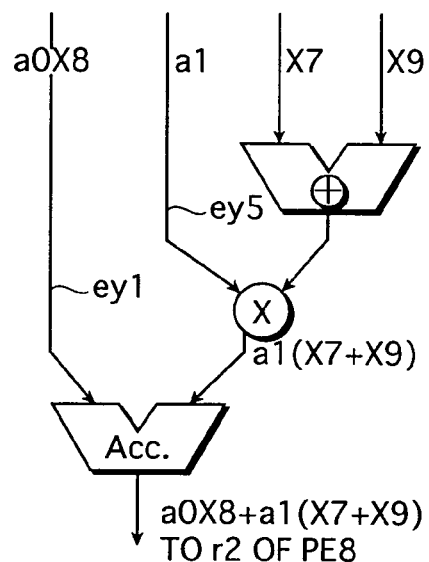

FIG. 16B shows the ALU of PE8. In the ALU of PE8, the adder 23 performs an addition of X7+X9, the multiplier 24 performs a multiplication of a1·(X7+X9), and the accumulator 25 performs an addition of the operation result a0·X8 of stage1 to a1·(X7+X9). The operation result a0·X8+a1·(X7+X9) is written to register r2 in the RF of PE8.

Figure 16C:
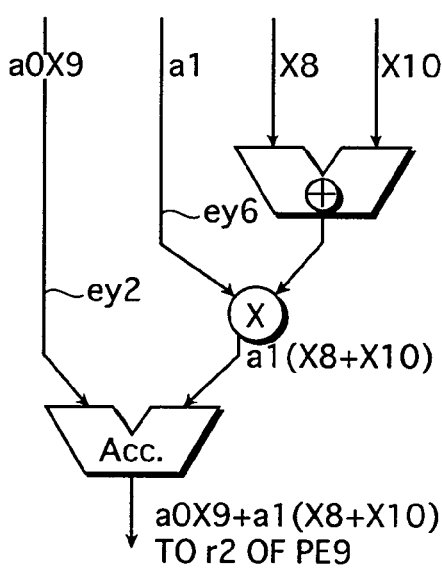
Figure 16D:
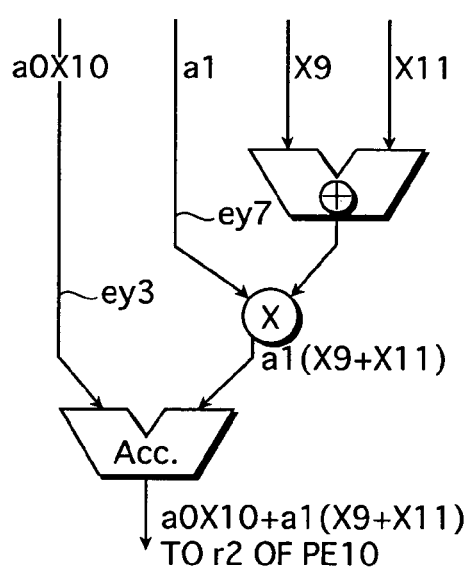

In the same manner, the ALU of PE9 shown in FIG. 16C performs an operation of a0·X9+a1·(X8+X10), and the ALU of PE10 shown in FIG. 16D performs an operation of a0·X10+a1·(X9+X11). This completes the computations of equations 1 to 4 up to stage2.

(Stage3)

FIG. 17 shows inter-PE transfers performed by the network unit 20 in stage3. In stage3, the ALU of each PE needs pixels which are adjacent to the target pixel but one. The network unit 20 transfers such adjacent pixels as shown in the drawing. Which is to say, the network unit 20 transfers X5 and X9 stored in the RFs of PE5 and PE9 to the ALU of PE7. The network unit 20 also transfers X6 and X10 stored in the RFs of PE6 and PE10 to the ALU of PE8. The network unit 20 also transfers X7 and X11 stored in the RFs of PE7 and PE11 to the ALU of PE9. The network unit 20 also transfers X8 and X12 stored in the RFs of PE8 and PE12 to the ALU of PE10. FIG. 18 shows operations performed by the ALUs in stage3. In the drawing, the operation results a0·X7+a1·(X6+X8), a0·X8+a1·(X7+X9), a0·X9+a1·(X8+X10), and a0·X10+a1·(X9+X11) of the ALUs of PE7 to PE10 in stage2 are transferred from the RFs of PE7 to PE10 to the ALUs of the same PEs, as indicated by arrows fy0, fy1, fy2, and fy3. Likewise, filter coefficient a2 is transferred from the RFs of PE7 to PE10 to the ALUs of the same PEs, as indicated by arrows fy4, fy5, fy6, and fy7. Meanwhile, X5 and X9 are transferred from the RFs of PE5 and PE9 to the ALU of PE7 via the network unit 20, as shown in FIG. 17. Likewise, X6 and X10 are transferred from the RFs of PE6 and PE10 to the ALU of PE8, X7 and X11 are transferred from the RFs of PE7 and PE11 to the ALU of PE9, and X8 and X12 are transferred from the RFs of PE8 and PE12 to the ALU of PE10. The ALU of each PE performs a multiplication and additions using the transferred pixel values and filter coefficient.

Figure 18A:
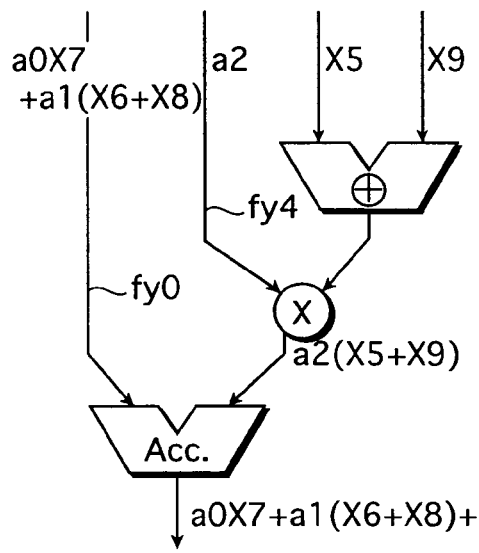
FIG. 18 shows operations performed by ALUs in stage 3.

FIG. 18A shows the ALU of PE7. In the ALU of PE7, the adder 23 performs an addition of X5+X9, the multiplier 24 performs a multiplication of a2·(X5+X9), and the accumulator 25 performs an addition of the operation result a0·X7+a1·(X6+X8) of stage2 to a2(X5+X9). The operation result a0·X7+a1·(X6+X8)+a2·(X5+X9) is written to register r2 in the RF of PE7.

Figure 18B:
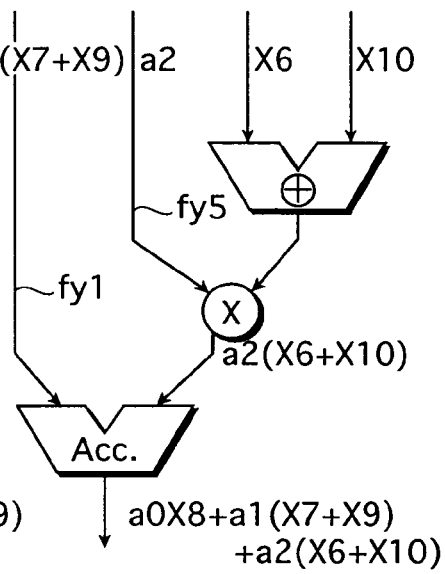

FIG. 18B shows the ALU of PE8. In the ALU of PE8, the adder 23 performs an addition of X6+X10, the multiplier 24 performs a multiplication of a2·(X6+X10), and the accumulator 25 performs an addition of the operation result a0·X8+a1·(X7+X9) of stage2 to a2·(X6+X10). The operation result a0·X8+a1·(X7+X9)+a2·(X6+X10) is written to register r2 in the RF of PE8.

Figure 18C:
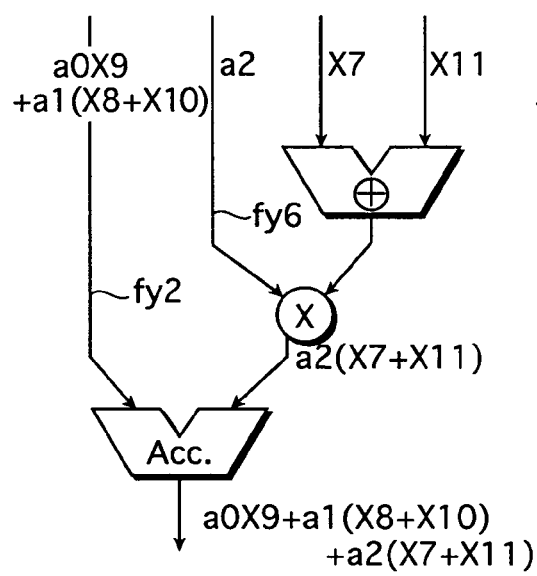
Figure 18D:
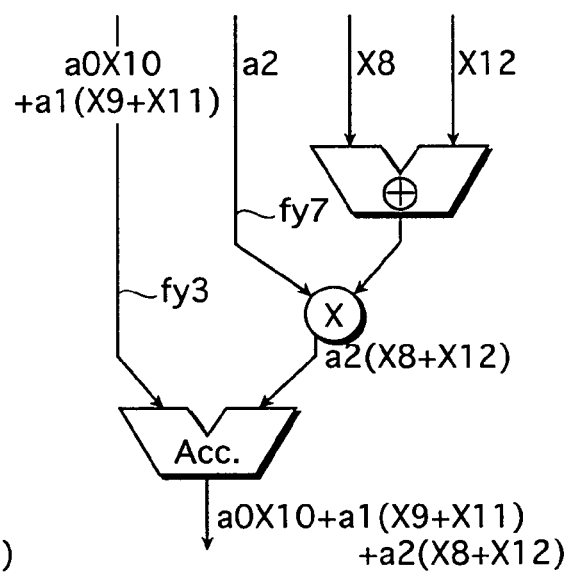

In the same manner, the ALU of PE9 shown in FIG. 18C performs an operation of a0·X9+a1·(X8+X10)+a2·(X7+X11), and the ALU of PE10 shown in FIG. 18D performs an operation of a0·X10+a1·(X9+X11)+a2·(X8+X12). This completes the computations of equations 1 to 4 up to stage3.

(Stage4)

Figure 19:
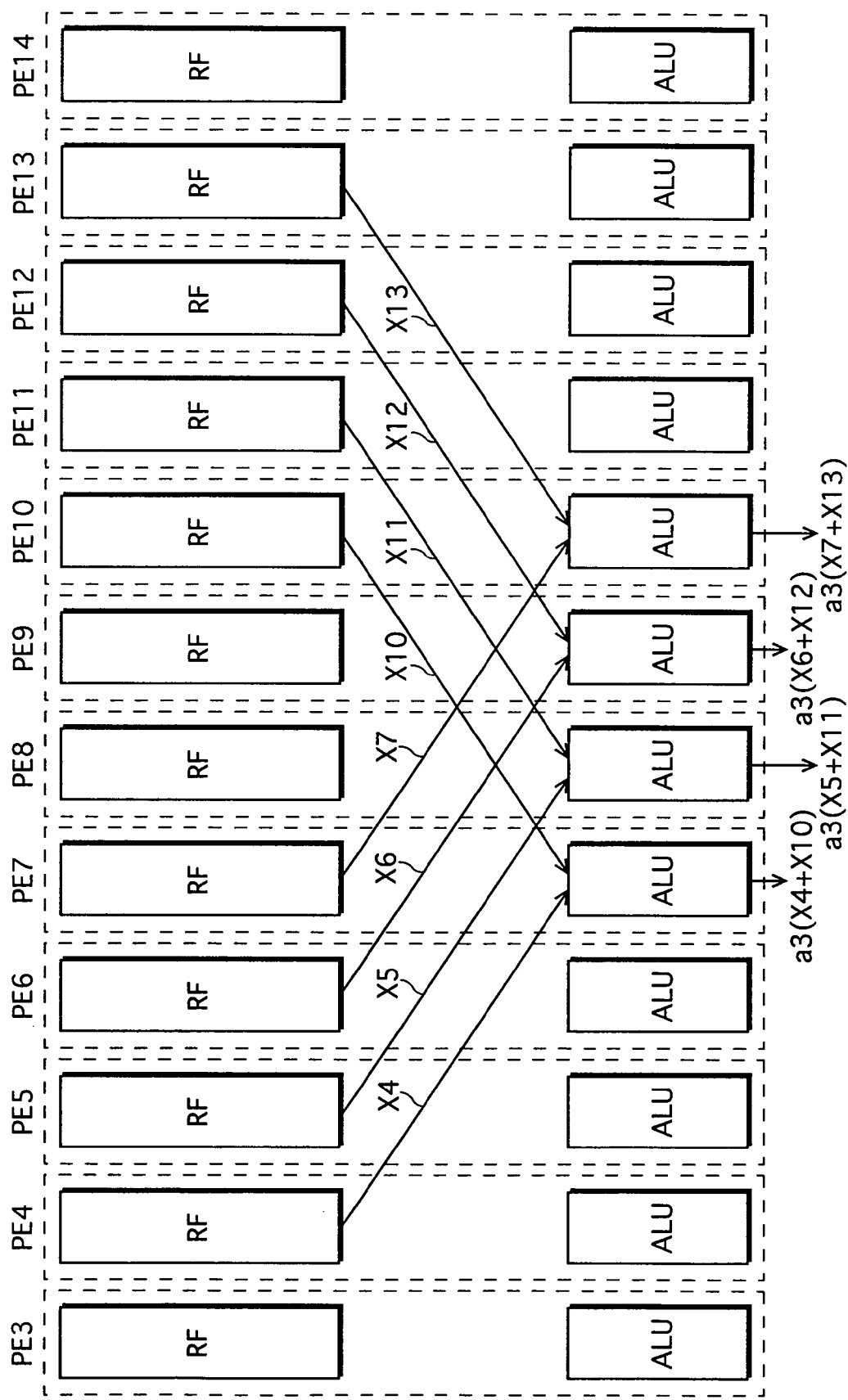
FIG. 19 shows inter-PE transfers performed by the network unit in stage 4.

FIG. 19 shows inter-PE transfers performed by the network unit 20 in stage4. In stage4, the ALU of each PE needs pixels which are adjacent to the target pixel but two. The network unit 20 transfers such adjacent pixels as shown in the drawing. Which is to say, the network unit 20 transfers X4 and X10 stored in the RFs of PE4 and PE10 to the ALU of PE7. The network unit 20 also transfers X5 and X11 stored in the RFs of PE5 and PE11 to the ALU of PE8. The network unit 20 also transfers X6 and X12 stored in the RFs of PE6 and PE12 to the ALU of PE9. The network unit 20 also transfers X7 and X13 stored in the RFs of PE7 and PE13 to the ALU of PE10. FIG. 20 shows operations performed by the ALUs in stage4. In the drawing, the operation results a0·X7+a1·(X6+X8)+a2·(X5+X9), a0·X8+a1·(X7+X9)+a2·(X6+X10), a0·X9+a1·(X8+X10)+a2·(X7+X11), and a0·X10+a1·(X9+X11)+a2·(X8+X12) of the ALUs of PE7 to PE10 in stage3 are transferred from the RFs of PE7 to PE10 to the ALUs of the same PEs, as indicated by arrows gy0, gy1, gy2, and gy3. Likewise, filter coefficient a3 is transferred from the RFs of PE7 to PE10 to the ALUs of the same PEs, as indicated by arrows gy4, gy5, gy6, and gy7. Meanwhile, X4 and X10 are transferred from the RFs of PE4 and PE10 to the ALU of PE7 via the network unit 20, as shown in FIG. 19. Likewise, X5 and X11 are transferred from the RFs of PE5 and PE11 to the ALU of PE8, X6 and X12 are transferred from the RFs of PE6 and PE12 to the ALU of PE9, and X7 and X13 are transferred from the RFs of PE7 and PE13 to the ALU of PE10. The ALU of each PE performs a multiplication and additions using the transferred pixel values and filter coefficient.

Figure 20A:
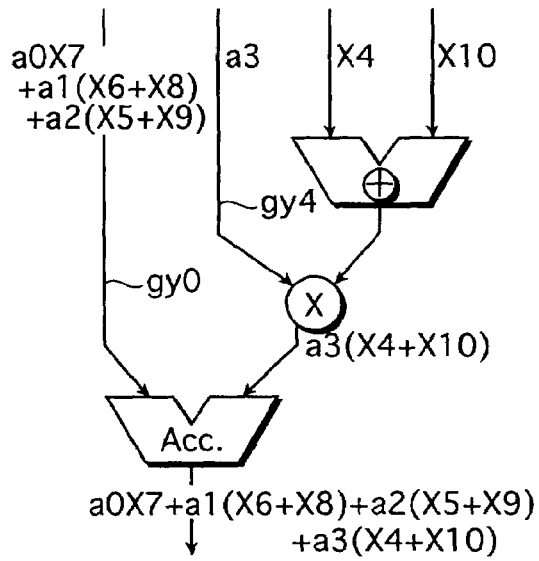
FIG. 20 shows operations performed by ALUs in stage 4.

FIG. 20A shows the ALU of PE7. In the ALU of PE7, the adder 23 performs an addition of X4+X10, the multiplier 24 performs a multiplication of a3·(X4+X10), and the accumulator 25 performs an addition of the operation result a0·X7+a1·(X6+X8)+a2·(X5+X9) of stage3 to a3·(X4+X10). The operation result a0·X7+a1·(X6+X8)+a2·(X5+X9)+a3·(X4+X10) is written to register r2 in the RF of PE7.

Figure 20B:
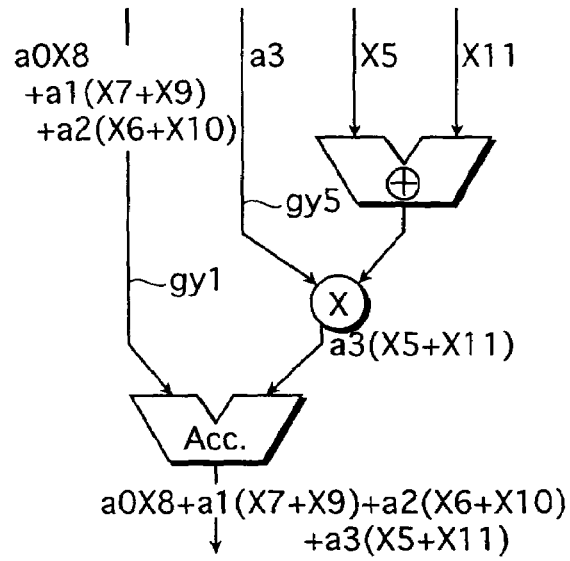

FIG. 20B shows the ALU of PE8. In the ALU of PE8, the adder 23 performs an addition of X5+X11, the multiplier 24 performs a multiplication of a3·(X5+X11), and the accumulator 25 performs an addition of the operation result a0·X8+a1·(X7+X9)+a2·(X6+X10) of stage3 to a3·(X5+X11). The operation result a0·X8+a1·(X7+X9)+a2·(X6+X10)+a3·(X5+X11) is written to register r2 in the RF of PE8.

Figure 20C:
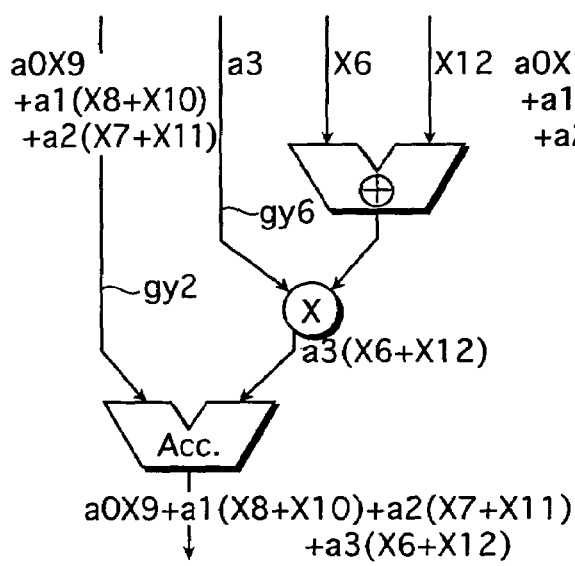
Figure 20D:
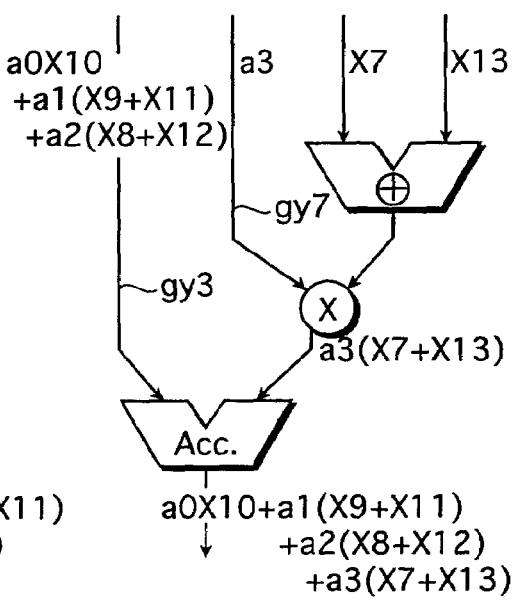
Figure 22A:
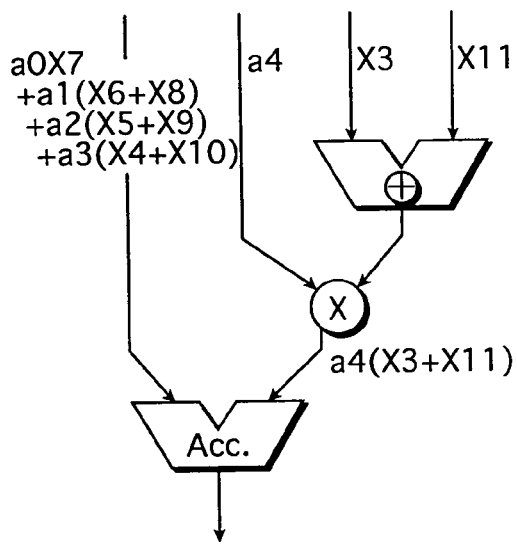
FIG. 22 shows operations performed by ALUs in stage 5.
Figure 22B:
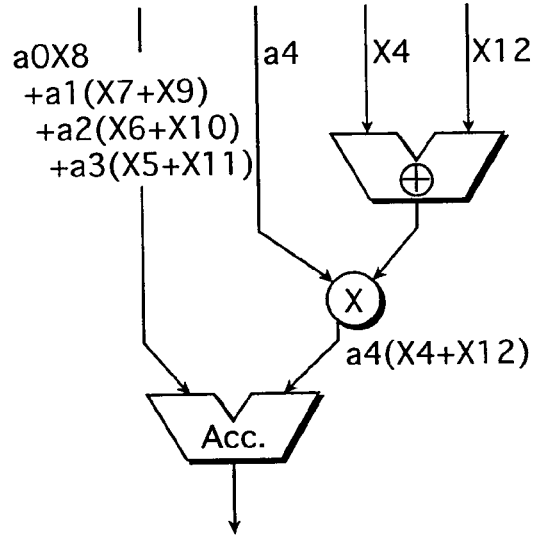
Figure 22C:
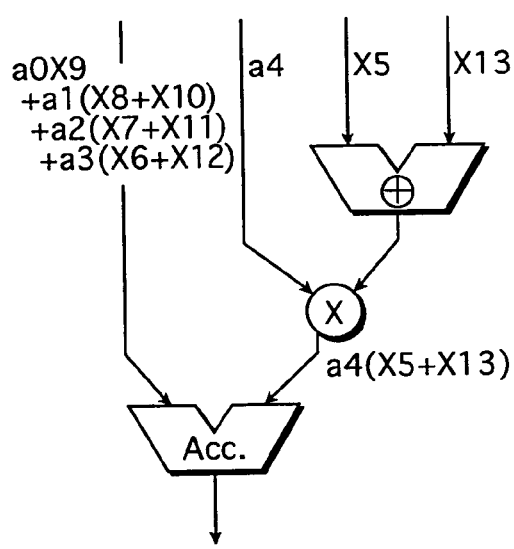
Figure 22D:
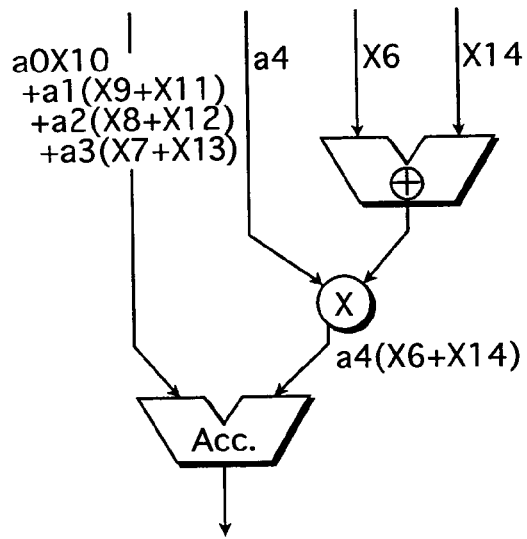

In the same manner, the ALU of PE9 shown in FIG. 20C performs an operation of a0·X9+a1·(X8+X10)+a2·(X7+X11)+a3·(X6+X12), and the ALU of PE10 shown in FIG. 20D performs an operation of a0·X10+a1·(X9+X11)+a2·(X8+X12)+a3·(X7+X13). This completes the computations of equations 1 to 4 up to stage4.

The same procedure is repeated in stage5. FIG. 21 shows inter-PE transfers performed by the network unit 20 in stage5. FIG. 22 shows operations performed by the ALUs in stage5.

In this way, the data processor can execute a symmetrical filter with four filter coefficients in four stages.

According to this embodiment, the data processor can be used for motion compensation or symmetrical filtering, by changing the settings of the RFs and the transfer source/destination combinations of the network unit 20. Thus, the data processor is applicable to both motion compensation and symmetrical filtering.

Third Embodiment

Figure 23:
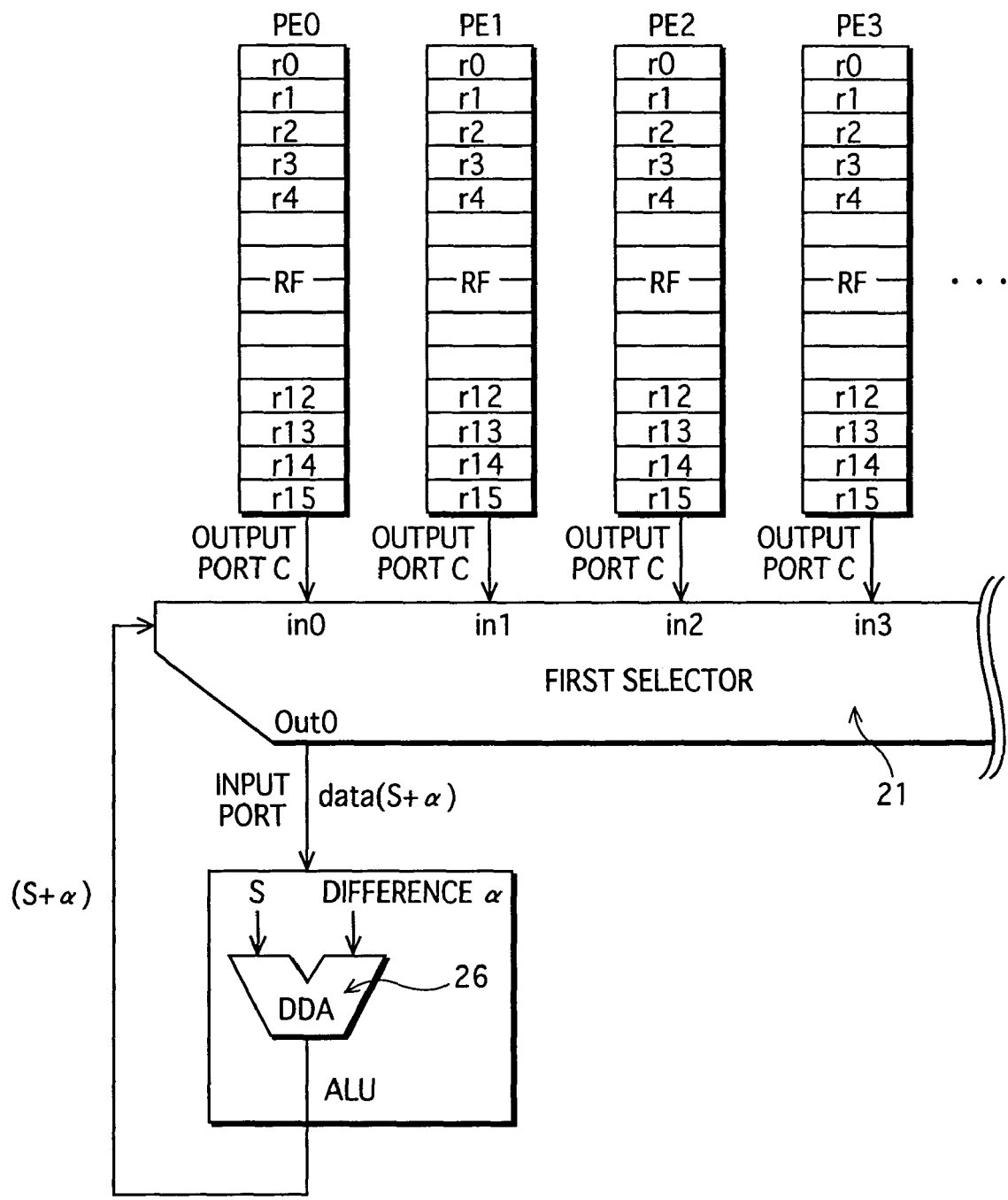
FIG. 23 shows an inner construction of an ALU that includes a DDA.

The third embodiment of the invention relates to control which is exercised to read pixels with predetermined intervals in motion compensation or filtering. FIG. 23 shows an inner construction of a data processor to which this embodiment relates. A feature of the data processor shown in the drawing is that a digital differential analyzer (DDA) 26 is provided in the ALU of PE0. This DDA 26 is provided in the ALU of each of PE0 to PE15 which is connected to not only the first selector 21 but also the second selector 22. The following explanation is directed to the DDA 26 in the ALU of PE0, for simplicity's sake.

Let data[s] be a data element in the s-th column of the matrix, and a be a predetermined interval. This being so, the DDA 26 controls the network unit 20 to transfer data[s] to the ALU, while updating variable s by a computation of s←s+α where α is the difference. Since data[s] in the s-th column of the matrix is stored in the RF of PE[s], the DDA 26 controls the network unit 20 so that data[s] stored in the RF of PE[s] is supplied to the ALU.

Suppose the initial value of variable s is 0 and predetermined interval α is 3. In this case, the DDA 26 outputs [0], [3], [6], [9], [12], . . . to the network unit 20 so that the network unit 20 transfers data[0], data[3], data[6], data[9], data[12], . . . stored in the RFs of PE0, PE3, PE6, PE9, PE12, . . . .

Suppose the initial value of variable s is 0 and predetermined interval α is 2. In this case, the DDA 26 outputs [0], [2], [4], [6]; [8], . . . to the network unit 20 so that the network unit 20 transfers data[0], data[2], data[4], data[6], data[8], . . . stored in the RFs of PE0, PE2, PE4, PE6, PE8, . . . .

According to this embodiment, an operation of reading every two pixels or every three pixels can be performed at high speed. This enables filtering described in the second embodiment to be carried out favorably.

Here, it is desirable that the offset to be added by the DDA 26 can be set by an instruction. In so doing, the predetermined interval with which data should be read can be programmed.

Fourth Embodiment

The fourth embodiment of the invention relates to improvements when the offset to be added by the DDA 26 is a decimal number, i.e., a number containing a decimal point. Suppose the initial value of variable s is 0 and predetermined interval α is 1.5. In this case, the DDA 26 outputs [0], [1.5], [3.0], [4.5], [6.0], . . . to the network unit 20, thereby designating data elements in the 0th, 1.5th, 3th, 4.5th, 6th, . . . columns.

When the operation result of the DDA 26 is t+β (where t is an integer and β is a proper fraction), a data element in the (t+β)-th column can be calculated according to equation 5.

$$\text{data}[t+\beta] = \beta \times \text{data}[t] + (1-\beta) \times \text{data}[t+1] \qquad \text{(equation 5)}$$

This equation is based on a principle that a data element in the (t+β)-th column is influenced by a data element in the t-th column by β, and is influenced by a data element in the (t+1)-th column by 1−β.

In this embodiment, data[t+β] is read in two steps. In the first step, data[t] in the t-th column of the matrix and coefficient β are read. The multiplier 24 in the ALU multiplies data[t] by β and writes the product β·data[t] to the RF.

In the second step, data[t+1] in the (t+1)-th column of the matrix, coefficient β, and the product β·data[t] are read. In the ALU, the adder 23 computes 1−β, and the multiplier 24 multiplies data[t+1] by 1−β to obtain (1−β)·data[t+1]. The accumulator 25 adds the product β·data[t] and the product (1−β)·data[t+1] together, thereby obtaining β×data[t]+(1−β)×data[t+1].

According to this embodiment, it is possible to read pixel values with an interval such as 1.5 pixels or 3 pixels. This enables filtering described in the second embodiment to be carried out favorably.

Fifth Embodiment

Figure 24:
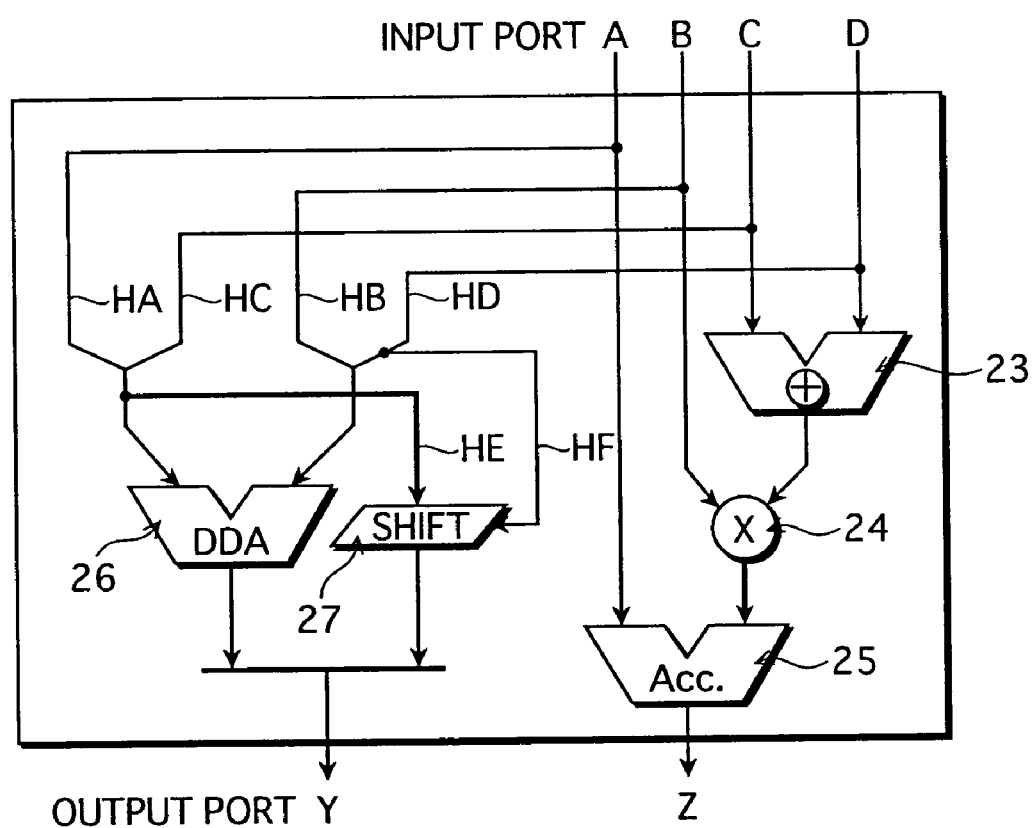
FIG. 24 shows an inner construction of an ALU that includes the DDA and a shifter.

The fifth embodiment of the invention relates to improvements for obtaining a result of filtering described in the second embodiment. FIG. 24 shows an inner construction of a data processor to which this embodiment relates. In the drawing, the adder 23, the multiplier 24, and the accumulator 25 used in the second embodiment and the DDA 26 used in the third embodiment are included in the same ALU. In addition, a shifter 27 is provided in the ALU. The DDA 26 is connected to paths HA, HB, HC, and HD so as to obtain operands input through four input ports A, B, C, and D. The shifter 27 is connected to path HA or HC and path HD via paths HE and HF.

The shifter 27 shifts a summation result of the accumulator 25. This shift is conducted for the following two purposes. The first purpose is to divide the summation result by the number of pixels which have been added. The second purpose is to adjust a decimal point in the summation result. Since a filter coefficient used by the multiplier 24 is a decimal number, a product obtained by the multiplier 24 is a decimal number too. If the accumulator 25 adds up such products, the position of the decimal point in the summation result may change. The shifter 27 shifts the summation result to get the decimal point back to its original position. The shifter 27 shifts a summation result input via path HE by an amount input via path HF, and writes the shift result to the RF. Due to the inclusion of this shifter 27, the following function has been added to the DDA 26.

Figure 25:
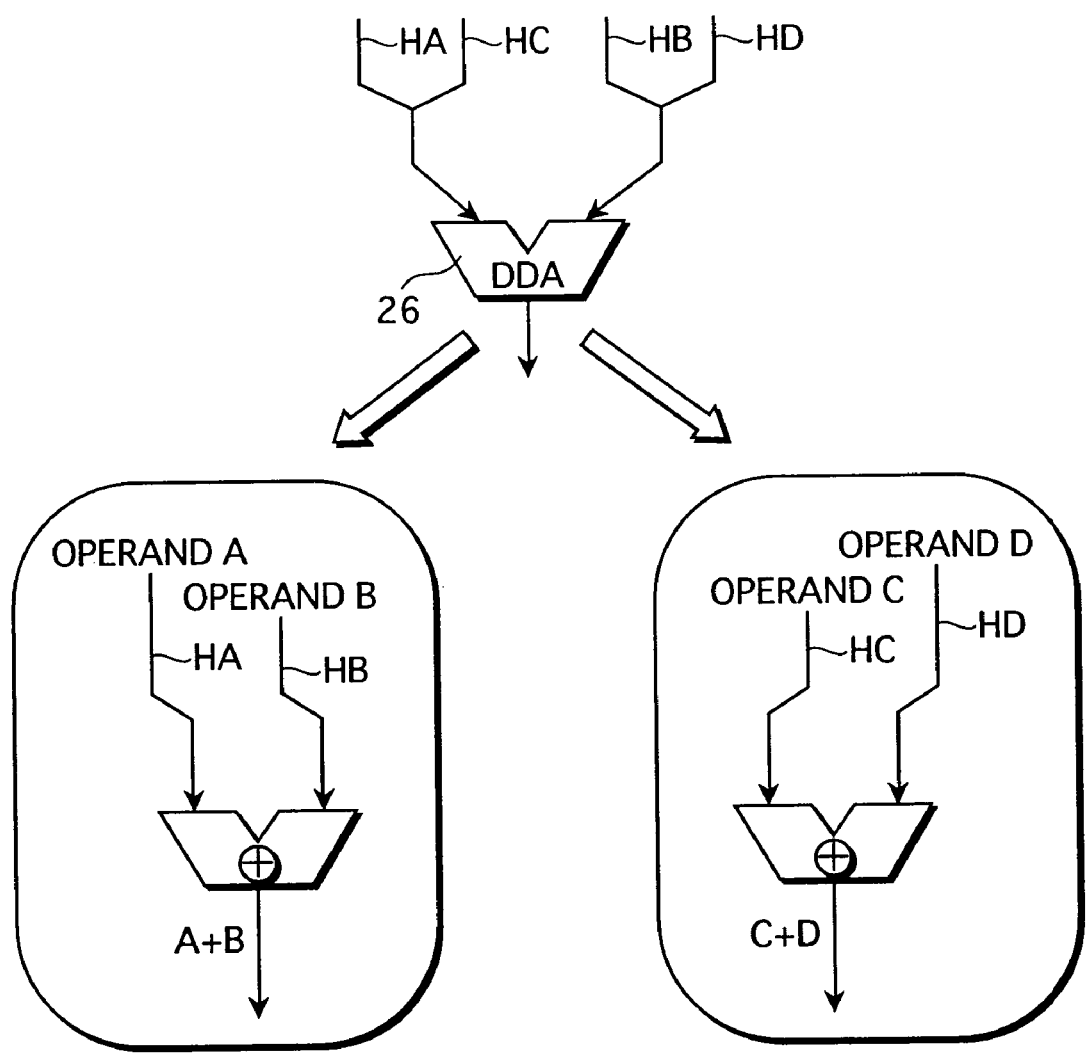
FIG. 25 shows how the DDA functions as a hybrid adder.

In this embodiment, the DDA 26 functions as a hybrid adder. The DDA 26 performs a butterfly operation on the summation result, whose decimal point has been adjusted by the shifter 27, and two constants C1 and C2. A hybrid adder means that one DDA 26 functions as two adders. FIG. 25 shows how the DDA 26 functions as a hybrid adder. As illustrated, the DDA 26 functions as an adder for adding data input via paths HA and HB, and an adder for adding data input via paths HC and HD. With the provision of such a function, the DDA 26 can simultaneously perform two additions.

A butterfly operation is made up of (i) an addition of constant C1 to the decimal point-adjusted summation result and (ii) a subtraction of constant C2 from the decimal point-adjusted summation result (where C2 is obtained by multiplying C1 by a predetermined multiplier factor). Which is to say, the DDA 26 acquires constants C1 and C2 through paths HA and HC, and the summation result through paths HB and HD. The DDA 26 performs a butterfly operation using the summation result and constants C1 and C2, and writes the operation result to the RF.

Such a butterfly operation is essential for orthogonal transformation like a DCT (discrete cosine transform) or a FFT (fast Fourier transform). The construction shown in FIG. 24 makes it easier to perform orthogonal transformation on the result of filtering. Hence image processing can be carried out efficiently.

Here, it is desirable to perform a saturation operation of rounding the summation result to a predetermined range before or after the shift by the shifter 27.

Sixth Embodiment

Figure 26A:
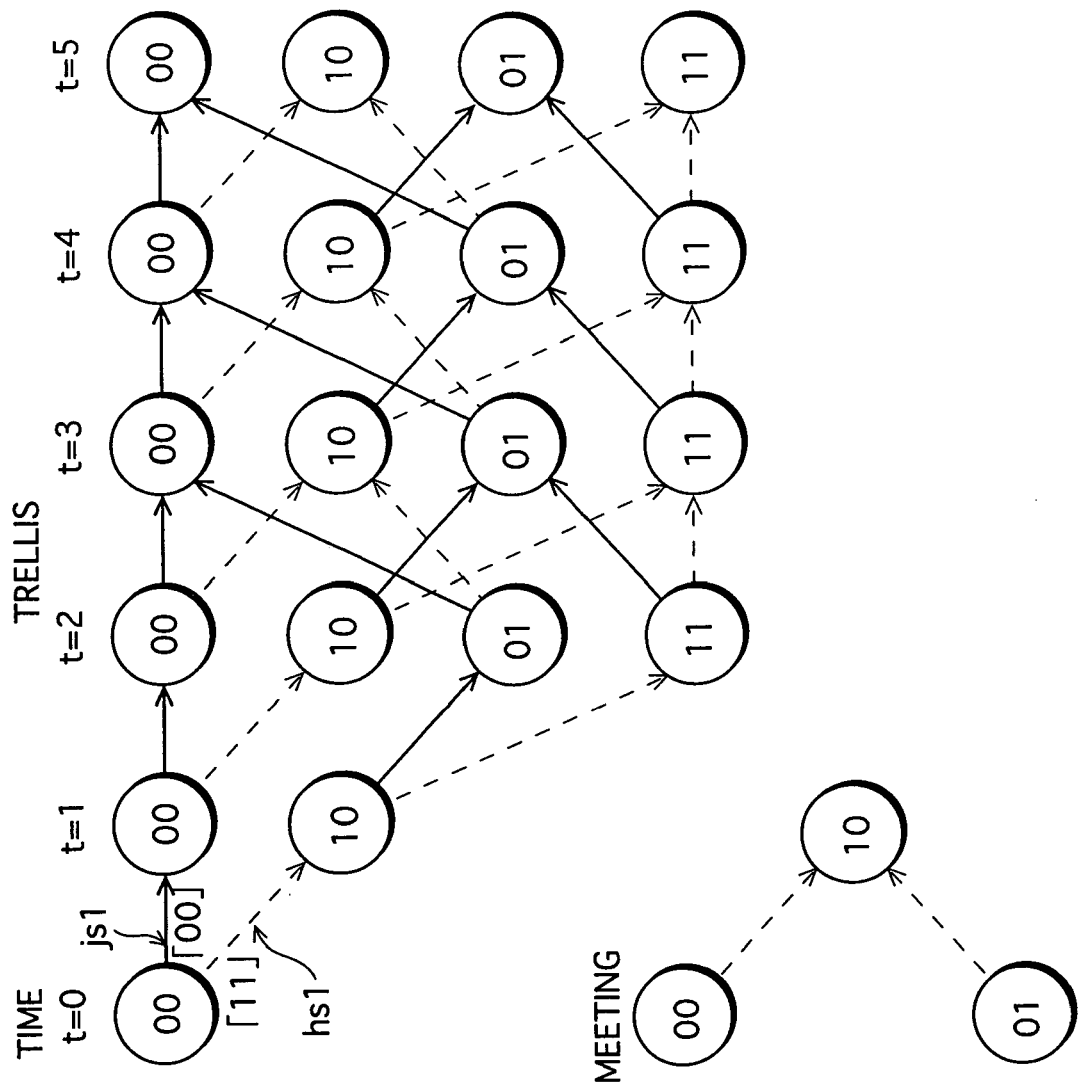
FIG. 26 shows an example trellis.
Figure 26B:
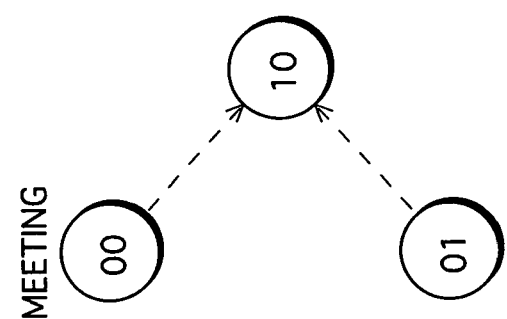

The sixth embodiment of the invention relates to improvements when the data processor described in the first to fifth embodiments is used for Viterbi decoding. Viterbi decoding is achieved through a process of finding an optimal (most likely) information sequence in a trellis. FIG. 26 shows an example trellis. As shown in the drawing, the trellis is made up of concatenations of "stages" that correspond to nodes and "branches" that correspond to edges. A stage represents the inner state of the receiver at time t=0, 1, 2, 3, . . . . . A branch represents a probability of transition to a stage, and is unique to the receiver. In the trellis of FIG. 26, there is only one stage with the value "00" at t=0. At t=1, there are two stages with the values "00" and "10". At t=2, there are four stages with the values "00", "01", "10", and "11". Branch js1 drawn in full line is an input of the value "00" to the receiver. Branch hs1 drawn in broken line is an input of the value "11" to the receiver. The state of the receiver transitions from one stage to another with such a branch as a trigger. A path formed by concatenating stages and branches in the trellis is an information sequence. In Viterbi decoding, an optimal information sequence is selected from a plurality of information sequences which appear in the trellis. This selection is carried out in the following way. As shown in FIG. 26B, the trellis has a number of parts where two branches from two stages meet at one stage. Such meeting points are examined to select the optimal information sequence. Which is to say, a process of selecting a branch/stage which has a greater likelihood out of at least two branches/stages entering the same stage is repeated for all meeting points. In this way, the optimal information sequence is specified. The selection of the information sequence is made by performing an ACS operation on the values of a plurality of stages and branches which enter the same stage. If the sum of a stage and a branch is smaller, they have a greater likelihood. Hence for each of a plurality of stages and branches which enter one stage, the sum of a stage and a branch is calculated (corresponding to the "A(=add)" part of the ACS operation), the sums for the plurality of stages and branches are compared (corresponding to the "C=(compare)" part of the ACS operation), and a stage and a branch with the smallest sum are selected (corresponding to the "S(=select)" part of the ACS operation). This ACS operation is performed on every meeting point, as a result of which an information sequence which concatenates stages and branches with greater likelihoods can be identified.

The following explains how to compare likelihoods in meeting points using the data processor. FIG. 27 shows functional assignments of the data processor when Viterbi decoding is performed. The RFs of PE0 to PE3 are used for storing the values of stages and branches at time t. In detail, the RF of PE0 stores the value of stage g0 at time t and the value of branch b0 which originates from stage g0. The RF of PE1 stores the value of stage g1 at time t and the value of branch b1 which originates from stage g1. Meanwhile, the ALUs of PE0 to PE3 are associated with meeting points at time t+1. The ALU of each of PE0 to PE3 performs an ACS operation for selecting a stage and a branch at time t, for the associated meeting point. In detail, the ALU of PE0 performs an ACS operation to select either stage g0 and branch b0 at time t or stage g1 and branch b1 at time t. The ALU of PE0 performs an ACS operation to select either stage g1 and branch b1 at time t or stage g2 and branch b2 at time t. The ALU of PE2 performs an ACS operation to select either stage g2 and branch b2 at time t or stage g3 and branch b3 at time t.

The network unit 20 transfers data from the RFs which store the stages and branches at time t to the ALUs which are associated with the meeting points at time t+1, according to the trellis.

By assigning the functions shown in FIG. 27 to the RFs, the network unit 20, and the ALUs, the optimal path can be favorably selected in Viterbi decoding.

Figure 28:
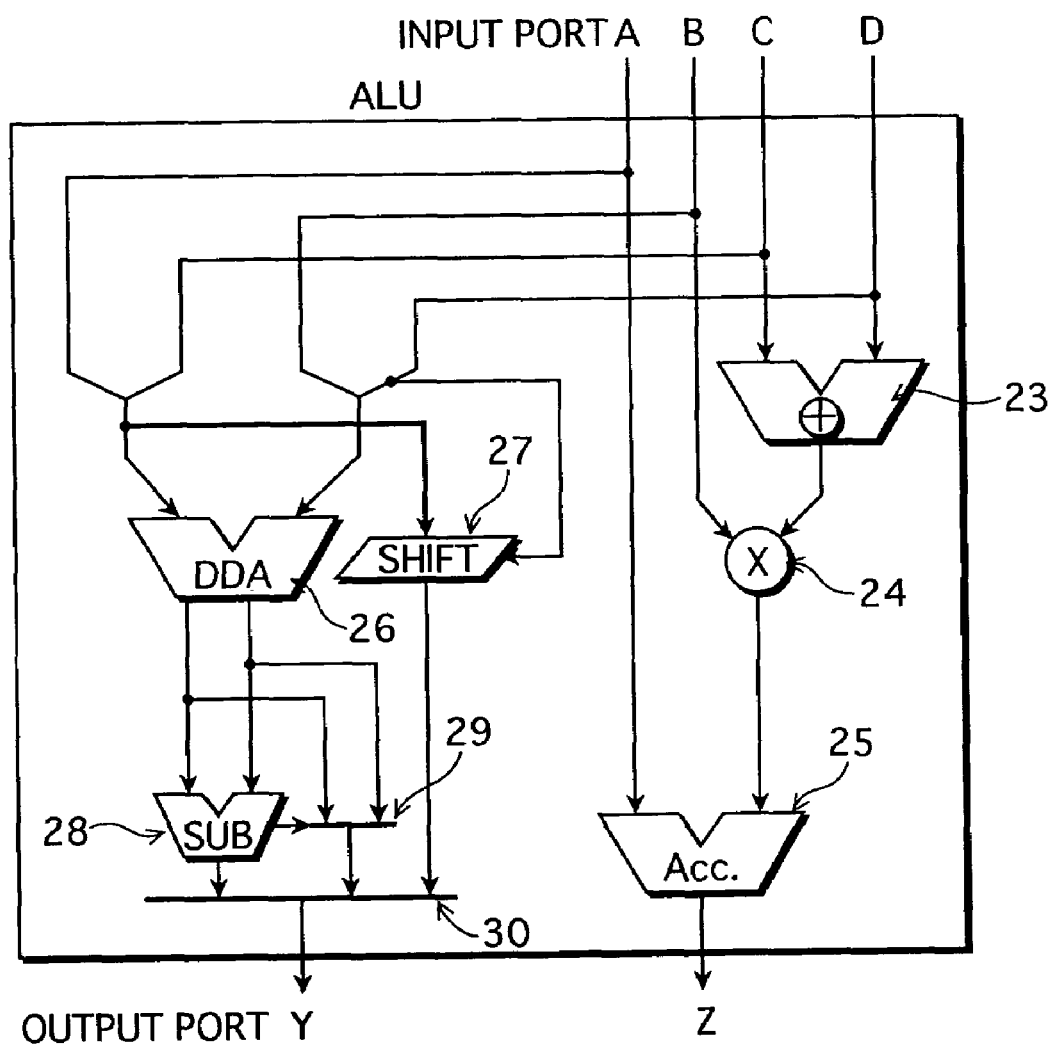
FIG. 28 shows an inner construction of an ALU for favorably performing an ACS (add compare select) operation.

FIG. 28 shows an inner construction of an ALU for favorably performing an ACS operation in this embodiment. In the drawing, the ALU includes the adder 23, the multiplier 24, the accumulator 25, the DDA 26, and the shifter 27 shown in FIG. 24, and newly includes a subtractor 28 and selectors 29 and 30.

The DDA 26 of this embodiment has the following function. The DDA 26 implements the "add" part of the ACS operation. As mentioned in the fifth embodiment, the DDA 26 has a hybrid adder function of simultaneously performing two additions. This being so, the DDA 26 simultaneously performs an addition of a stage and a branch stored in the RF of the same PE and an addition of a stage and a branch transferred from the RF of another PE via the network unit 20.

The subtractor 28 implements the "compare" part of the ACS operation. In other words, the subtractor 28 subtracts one sum from the other sum.

The selector 29 implements the "select" part of the ACS operation. In detail, the selector 29 selectively outputs the larger sum or the smaller sum, based on the subtraction result of the subtractor 28.

The selector 30 selectively outputs the subtraction result of the subtractor 28 or the output of the selector 29.

According to this embodiment, the selection of an information sequence in Viterbi decoding can be favorably carried out using the data processor described in the first to fifth embodiments. Therefore, the data processor can be used for media processing in communication systems. This widens the range of uses of the data processor.

Seventh Embodiment

Figure 29:
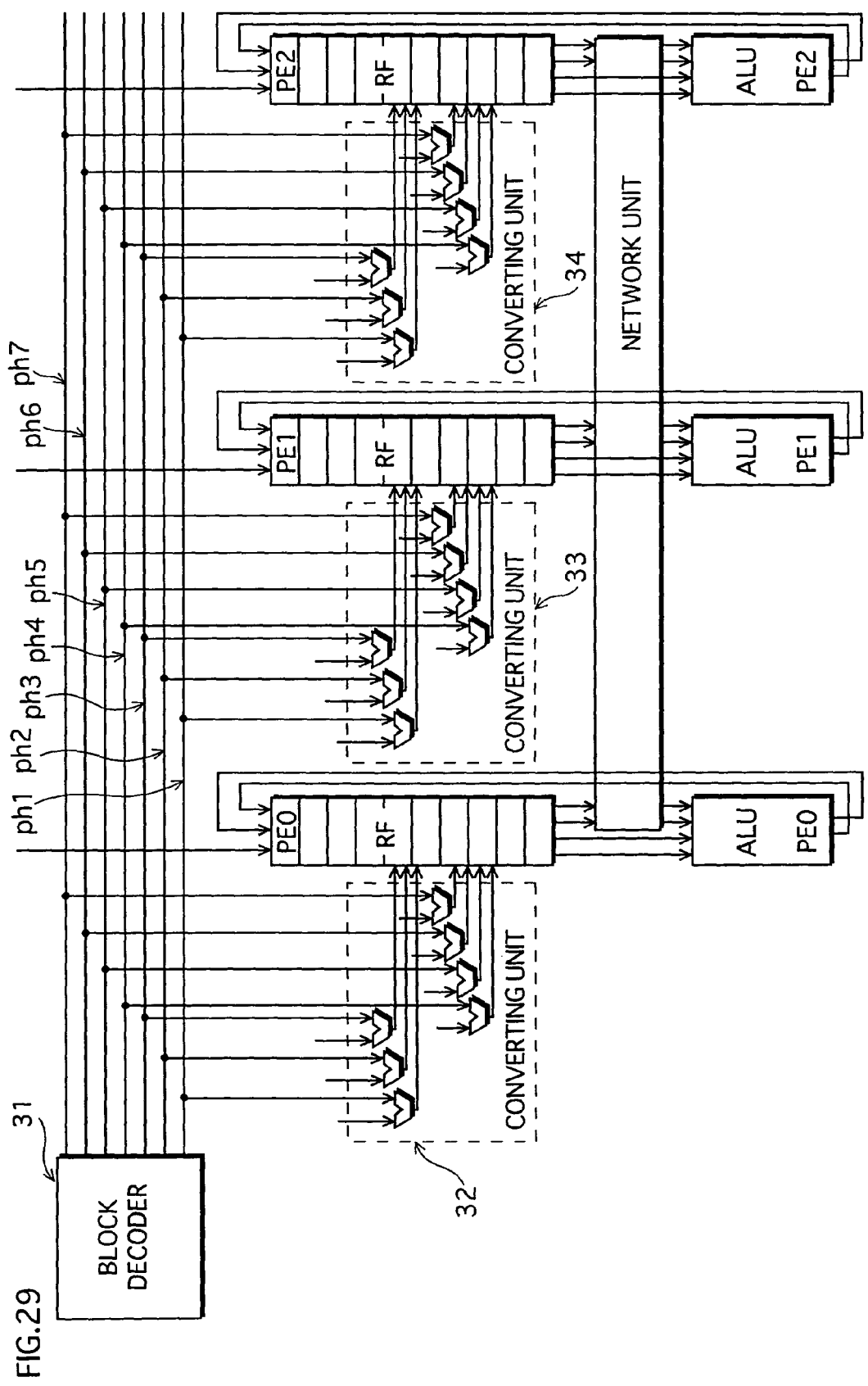
FIG. 29 shows RFs to which a block decoder and converting units are connected.

The seventh embodiment of the invention relates to a technique of executing reads/writes of the RFs of the plurality of PEs according to one common instruction. FIG. 29 shows an inner construction of a data processor to which this embodiment relates. In the drawing, the data processor newly includes a block decoder 31 and converting units 32, 33, and 34.

The block decoder 31 executes reads/writes in the RFs of PE0 to PE15, according to an instruction having the following format:

op code: src1, src2, src3, src4, dst1, dst2, dst3

"src" indicates a designation of a maximum of four registers from which data should be read, while "dst" indicates a designation of a maximum of three registers to which data should be written. The identification numbers r0 to r15 of the sixteen registers in each RF are used for these designations. In FIG. 29, paths ph1, ph2, ph3, ph4, ph5, ph6, and ph7 are connecting lines for transferring the numbers of the four read target registers and three write target registers.

Figure 30:
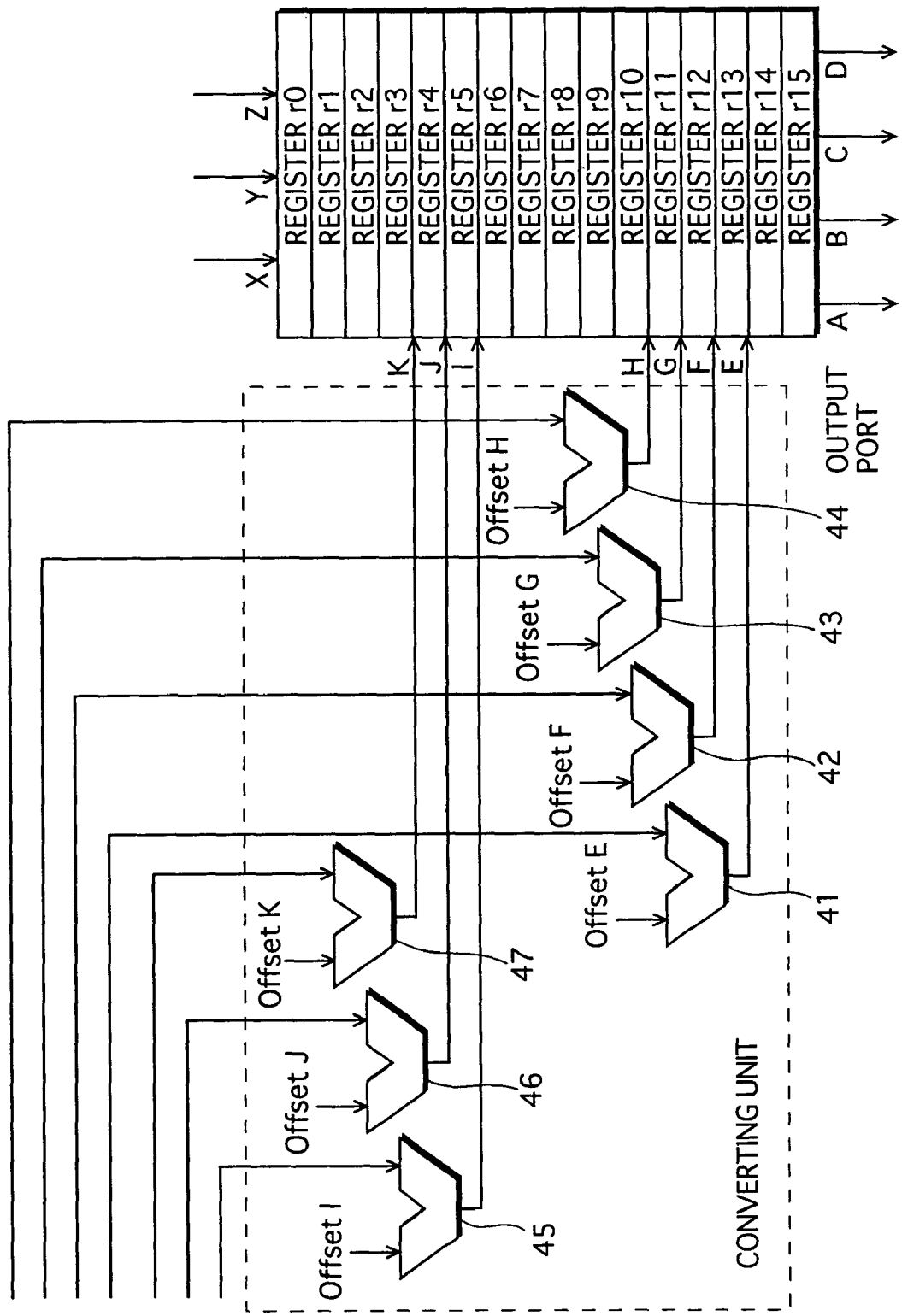
FIG. 30 shows an inner construction of a converting unit connected to the RF of PE0.

The converting units 32, 33, and 34 convert the register numbers sent through paths ph1, ph2, ph3, ph4, ph5, ph6, and ph7 and output the results to the RFs of PE0, PE1, and PE2 respectively. FIG. 30 shows an inner construction of the converting unit 32. The converting unit 32 has adders 41, 42, 43, and 44 corresponding to read designation ports E, F, G, and H of the RF of PE0. The adders 41, 42, 43, and 44 respectively add offsets E, F, G, and H unique to PE0 to register numbers output from the block decoder 31, and output the sums to read designation ports E, F, G, and H. Though for the sake of convenience FIG. 29 shows an example where the converting units 32, 33, and 34 are connected to PE0 to PE2, it should be obvious that a converting unit may be connected to the RF of every PE.

The converting unit 32 also has adders 45, 46, and 47 corresponding to write designation ports I, J, and K. The adders 45, 46, and 47 respectively add offsets I, J, and K unique to PE0 to register numbers output from the block decoder 31, and output the sums to write designation ports I, J, and K.

Thus, each converting unit adds offsets unique to the corresponding PE to register numbers output from the block decoder 31 and outputs the sums to ports E to K of the RF of the PE. Hence data can be read/written from/to registers which are designated by the sum of data specified by the decoding result of the block decoder 31 and offsets unique to input ports.

According to this embodiment, reads/writes in the RFs of the sixteen PEs is controlled by a single instruction. This allows the data processor to be used as a SIMD (single instruction multiple data) processor.

Note that the offsets used by the adders 41 to 47 may be set by the block decoder 31 according to an externally-supplied instruction. In this way, it is possible to program the conversions performed by the converting units.

Eighth Embodiment

The data processor described in the first to seventh embodiments has such a construction that the ALU of each PE is connected in series with the RF of the same PE which stores sixteen data elements that constitute one column. This construction allows an operation of adding sixteen data elements in the column (vertical) direction to be efficiently performed. However, this construction is not particularly suitable to an operation of adding sixteen data elements in the row (horizontal) direction (i.e., adding data elements across columns). This embodiment facilitates such an addition of data elements in the row direction within the limitations of the circuit construction of the preceding embodiments.

To achieve a row-direction addition, the RF of each PE needs to output data elements in the following manner.

PEi reads a data element from register j in cycle k, according to equation 6:

$$j = mod((i+k-1)/n) \qquad \text{(equation 6)}$$

Since an explanation on a matrix with 16 rows and 16 columns is complex, the following explanation takes an example of performing a row-direction addition on a matrix with four rows and four columns, for the sake of simplicity.

Figure 31:
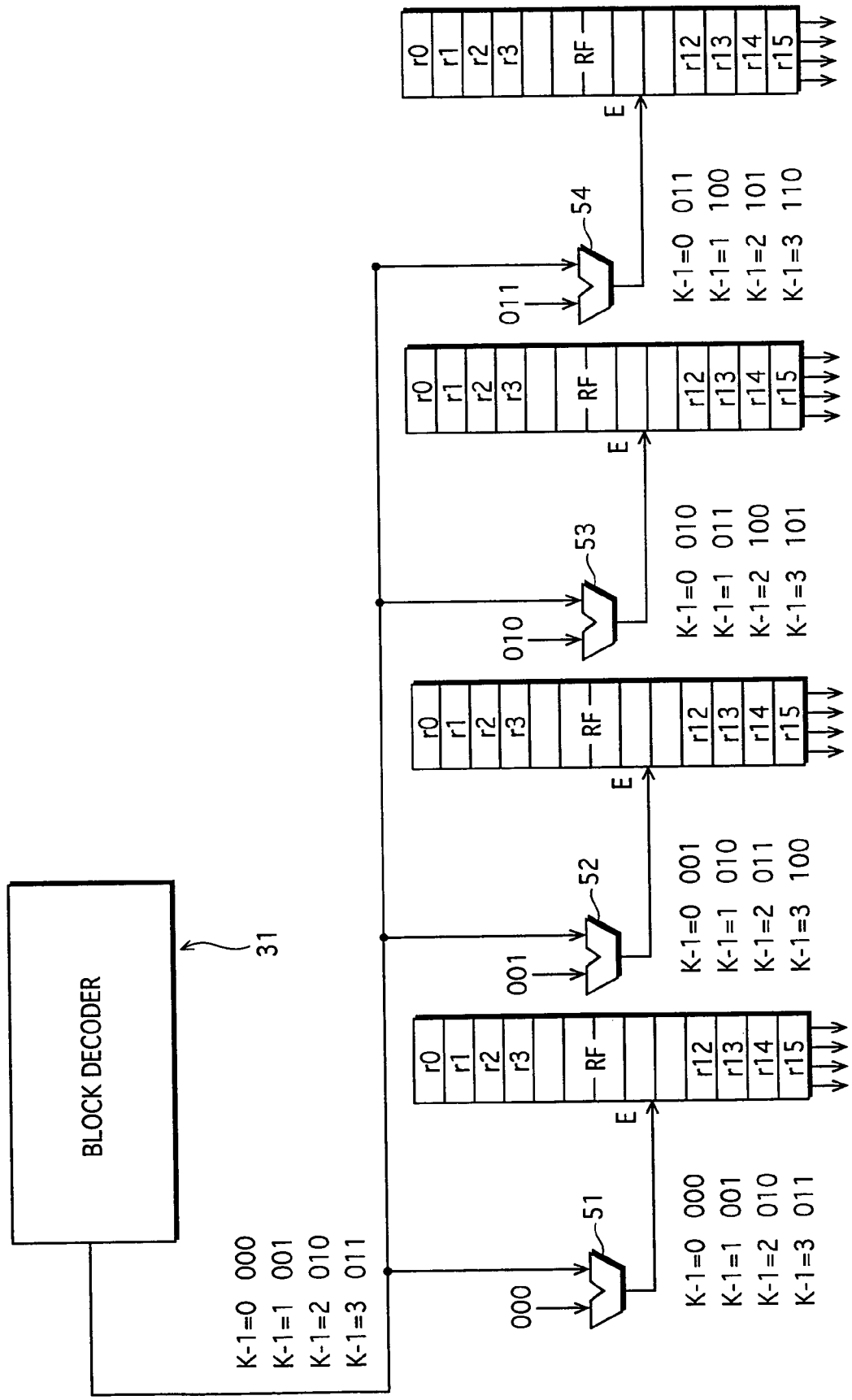
FIG. 31 shows an inner construction of a data processor to which the eighth embodiment of the invention relates.

FIG. 31 shows an inner construction of a data processor to which this embodiment relates. The drawing shows only those construction elements of the data processor which are necessary for performing a row-direction addition. As illustrated, a row-direction addition is conducted by the block decoder 31 and adders 51, 52, 53, and 54 for read ports E of the RFs of PE0 to PE3. The block decoder 31 of this embodiment decodes an instruction to perform a row-direction addition, and outputs a 3-bit value representing variable k−1 in cycle k.

The adders 51 to 54 are included in converting units that are connected to the RFs of PE0 to PE3. Each of the adders 51 to 54 adds a 3-bit offset to 3-bit variable k−1 output from the block decoder 31, and outputs the lower 2 bits of the sum to read designation port E of the RF of the corresponding PE.

The adders 51 to 54 shown in FIG. 31 have the same construction but use different offsets. In detail, the offsets of the adders 51 to 54 are 000, 001, 010, and 011 respectively.

Figures 32A, 32B, 32C, 32D:
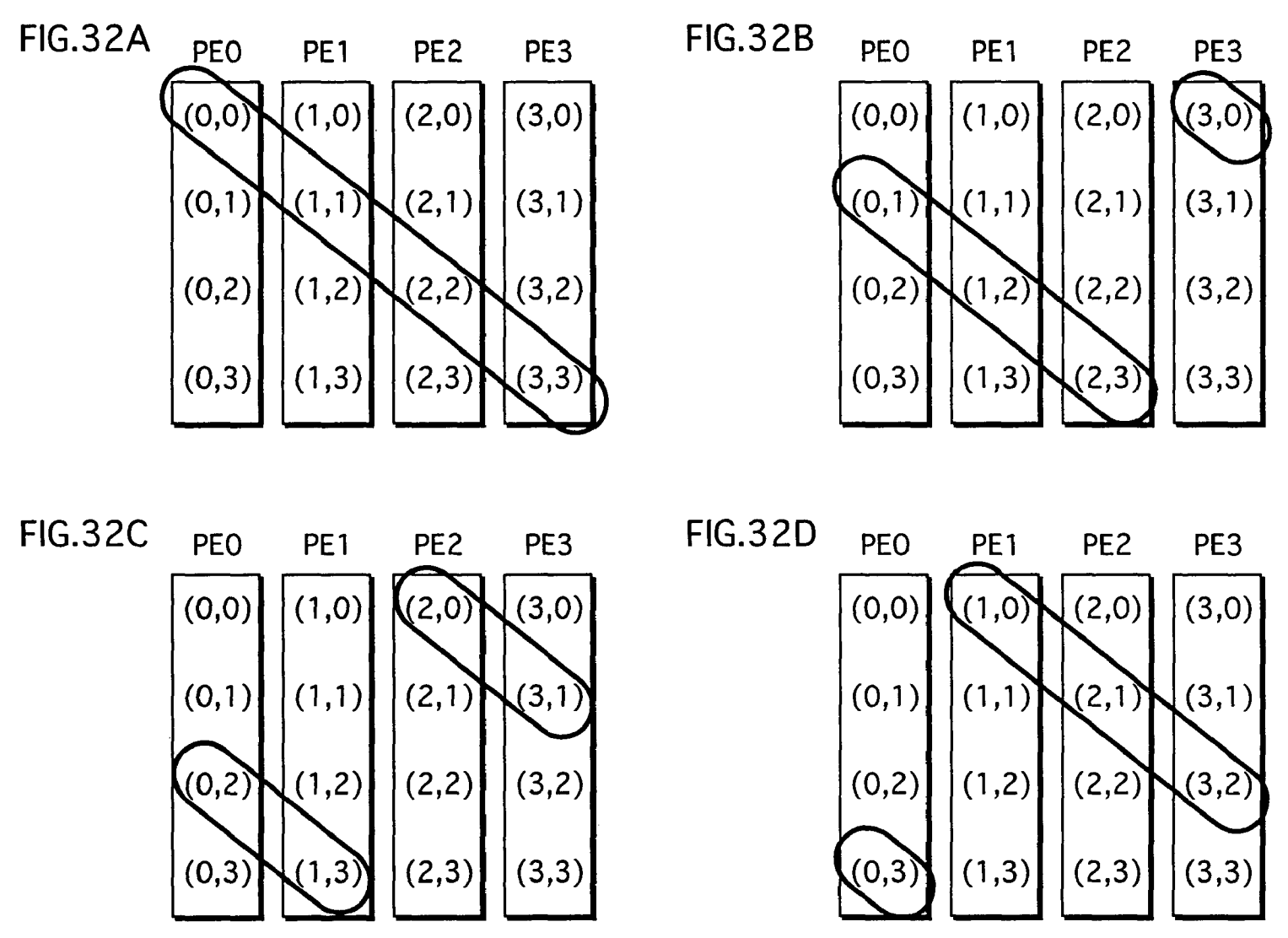

FIG. 32 shows how the outputs of the adders 51 to 54 change when the decoding result of the block decoder 31 changes as k−1=0, 1, 2, 3. FIG. 32 shows read target registers in the RFs of PE0 to PE3. When the block decoder 31 outputs k−1=0, the adders 51 to 54 respectively yield 000, 001, 010, and 011, and output the lower 2 bits of them to read designation ports E of the RFs of PE0 to PE3. As a result, the registers enclosed by the thick circle in FIG. 32A are designated as the read target registers. When the block decoder 31 outputs k−1=1, the adders 51 to 54 respectively yield 001, 010, 011, and 100, and output the lower 2 bits of them to read designation ports E. As a result, the registers enclosed by the thick circles in FIG. 32B are designated as the read target registers. When the block decoder 31 outputs k−1=2, the adders 51 to 54 respectively yield 010, 011, 100, and 101, and output the lower 2 bits of them to read designation ports E. As a result, the registers enclosed by the thick circles in FIG. 32C are designated as the read target registers. When the block decoder 31 outputs k−1=3, the adders 51 to 54 respectively yield 011, 100, 101, and 110, and output the lower 2 bits of them to read designation ports E. As a result, the registers enclosed by the thick circles in FIG. 32D are designated as the read target registers.

The first selector 21 outputs a data element read from register j in the RF of PEi in cycle k to the ALU of PEj, according to equation 7:

$$j = mod((i+k-1)/n) \quad \text{(equation 7)}$$

When k−1=0, the first selector 21 outputs the data elements read from the RFs of PE0, PE1, PE2, and PE3 to the ALUs of PE0, PE1, PE2, and PE3 respectively. When k−1=1, the first selector 21 outputs the data elements read from the RFs of PE3, PE0, PE1, and PE2 to the ALUs of PE0, PE1, PE2, and PE3 respectively. When k−1=2, the first selector 21 outputs the data elements read form the RFs of PE2, PE3, PE0, and PE1 to the ALUs of PE0, PE1, PE2, and PE3 respectively. When k−1=3, the first selector 21 outputs the data elements read from the RFs of PE1, PE2, PE3, and PE0 to the ALUs of PE0, PE1, PE2, and PE3 respectively.

FIG. 33 shows an operation of the data processor having the above construction. FIG. 33A relates to when k−1=0, FIG. 33B relates to when k−1=1, FIG. 33C relates to when k−1=2, and FIG. 33D relates to when k−1=3.

Figure 33A:
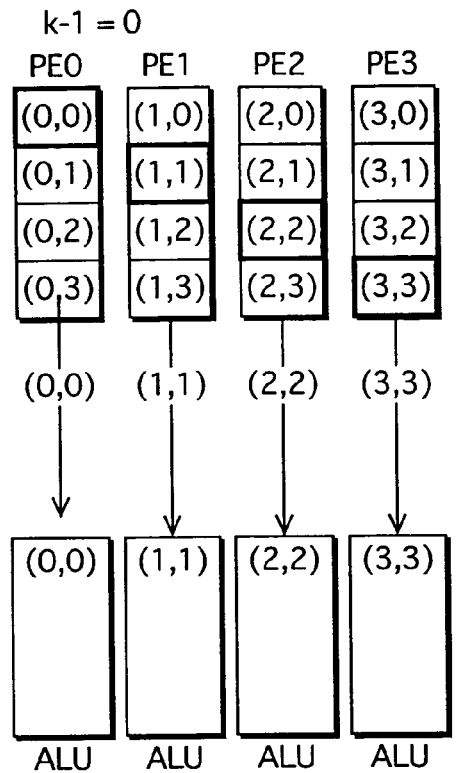
FIG. 33 shows a procedure of the data processor when performing a row-direction addition.

Let i=0, 1, 2, 3. When k−1=0 (cycle 1), (i,j)=(0,0), (1,1), (2,2), (3,3). Accordingly, data(0,0) stored in register r0 in the RF of PE0, data(1,1) stored in register r1 in the RF of PE1, data(2,2) stored in register r2 in the RF of PE2, and data(3,3) stored in register r3 in the RF of PE3 are read as shown in FIG. 33A. The first selector 21 outputs data(0,0), data(1,1), data(2,2), and data(3,3) read from the RFs of PE0 to PE3 to the ALUs of PE0 to PE3, respectively.

Figure 33B:
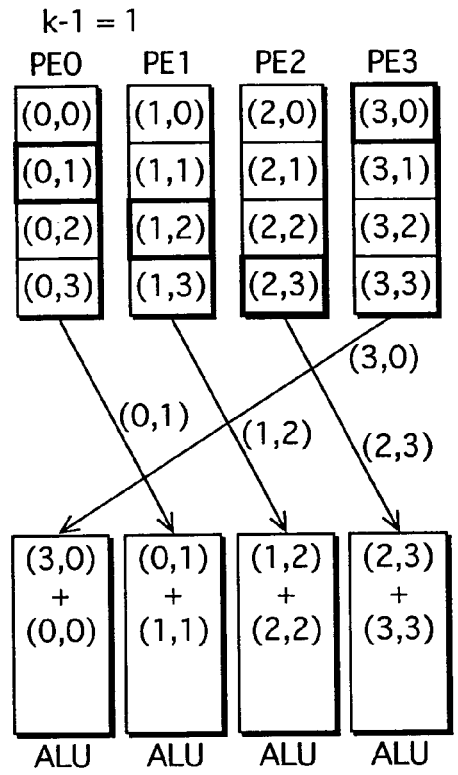

When k−1=1 (cycle 2), data(0,1) stored in register r1 in the RF of PE0, data(1,2) stored in register r2 in the RF of PE1, data(2,3) stored in register r3 in the RF of PE2, and data(3,0) stored in register r0 in the RF of PE3 are read as shown in FIG. 33B. The first selector 21 outputs data(3,0) read from the RF of PE3 to the ALU of PE0, data(0,1) read from the RF of PE0 to the ALU of PE1, data(1,2) read from the RF of PE1 to the ALU of PE2, and data(2,3) read from the RF of PE2 to the ALU of PE3. The ALUs of PE0 to PE3 add data(3,0), data(0,1), data(1,2), and data(2,3) respectively to data(0,0), data(1,1), data(2,2), and data(3,3) read in cycle 1.

Figure 33C:
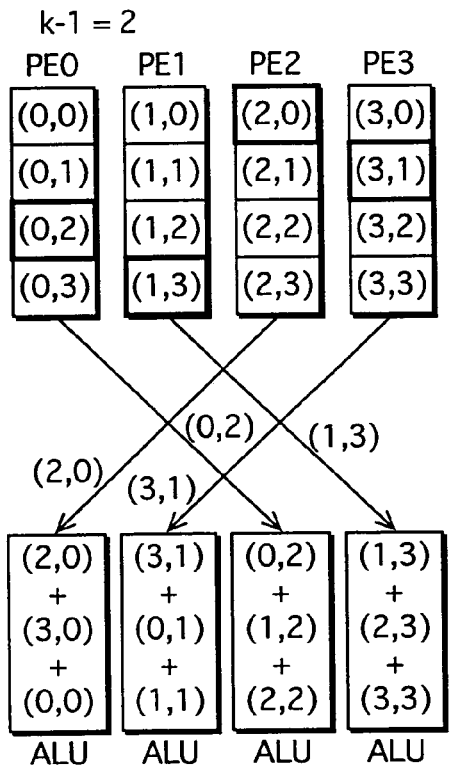

When k−1=2 (cycle 3), data(0,2) stored in register r2 in the RF of PE0, data(1,3) stored in register r3 in the RF of PE1, data(2,0) stored in register r0 in the RF of PE2, and data(3,1) stored in register r1 in the RF of PE3 are read as shown in FIG. 33C. The first selector 21 outputs data(2,0) read from the RF of PE2 to the ALU of PE0, data(3,1) read from the RF of PE3 to the ALU of PE1, data(0,2) read from the RF of PE0 to the ALU of PE2, and data(1,3) read from the RF of PE1 to the ALU of PE3. The ALUs of PE0 to PE3 add data(2,0), data(3,1), data(0,2), and data(1,3) respectively to data(3,0)+data(0,0), data(0,1)+data(1,1), data(1,2)+data(2,2), and data(2,3)+data(3,3).

Figure 33D:
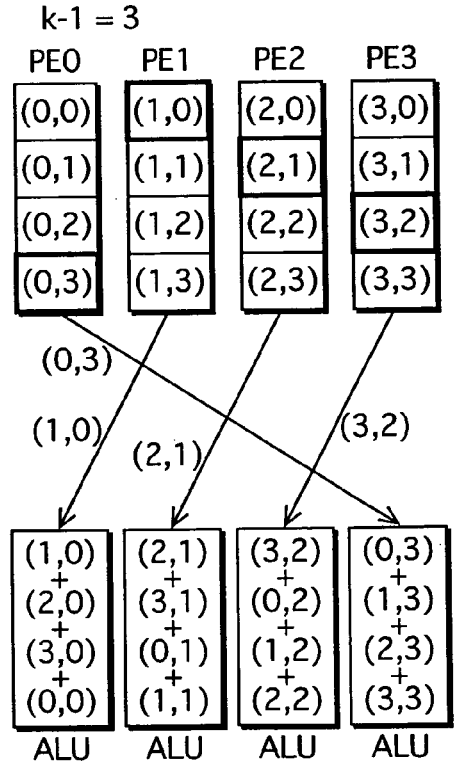

When k−1=3 (cycle 4), data(0,3) stored in register r3 in the RF of PE0, data(1,0) stored in register r0 in the RF of PE1, data(2,1) stored in register r1 in the RF of PE2, and data(3,2) stored in register r2 in the RF of PE3 are read as shown in FIG. 33D. The first selector 21 outputs data(1,0) read from the RF of PE1 to the ALU of PE0, data(2,1) read from the RF of PE2 to the ALU of PE1, data(3,2) read from the RF of PE3 to the ALU of PE2, and data(0,3) read from the RF of PE0 to the ALU of PE3. The ALUs of PE0 to PE3 add data(1,0), data(2,1), data(3,2), and data(0,3) respectively to data(2,0)+data(3,0)+data(0,0), data(3,1)+data(0,1)+data(1,1), data(0,2)+data(1,2)+data(2,2), and data(1,3)+data(2,3)+data(3,3). In this way, the ALU of PE0 computes the sum of data(0,0), data(3,0), data(2,0), and data(1,0), the ALU of PE1 computes the sum of data(1,1), data(0,1), data(3,1), and data(2,1), the ALU of PE2 computes the sum of data(2,2), data(1,2), data(0,2), and data(3,2), and the ALU of PE3 computes the sum of data(3,3), data(2,3), data(1,3), and data(0,3).

According to this embodiment, an operation of adding up data elements in the row direction can be conducted at high speed, through the use of the network unit 20 described in the first to seventh embodiments.

Though this embodiment describes the case where a row-direction addition is performed on a 4 by 4 matrix for the sake of simplicity, a row-direction addition can equally be performed on a 16 by 16 matrix according to the following modification.

To perform a row-direction addition for all of sixteen registers r0 to r15, each register number input to read designation port E need be expressed by 4 bits (0000 to 1111). This being so, each offset is expressed by 5 bits. Variable k−1 output from the block decoder 31 is expressed by 5 bits too. Which is to say, the lower 4 bits of the sum of the 5-bit offset and 5-bit variable k−1 are output to read designation port E as variable j of equation 6.

The first selector 21 outputs a data element read from the RF of PEi in cycle k to the ALU of PEj, according to equation 7.

The ALU of each of PE0 to PE15 adds up data elements output from the first selector 21. In this way, a row-direction addition is conducted using the sixteen registers of each of the sixteen PEs.

Ninth Embodiment

The ninth embodiment of the invention relates to improvements when a transpose of a matrix is generated. In media processing, there are some instances where a transpose of a matrix, i.e., another matrix obtained by turning rows into columns and vice versa, is necessary. To achieve such a transposition by hardwiring between registers, enormous wiring that amounts to the product of multiplying the number of registers in one RF by the number of PEs is necessary. In view of this, this embodiment aims to produce a matrix transpose by a small circuit scale, through the use of the construction described in the preceding embodiments. Here, since an explanation on a matrix with 16 rows and 16 columns is complex, the following explanation takes an example of transposing a matrix with four rows and four columns as in the eighth embodiment, for the sake of simplicity.

A transpose of a matrix is generated by replacing all elements (i,j) in the ith column and jth row with elements (j,i) in the j-th column and i-th row. In this embodiment, i and j are determined according to equation 8:

$$j = mod((k+i)/n) \quad \text{(equation 8)}$$

where k is an ordinal number of a current cycle in transposition.

A transposition is carried out in the following manner. First, data(i,j) stored in register j of PEi and data(j,i) stored in register i of PEj are simultaneously read and output to the first selector 21 and the second selector 22. Data(i,j) is written to register i of PEj, whereas data(j,i) is written to register j of PEi.

Figure 34:
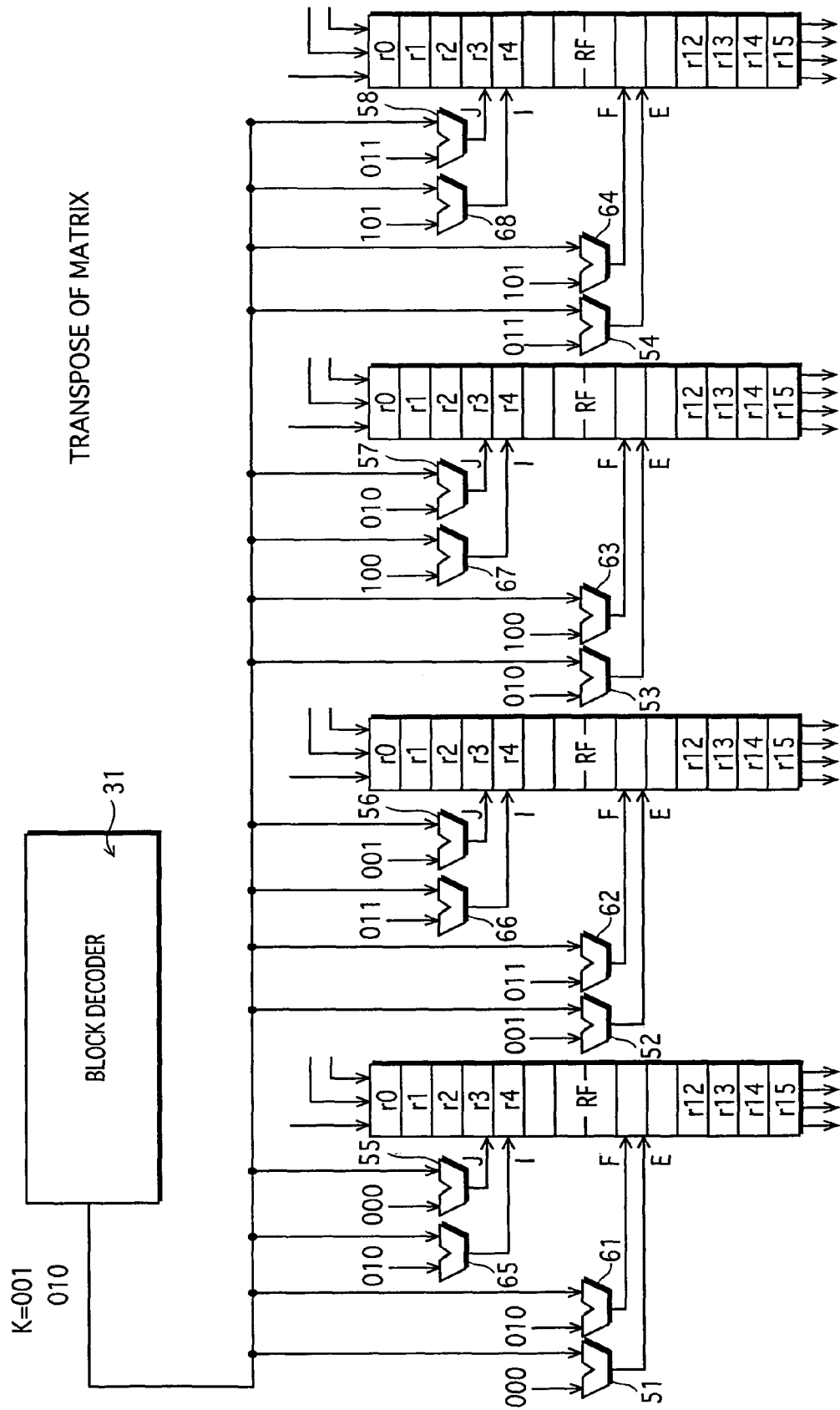
FIG. 34 shows an inner construction of a data processor for performing a transposition of a matrix.

FIG. 34 shows only the construction elements of the data processor that are necessary for a transposition. Like the one shown in FIG. 31, this data processor includes the block decoder 31 and the adders 51, 52, 53, and 54 for read designation ports E of the RFs of PE0 to PE3. This data processor, however, differs from the one shown in FIG. 31 in that adders 55, 56, 57, and 58 for write designation ports J, adders 61, 62, 63, and 64 for read designation ports F, and adders 65, 66, 67, and 68 for write designation ports I are newly included.

The block decoder 31 of this embodiment decodes an instruction to perform a matrix transposition, and outputs a 3-bit value representing variable k in cycle k.

The adders 51 to 54 each add a 3-bit offset to 3-bit variable k output form the block decoder 31 and output the lower 2 bits of the sum to read designation port E, as in the eighth embodiment. The offsets of the adders 51 to 54 are 000, 001, 010, and 011 respectively.

The adders 55 to 58 each add a 3-bit offset to 3-bit variable k output from the block decoder 31 and output the lower 2 bits of the sum to write designation port J, in the same way as the adders 51 to 54. The offsets of the adders 55 to 58 are 000, 001, 010, and 011 respectively, which are the same as those of the adders 51 to 54.

The adders 61 to 64 each add a 3-bit offset to 3-bit variable k output from the block decoder 31 and output the lower 2 bits of the sum to read designation port F, in the same way as the adders 51 to 54. The offsets of the adders 61 to 64 are 010, 011, 100, and 011 respectively, which are different from those of the adders 51 to 54.

The adders 65 to 68 each add a 3-bit offset to 3-bit variable k output from the block decoder 31 and output the lower 2 bits of the sum to write designation port I, in the same way as the adders 51 to 54. The offsets of the adders 65 to 68 are 010, 011, 100, and 101 respectively, which are the same as those of the adders 61 to 64.

The following explains how the outputs of the adders 51 to 54 and the outputs of the adders 55 to 58 change when the decoding result of the block decoder 31 changes as k=1, 2, with reference to FIGS. 35 and 36. FIG. 35 shows changes in output of the adders as variable k changes. FIG. 36 shows the read target registers in the RFs of PE0 to PE3 in response to the changes in output of the adders.

Figures 36A, 36B, 36C:
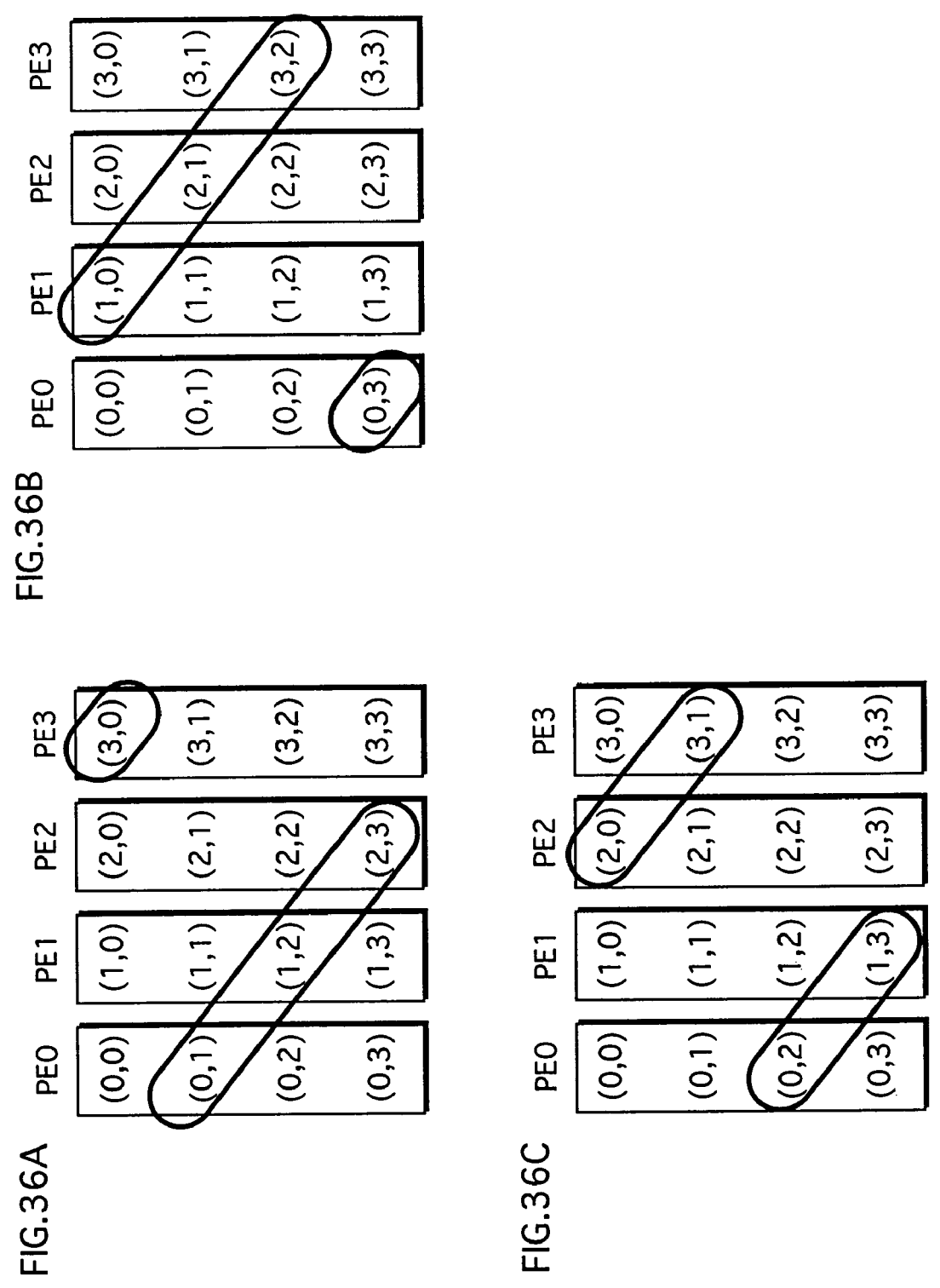

When the block decoder 31 outputs k=1, the adders 51 to 54 and the adders 55 to 58 both yield 001, 010, 011, and 100. As a result, the registers enclosed by the thick circles in FIG. 36A are designated as the read target registers.

In the meantime, the adders 61 to 64 and the adders 65 to 68 both yield 011, 100, 101, and 110. As a result, the registers enclosed by the thick circles in FIG. 36B are designated as the read target registers. When k=2, the adders 51 to 54 and the adders 55 to 58 both yield 010, 011, 100, and 101, so that the registers enclosed by the thick circles in FIG. 36C are designated as the read target registers.

An operation of the data processor having the above construction is explained below, with reference to FIGS. 37 and 38.

The following explains how j is set when k=1 (cycle 1), with reference to FIG. 37. When k=1 and i=0, 1, 2, 3, the adders 51 to 54 yield 001, 010, 011, and 100, according to equation 8. Hence data(0,1), data(1,2), data(2,3), and data(3,0) are read respectively from the RFs of PE0 to PE3 and output to the first selector 21, as shown in FIG. 37A. Meanwhile, when k=1 and i=0, 1, 2, 3, the adders 61 to 64 yield 011, 100, 101, and 110. Hence data(0,3), data(1,0), data(2,1), and data(3,2) are read respectively from the RFs of PE0 to PE3 and output to the second selector 22, as shown in FIG. 37B.

Figure 37A:
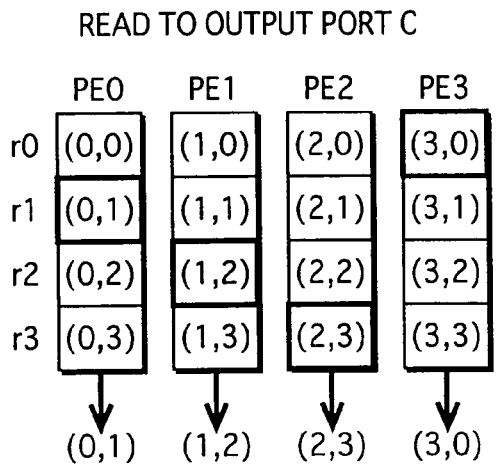
FIG. 37 shows a procedure of the data processor for transposing a matrix.
Figure 37B:
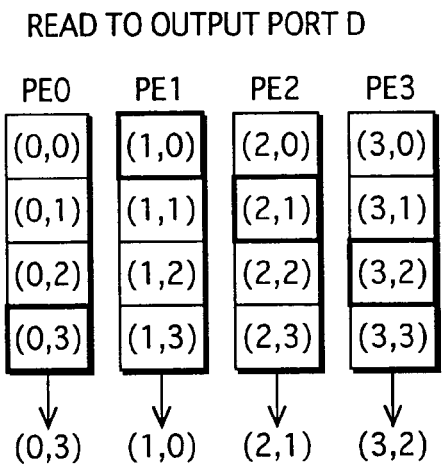
Figures 37C, 37D:
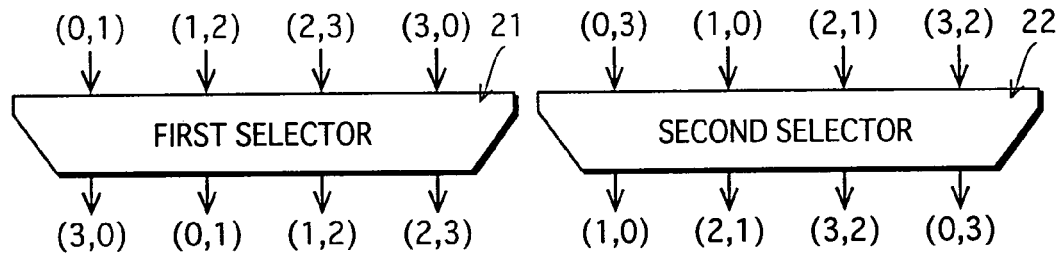

The first selector 21 rearranges the data elements read from the RFs of PE0 to PE3 and outputs them to the ALUs of PE0 to PE3, as shown in FIG. 37C. This is done by changing the data element arrangement based on variable i to the data element arrangement based on variable j. The first selector 21 outputs data(0,1) read from PE0 to PE1, data(1, 2) read from PE1 to PE2, data(2,3) read from EP2 to PE3, and data(3,0) read from PE3 to PE0.

Meanwhile, the data elements output to the second selector 22 are (j,i) and are arranged based on variable j. The second selector 22 rearranges these data elements read from the RFs of PE0 to PE3 based on variable i, as shown in FIG. 37D. The second selector 22 outputs data(0,3) read from PE0 to PE3, data(1,0) read from PE1 to PE0, data(2,1) read from PE2 to PE1, and data(3,2) read from PE3 to PE2.

Figure 37E:
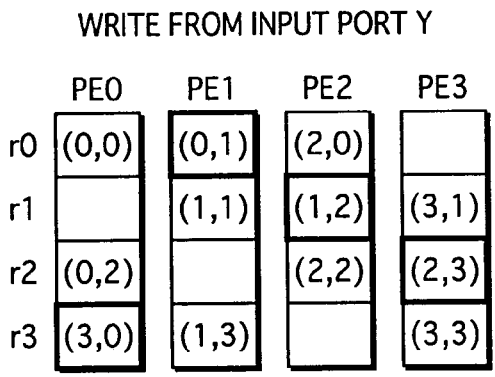
Figure 37F:
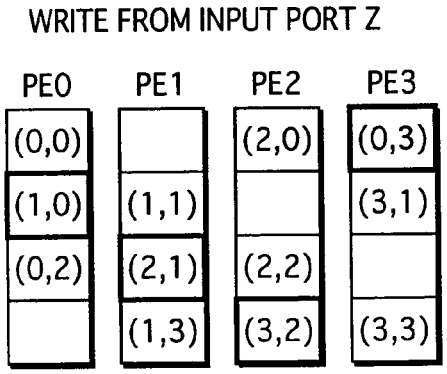

The RFs of PE0 to PE3 write the data elements output from the first selector 21 and the second selector 22, in accordance with the outputs of the adders 55 to 58 and 65 to 68. Data(3,0) output from the first selector 21 is written to register r3 in the RF of PE0, data(0,1) output from the first selector 21 is written to register r0 in the RF of PE1, data(1,2) output form the first selector 21 is written to register r1 in the RF of PE2, and data(2,3) output from the first selector 21 is written to register r2 in the RF of PE3, as shown in FIG. 37E. Also, data(1,0) output from the second selector 22 is written to register r1 in the RF of PE0, data(2,1) output from the second selector 22 is written to register r2 in the RF of PE1, data(3,2) output from the second selector 22 is written to register r3 in the RF of PE2, and data(0,3) output from the second selector 22 is written to register r0 in the RF of PE3, as shown in FIG. 37F.

Figures 38A, 38B, 38C, 38D:
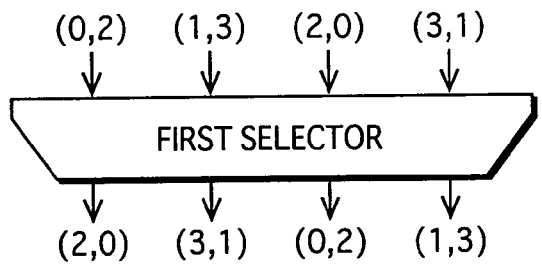
FIG. 38 shows a procedure of the data processor for transposing a matrix.

Next explains how j is set when k=2 (cycle 2), with reference to FIG. 38. FIG. 38A shows the storage contents of the RFs of PE0 to PE3 as a result of the transposition process at k=1. This being the case, when k=2 and i=0, 1, 2, 3, the adders 51 to 54 yield 010, 011, 100, and 101. Accordingly, data(0,2) stored in register r2 in the RF of PE0, data(1,3) stored in register r3 in the RF of PE1, data(2,0) stored in register r0 in the RF of PE2, and data(3,1) stored in register r1 in the RF of PE3 are read and output to the first selector 21, as shown in FIG. 38B.

The first selector 21 rearranges data(0,2), data(1,3), data (2,0), and data(3,1) to data(2,0), data(3,1), data(0,2), and data(1,3), as shown in FIG. 38C.

After this, data(2,0) is written to register r2 in the RF of PE0, data(3,1) is written to register r3 in the RF of PE1, data(0,2) is written to register r0 in the RF of PE2, and data(1,3) is written to register r1 in the RF of PE3, as shown in FIG. 38D.

According to this embodiment, a transpose of a matrix can be obtained without increasing the hardware scale.

Though this embodiment describes the case where a 4 by 4 matrix is transposed for the sake of simplicity, a 16 by 16 matrix can equally be transposed according to the following modification.

To perform a transposition on all of sixteen registers r0 to r15, a register number input to each of E, F, I, and J need be expressed by 4 bits (0000 to 1111). Accordingly, an offset corresponding to each of ports E, F, I, and J is expressed by 5 bits. Likewise, variable k output form the block decoder 31 is expressed by 5 bits. This being so, the lower 4 bits of the sum of a 5-bit offset and 5-bit variable k are output to each of ports E, F, I, and J, as variable j of equation 8.

In accordance with 4-bit variable j output to each of read designation ports E and F, data(i,j) stored in register j in the RF of PEi and data (j,i) stored in register i in the RF of PEj are simultaneously read and output to the first selector 21 and the second selector 22.

The first selector 21 (the second selector 22) outputs each data element read from the RF of PEi in cycle k, to PEj, according to equation 8.

In accordance with 4-bit variable j output to each of write designation ports I and J, data(i,j) is written to register i in the RF of PEj, and data(j,i) is written to register j in the RF of PEi. In this way, a transpose of a 16 by 16 matrix is achieved.

Tenth Embodiment

Figure 39:
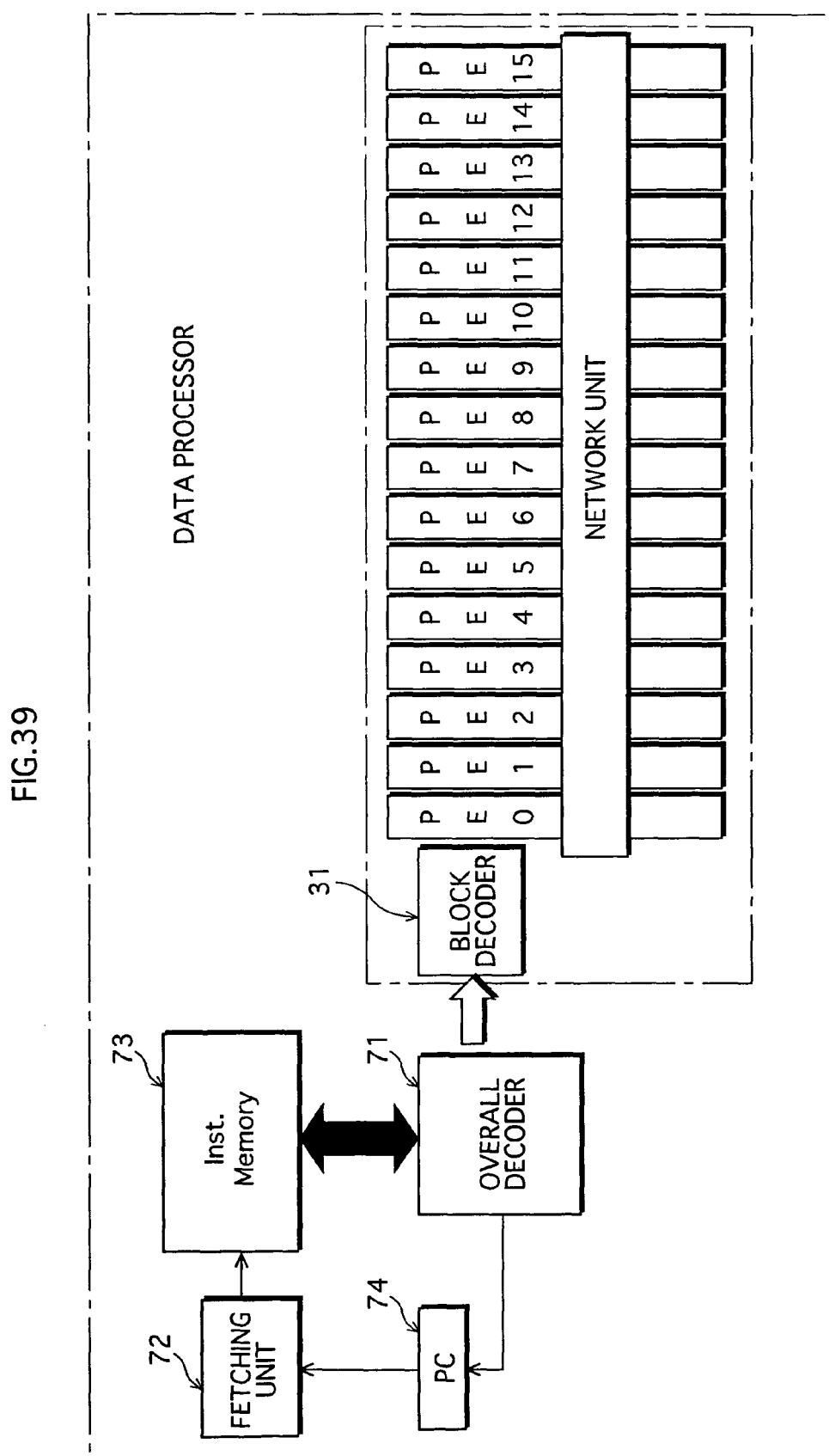
FIG. 39 shows an inner construction of a data processor that includes an overall decoder.

The tenth embodiment of the invention relates to construction elements around the block decoder 31. FIG. 39 shows an inner construction of a data processor to which this embodiment relates. As illustrated, this data processor newly includes an overall decoder 71, a fetching unit 72, an instruction memory 73, and a program counter 74.

In FIG. 39, the block decoder 31 is connected to the overall decoder 71. The fetching unit 72 fetches an instruction at an address specified by the program counter 74, from the instruction memory 73 which stores an instruction sequence. The overall decoder 71 decodes the fetched instruction. If the instruction relates to reads/writes of the RFs, the overall decoder 71 leaves instruction decoding and RF control to the block decoder 31.

The block decoder 31 designates the read target registers and write target registers in the RFs, as noted earlier. On the other hand, the overall decoder 71 controls a branch caused by an instruction. If the fetched instruction designates the branch target by an absolute address, the overall decoder 71 reads the absolute address designated as immediate data from the operands of the instruction, and writes it to the program counter 74. If the fetched instruction designates the branch target by a relative address, on the other hand, the overall decoder 71 reads the relative address designated as immediate data from the operands of the instruction, calculates the branch target from the relative address, and writes it to the program counter 74.

Figure 40:
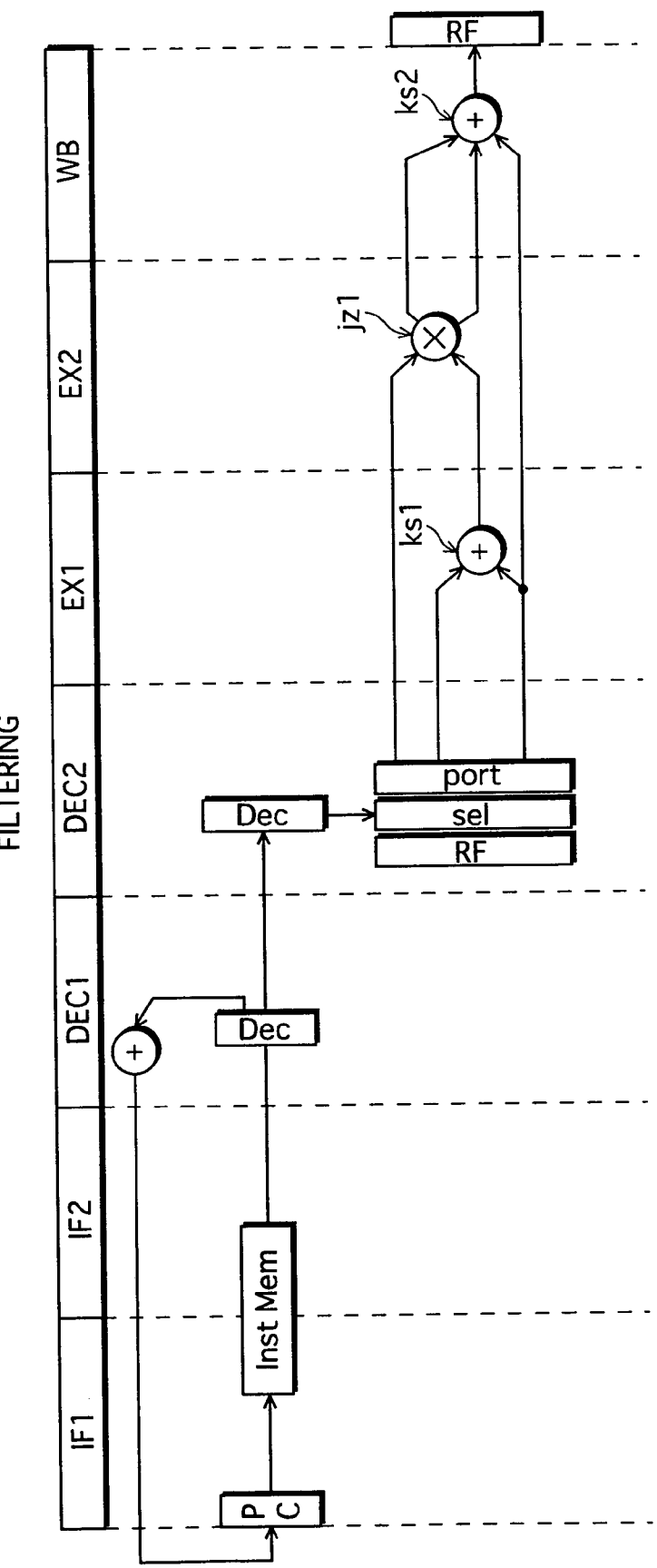
FIG. 40 is a timing chart of processing performed by the data processor.

The branch control exercised by the overall decoder 71 and the RF control exercised by the block decoder 31 have the following temporal relationship. FIG. 40 is a timing chart of an operation of the data processor. In the drawing, IF1 and IF2 are stages where an instruction is fetched from the instruction memory 73. DEC1 is a stage where the overall decoder 71 decodes the instruction. DEC2 is a stage where, when the instruction contains an operand on which an operation needs to be performed to designate the read or write target registers, the block decoder 31 performs the operation. In other words, the overall decoder 71 and the block decoder 31 operate separately in the two separate decode stages, namely, DEC1 and DEC2.

The reason that the overall decoder 71 used for branch control and the block decoder 31 used for RF control are separately constructed and operate in separate decode stages is to avoid a prolonged machine cycle. Suppose the overall decoder 71 and the block decoder 31 are constructed as a single piece. In such a case, the overall decoder 71 and the block decoder 31 form a critical path. This being so, the machine cycle of the data processor is determined based on T1+T2 where T1 is a time period required for branch control and T2 is a time period required for RF control. This causes a prolonged machine cycle. In view of this, this embodiment provides the overall decoder 71 for branch control and the block decoder 31 for RF control with separate constructions, so that branch control and RF control are executed in separate decode stages. This allows the machine cycle of the data processor to be determined based on a longer one of T1 and T2. Hence the data processor can operate at high speed.

For reference purposes, operation timings of the procedures described in the first to ninth embodiment are briefly explained below, with reference to FIGS. 40 to 43.

In FIG. 40, EX1, EX2, and WB are stages relating to filtering described in the second embodiment.

In EX1, the adder 23 performs addition ks1 between operands C and D. In EX2, the multiplier 24 performs multiplication jz1 between the sum C+D of the adder 23 and operand B. In WB, the accumulator 25 performs addition ks2 between the product B×(C+D) of the multiplier 24 and operand A.

Figure 41:
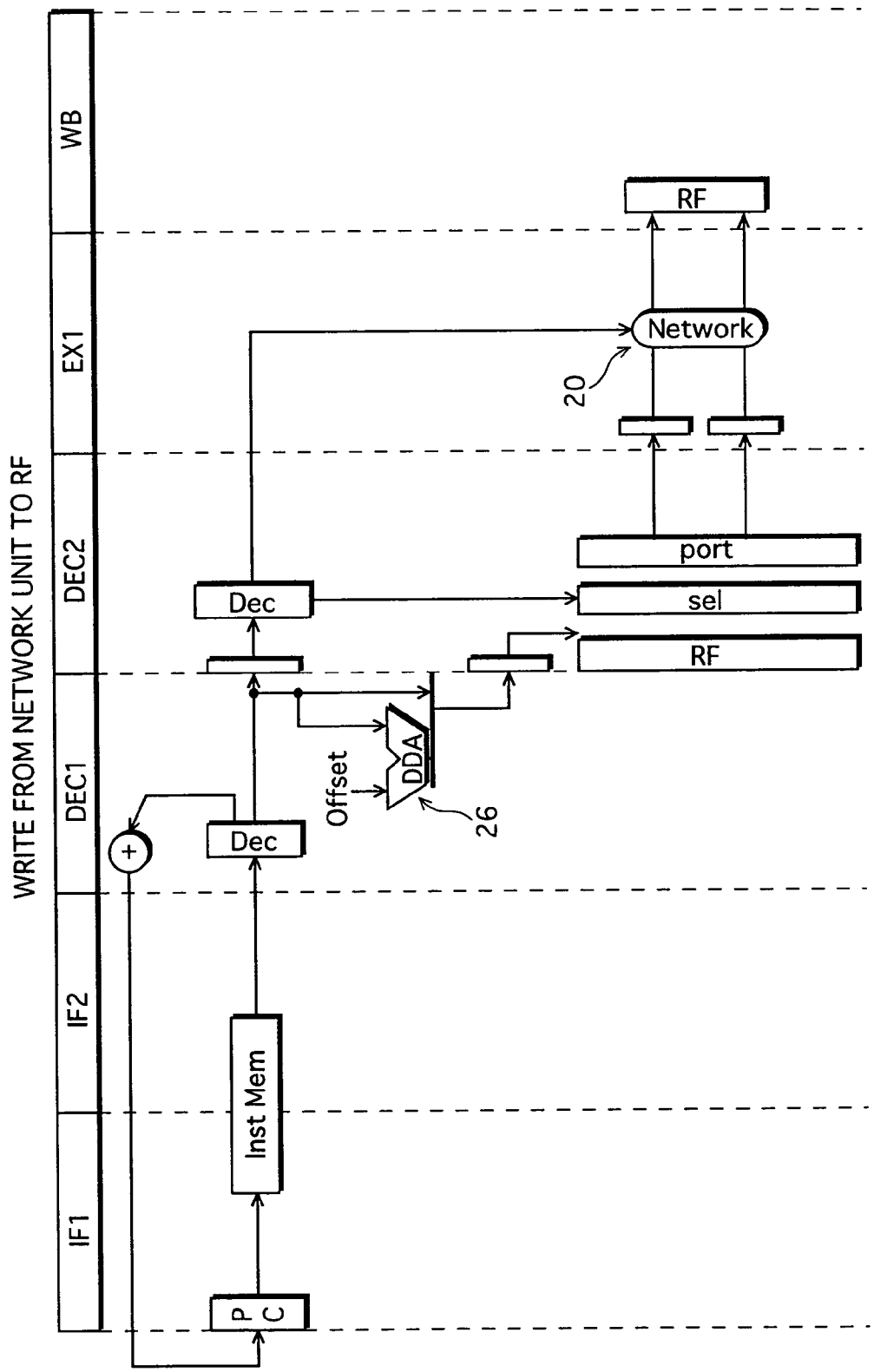
FIG. 41 is a timing chart of writing a data element stored in the RF of one PE to the RF of another PE.

FIG. 41 is a timing chart of an operation of writing a data element stored in the RF of one PE to the RF of another PE.

As can be seen from the drawing, the addition by the DDA 26 is performed in DEC1 where the decoding by the overall decoder 71 is conducted. Meanwhile, the decoding by the block decoder 31 and the reading of data from the RFs according to the decoding result are performed in DEC2. The data transfer by the network unit 20 is performed in EX1, and the writing of the data to the RFs is performed in WB.

Figure 42:
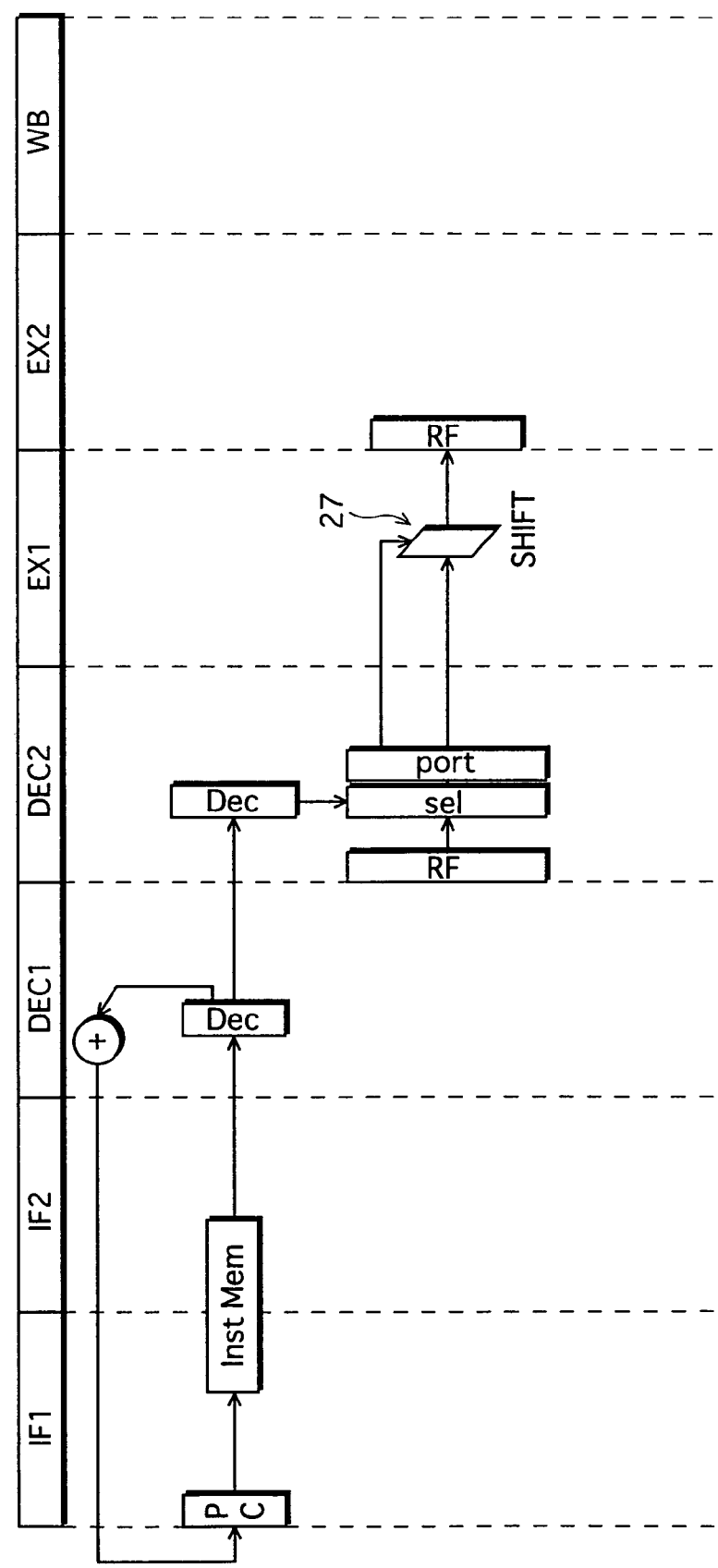
FIG. 42 is a timing chart of shifting performed by the shifter.

FIG. 42 is a timing chart of an operation of shifting by the shifter 27. As shown in the drawing, the shift by the shifter 27 is performed in EX1.

Figure 43:
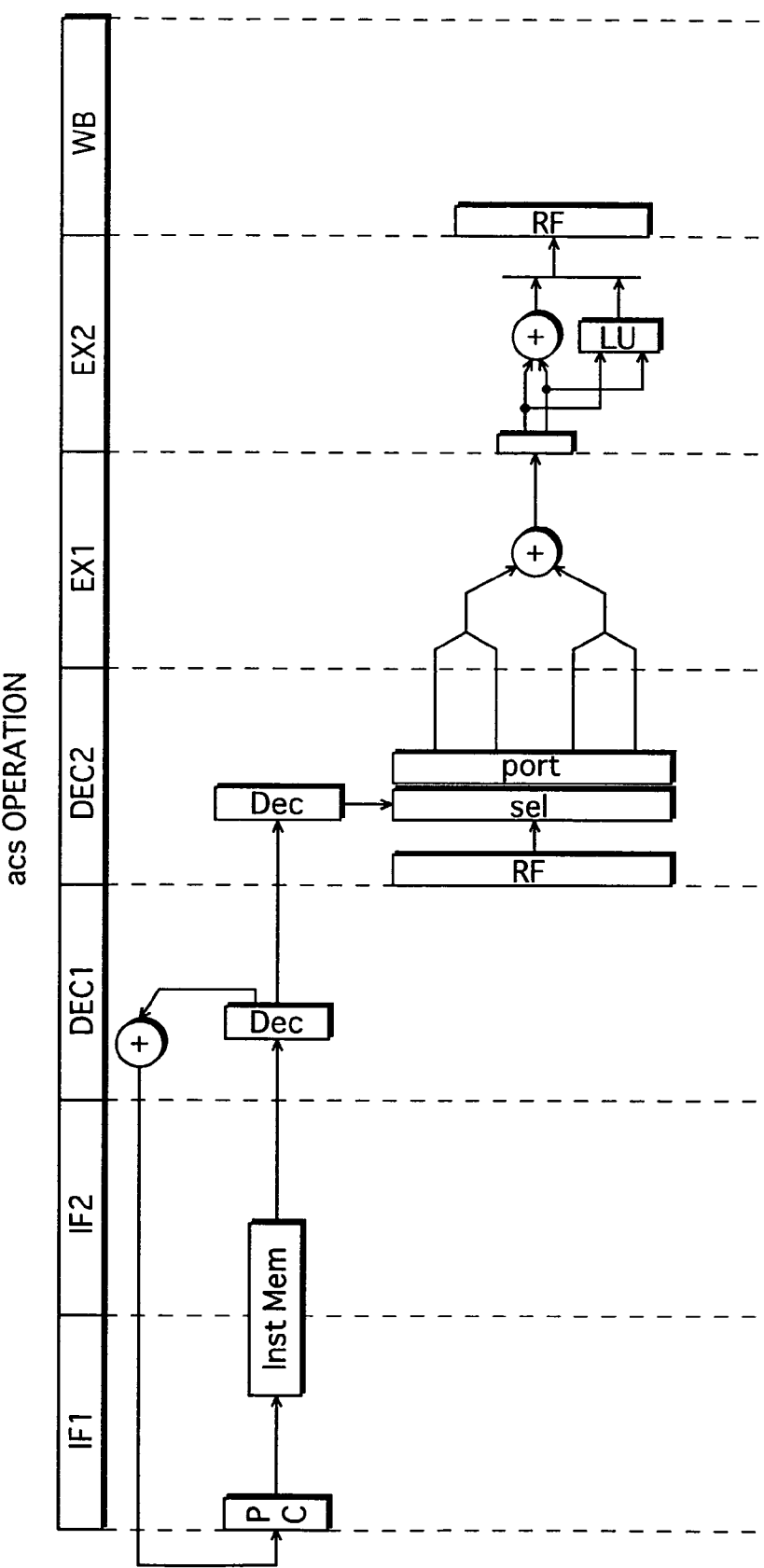
FIG. 43 is a timing chart of an ACS operation.

FIG. 43 is a timing chart showing an ACS operation. As shown in the drawing, the addition by the DDA 26 is performed in EX1, and the comparison and selection by the subtractor 28 and selector 29 are performed in EX2.

Eleventh Embodiment

The eleventh embodiment of the invention relates to improvements for efficient image processing using a look-up table. A look-up table (LUT) is a table representing various colors, and is made up of a plurality of entries that each show luminance, red-color difference, blue-color difference, and mixture ratio which correspond to one color.

An image drawn using two, four, or sixteen colors out of the plurality of colors shown in the LUT is called OSD graphics. One familiar example of OSD graphics is a display of channel numbers and playback and stop indications drawn on a display screen of a device such as a DVD player or a STB according to a user operation.

If the plurality of PEs each perform drawing of OSD graphics, there is a problem of how to allocate the LUT to each PE. Suppose the sixteen PEs share one LUT. In this case, only a memory area for storing one LUT is necessary, with it being possible to reduce the memory size. However, the probability that each PE can use the LUT is only 1/16. This means many PEs need to wait to access the LUT, which significantly decreases the processing efficiency of the PEs. On the other hand, if the LUT is assigned to each of the sixteen PEs individually, there is no competition for the use of the LUT between the PEs, so that the efficiency of image processing will not decrease. This, however, requires memory areas for storing sixteen LUTs, which inevitably increases the memory size.

Thus, the memory size and the PE processing efficiency are greatly affected by how to allocate the LUT to the PEs. In view of this, this embodiment aims to construct a data processor that enables the PE processing efficiency to improve without having to increase the memory size.

Figure 44:
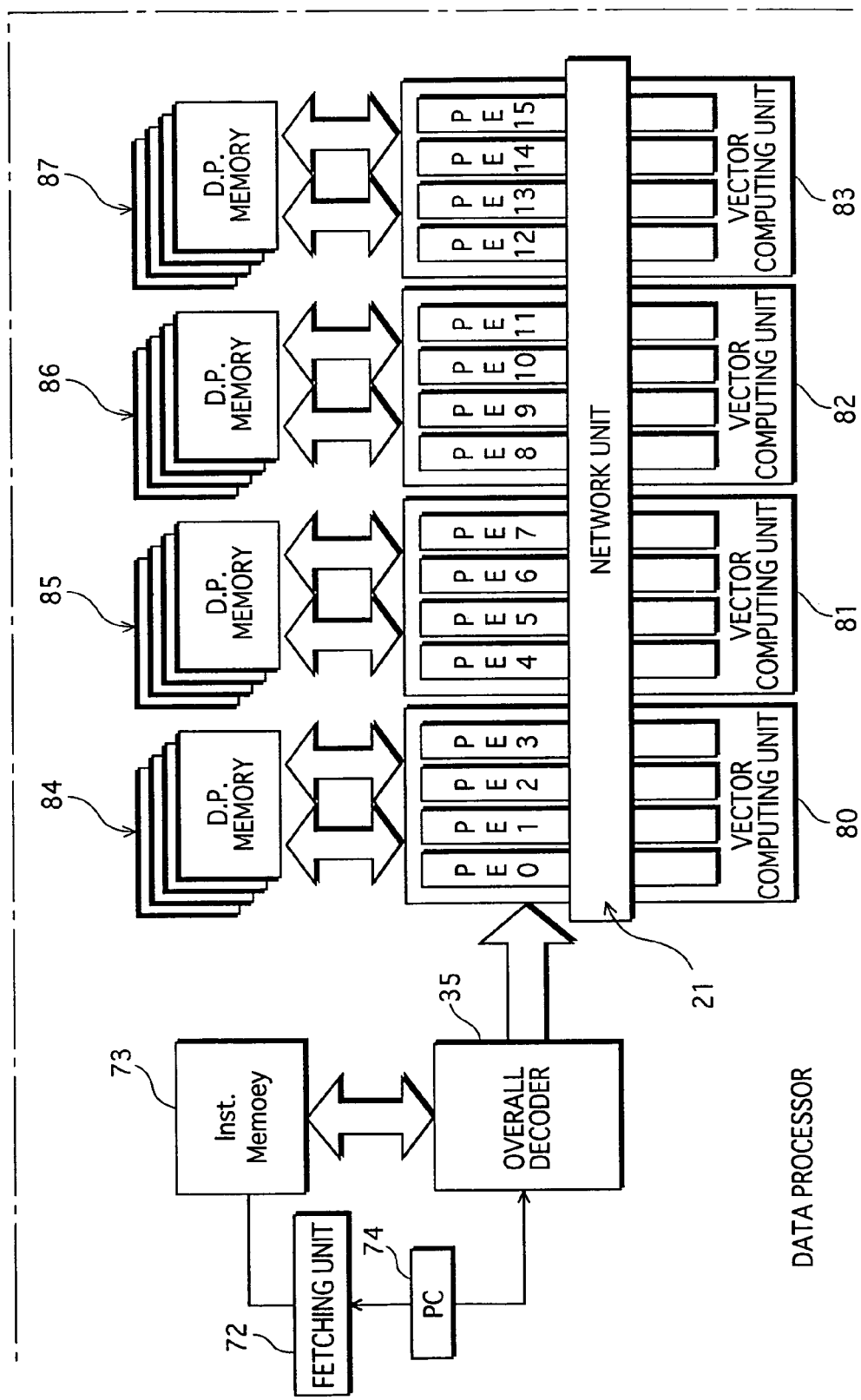
FIG. 44 shows an inner construction of a data processor that includes four vector computing units.

FIG. 44 shows an inner construction of a data processor to which this embodiment relates. In the drawing, four PEs are grouped as one vector computing unit. Which is to say, PE0 to PE3 constitute a vector computing unit 80, PE4 to PE7 constitute a vector computing unit 81, PE8 to PE11 constitute a vector computing unit 82, and PE12 to PE15 constitute a vector computing unit 83. Also, dual port memories (D.P. memories) 84, 85, 86, and 87 are provided respectively for the four vector computing units 80, 81, 82, and 83.

Figure 45:
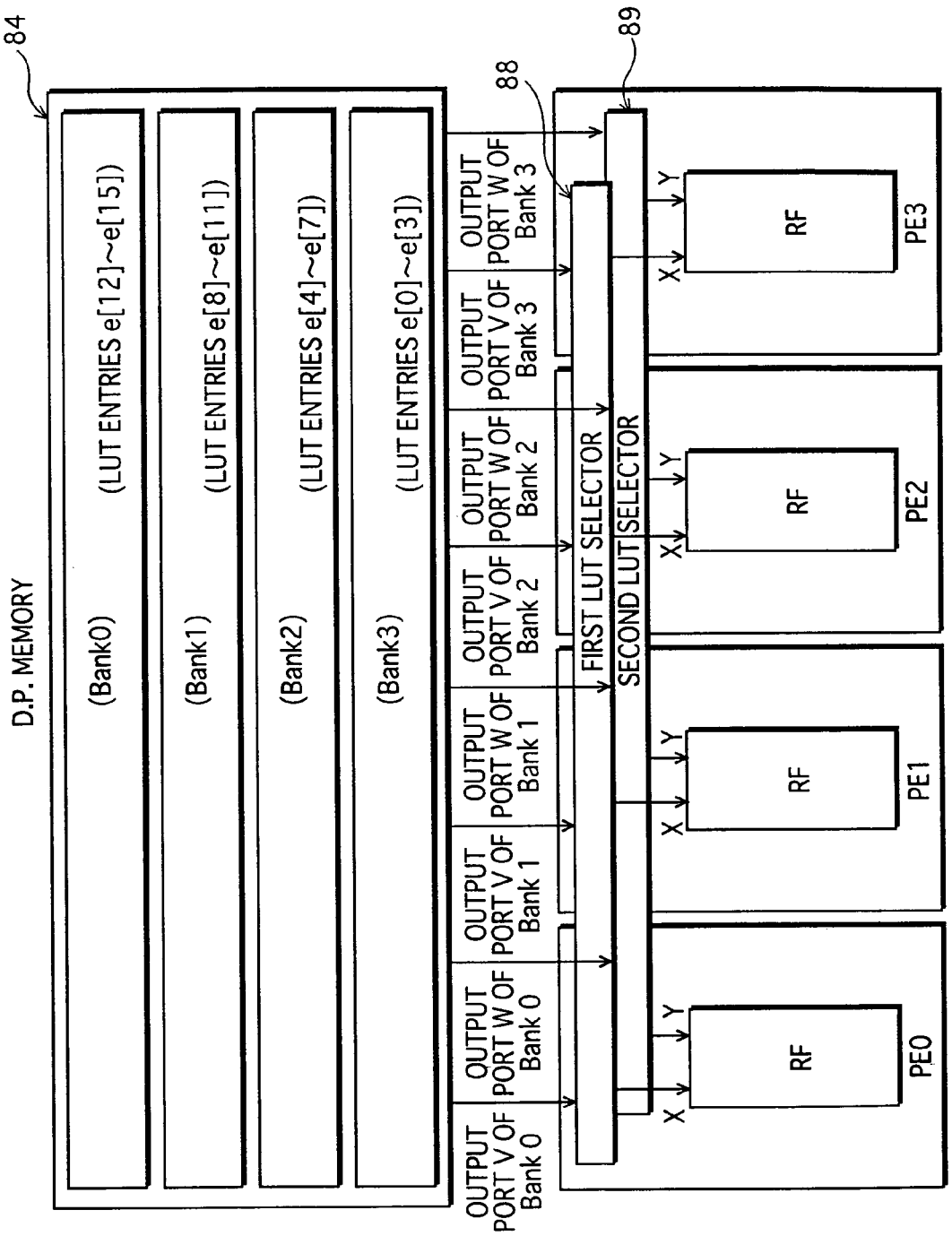
FIG. 45 shows a detailed inner construction of a vector computing unit.

FIG. 45 shows an inner construction of the vector computing unit 80 and the D.P. memory 84. As shown in the drawing, the D.P. memory 84 has four banks (Bank0, Bank1, Bank2, and Bank3). Also, a first LUT selector 88 and a second LUT selector 89 are connected to the RF of each of PE0, PE1, PE2, and PE3 that constitute the vector computing unit 80.

The D.P. memory 84 has the following structure. Of the four banks of the D.P. memory 84, Bank3 stores e[0] to e[3] of sixteen entries e[0] to e[15] which make up the LUT. Likewise, Bank2 stores e[4] to e[7], Bank1 e[8] to e[11], and Bank0 stores e[12] to e[15]. Thus, the four banks of the D.P. memory 84 each store four entries out of the sixteen entries of the LUT. Each bank has two output ports V and W, and can output any two of the four entries stored therein to different PEs via output ports V and W.

The first LUT selector 88 is a 4-input/4-output selector having four input ports and four output ports. The four input ports correspond one-to-one to the four banks, and are connected to output ports V of the corresponding banks. Meanwhile, the four output ports correspond one-to-one to the four PEs, and are connected to input ports X of the RFs of the corresponding PEs.

The second LUT selector 89 is a 4-input/4-output selector having four input ports and four output ports, like the first LUT selector 88. The four input ports correspond one-to-one to the four banks, and are connected to output ports W of the corresponding banks. The four output ports correspond one-to-one to the four PEs, and are connected to input ports Y of the RFs of the corresponding PEs.

Figure 46:
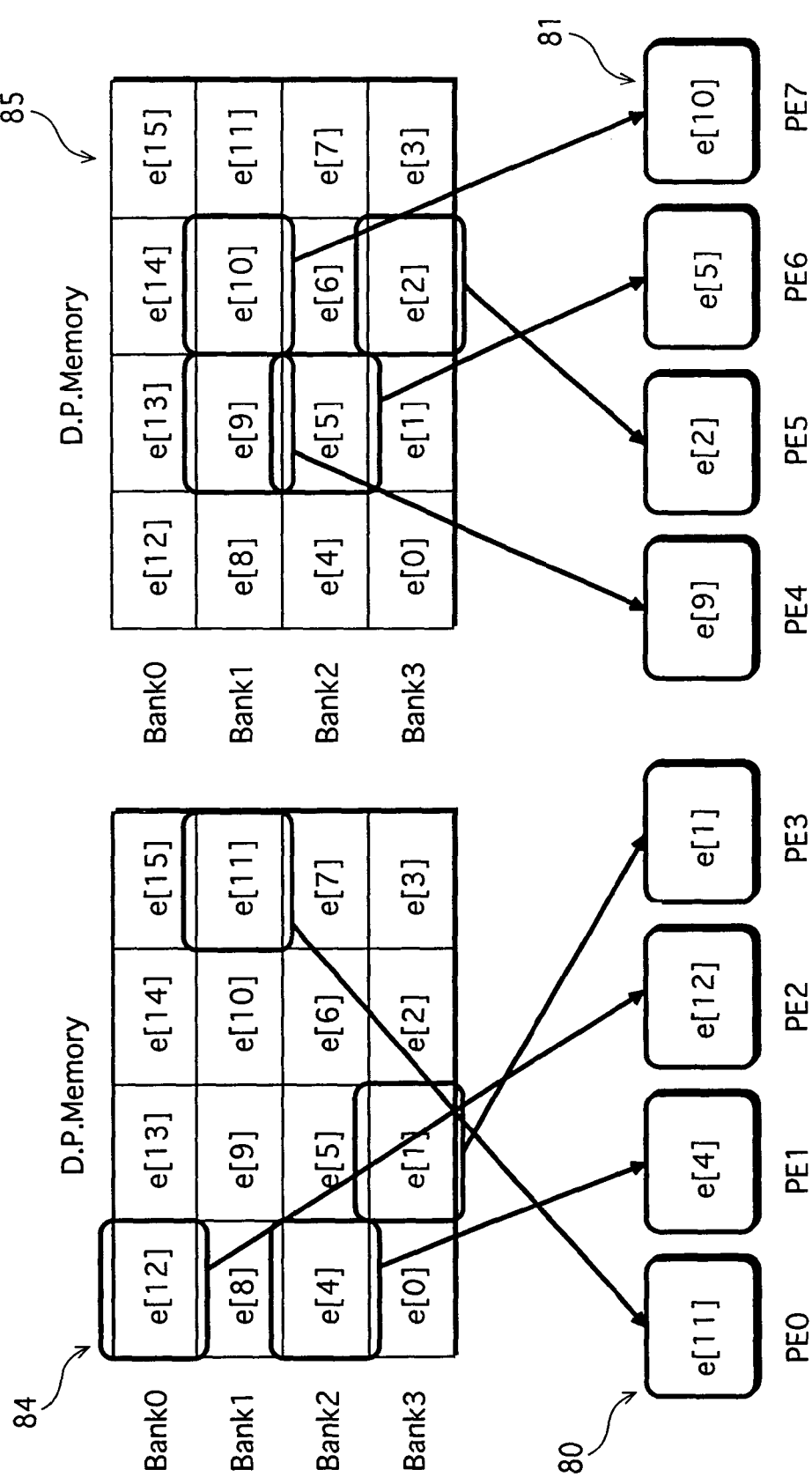
FIG. 46 shows how data elements stored in banks in D.P memories are read and output to PEs.

The left half of FIG. 46 shows how data stored in the banks of the D.P. memory 84 is read and output to the PEs of the vector computing unit 80. In the drawing, e[1], e[4], e[11], and e[12] are read respectively from Bank3, Bank2, Bank1, and Bank0. e[11] read from Bank1 is output to PE0 through the first LUT selector 88. e[4] read from Bank2 is output to PE1 through the first LUT selector 88. e[12] read from Bank0 is output to PE2 through the first LUT selector 88. e[1] read from Bank3 is output to PE3 through the first LUT selector 88.

The right half of FIG. 46 shows how data stored in the banks of the D.P. memory 85 is read and output to the PEs of the vector computing unit 81. In the drawing, e[9] and e[10] are read from Bank1, e[5] is read from Bank2, and e[2] is read from Bank 3. e[9], e[2], and e[5] are output respectively to PE4, PE5, and PE6 by the first LUT selector 88, whereas e[10] is output to PE7 by the second LUT selector 89.

According to this embodiment, one LUT is divided into four portions and stored in four banks. Each bank can supply entry information to two PEs. Therefore, there is no competition for the LUT between PEs, except when three or more PEs simultaneously access to entry information stored in one bank. Since each PE can refer to necessary entry information of the LUT anytime, drawing OSD graphics using the LUT can be carried out at high speed through the use of the plurality of PEs. Furthermore, the LUT is provided to every four PEs, which contributes to a smaller memory size.

Twelfth Embodiment

Figure 47:
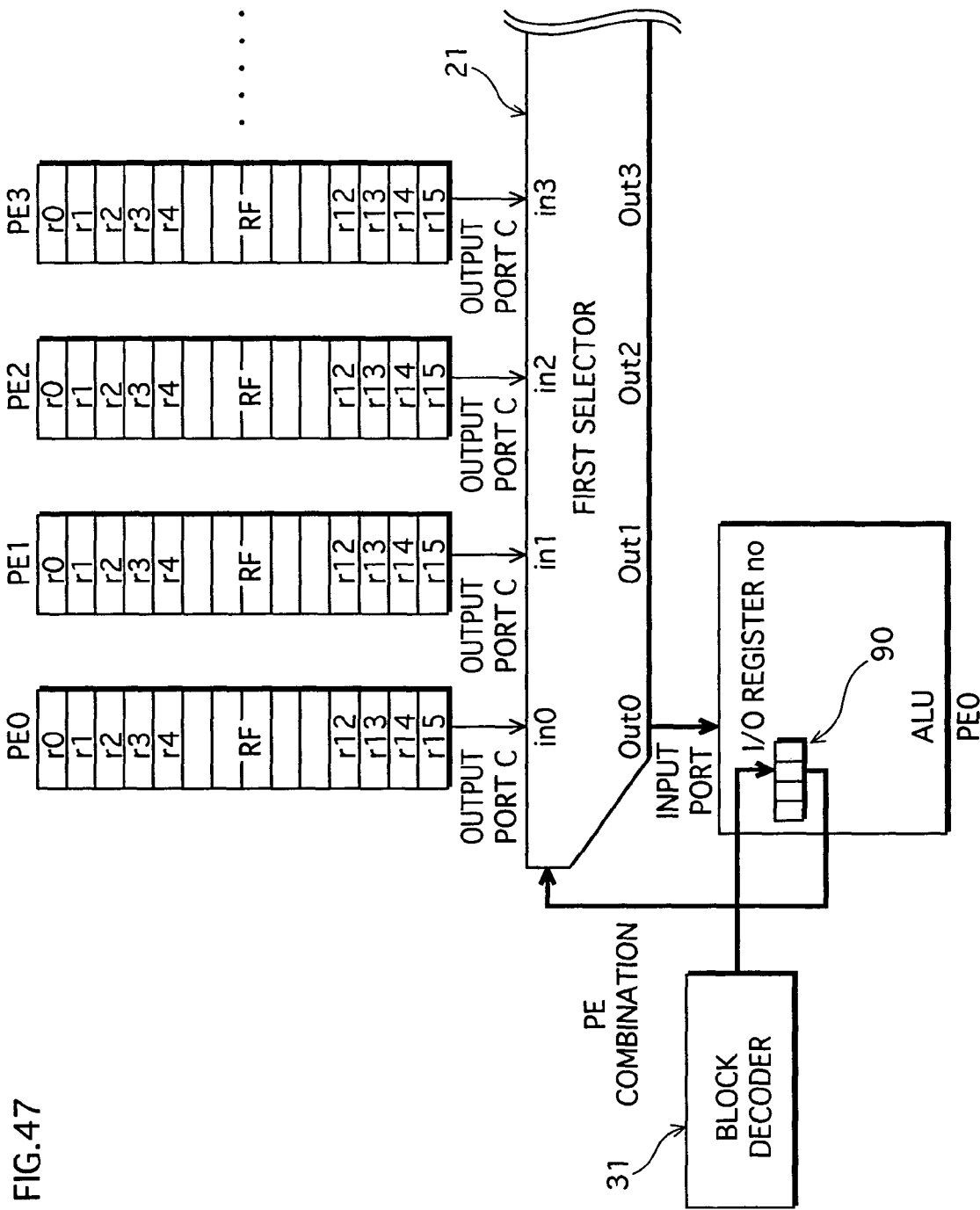
FIG. 47 shows an inner construction of an ALU that includes an I/O register.
Figure 48A:
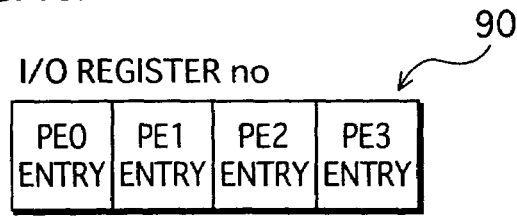
FIG. 48 shows the I/O register in greater detail.
Figure 48B:
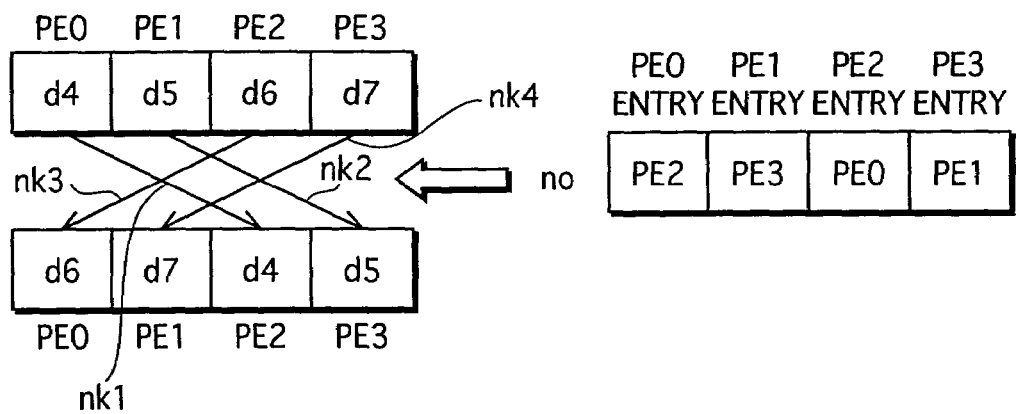

The twelfth embodiment of the invention relates to a construction for designating transfers made by the network unit 20. FIG. 47 shows an inner construction of a data processor to which this embodiment relates. Note that the following explanation concerns PE0 to PE3 for the sake of simplicity. A feature of this data processor lies in that an I/O register 90 is provided in the ALU of PE0. The I/O register 90 is a register for designating the transfers performed by the network unit 20. FIG. 48 shows the I/O register 90 in greater detail. As shown in FIG. 48A, the I/O register 90 has the same number of entries as the PEs. Each entry corresponds to a PE, and is used to designate a PE to which data stored in the corresponding PE should be transferred. FIG. 48B shows an example of settings of the I/O register 90. In the drawing, the I/O register 90 is made up of a PE0 entry, a PE1 entry, a PE2 entry, and a PE3 entry corresponding to PE0 to PE4. PE numbers "2", "3", "0", and "1" are set respectively in these PE0, PE1, PE2, and PE3 entries. The first selector 21 in the network unit 20 performs transfers according to the settings of the I/O register 90, as shown in FIG. 48B. As illustrated, transfer nk1 from PE0 to PE2, transfer nk2 from PE1 to PE3, transfer nk3 from PE2 to PE0, and transfer nk4 from PE3 to PE1 are simultaneously executed. Through the simultaneous execution of these transfers, it is possible to output the data element stored in the RF of each of PE0 to PE3 to the ALU of another one of PE0 to PE3. The I/O register 90 is set by the block decoder 31. That is to say, the I/O register 90 is set according to a result of decoding an instruction by the block decoder 31. In this way, it is possible to control the transfers performed by the network unit 20.

According to this embodiment, combinations of transfer source PEs and transfer destination PEs can be set using the I/O register 90. This makes it easier to control the network unit 20.

Thirteenth Embodiment

The thirteenth embodiment of the invention performs reads/writes of registers whereby the block decoder 31 decodes an instruction that includes a designation of a read target register and a designation of a write target register.

As an example instruction, a network select instruction is described below. The network select instruction has the following format:

scsel src, dst

Figure 48C:
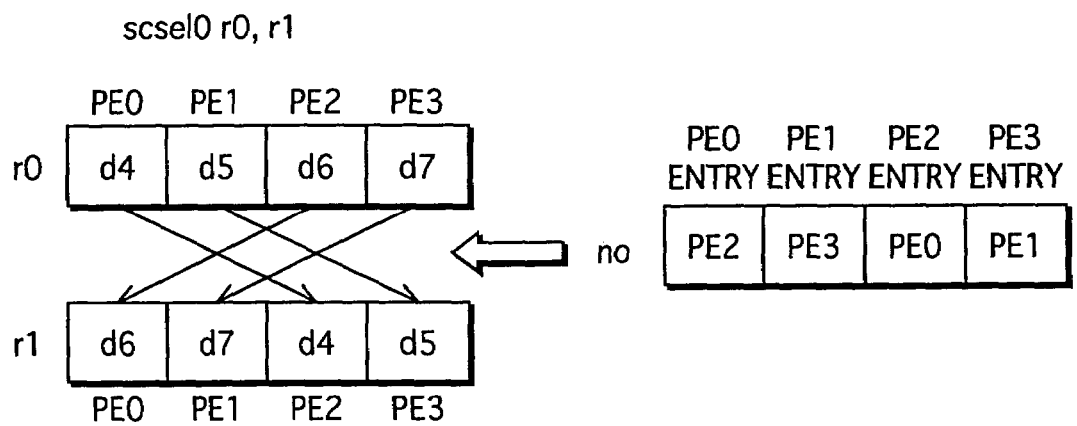

In this format, src designates a read target register whereas dst designates a write target register. Register numbers r0 to r15 of the sixteen registers that constitute one RF are used in these designations. FIG. 48C shows an example network select instruction and how reads/writes are performed as a result of decoding this instruction. The I/O register 90 described in the twelfth embodiment is used for designating read target PEs and write target PEs. This being so, the reads/writes are determined by the settings of the I/O register 90 and the operand designations of the instruction. In the I/O register 90 shown in FIG. 48B, the transfer destinations of PE0, PE1, PE2, and PE3 are PE2, PE3, PE0, and PE1 respectively. Meanwhile, the network select instruction in FIG. 48C designates register r0 as the read target register and register r1 as the write target register. Accordingly, the data elements stored in registers r0 in the RFs of PE0, PE1, PE2, and PE3 are read and written to registers r1 in the RFs of PE2, PE3, PE0, and PE1.

As a more sophisticated instruction, a network shift instruction is described next. The network shift instruction has the following format:

scsfti src1, src2, dst, imm

The network shift instruction is to shift the values stored in registers designated by src1 and src2 by imm and write the shift result to a register designated by dst. FIG. 49 shows a specific example of a network shift instruction and how reads/writes of registers are executed as a result of decoding this instruction. FIG. 49 shows the network shift instruction. In this example, src1 and src2 are registers r0 and r1, and imm is 3. FIG. 49B shows the storage contents of registers r0 and r1 in the RFs of PE0 to PE3 before the network shift instruction is decoded. FIG. 49C shows the storage contents of registers r0 and r1 after the storage contents shown in FIG. 49B are shifted by 3. In detail, d3 which was stored in register r0 in the RF of PE3 is shifted to register r0 in the RF of PE0. Following this, the data in registers r0 in the RFs of PE0 to PE3 is transferred to registers r2 in the RFs of PE0 to PE3. FIG. 49D shows the storage contents of registers r2 in the RFs of PE0 to PE3.

FIG. 50 shows another example of a network shift instruction. In the network shift instruction shown in FIG. 50A, imm is −2. Accordingly, d0 to d7 stored in registers r0 and r1 in the RFs of PE0 to PE3 in FIG. 50B are shifted as shown in FIG. 50C.

Since imm is −2, d3 which was stored in register r0 in the RF of PE3 is shifted to register r1 in the RF of PE1, and d2 which was stored in register r0 in the RF of PE2 is shifted to register r1 in the RF of PE0. After this, the data in registers r0 in the RFs of PE0 to PE3 is transferred to registers r2 in the RFs of PE0 to PE3.

According to this embodiment, data elements stored in the RFs can be freely moved in the row direction. This contributes to a wider variety of processes that can be performed by the data processor.

It should be noted here that a program containing a scsel instruction or a scsfti instruction described above may be stored in a recording medium and put to assignment or lease, independently of a data processor. Also, the program may be delivered via a network.

Fourteenth Embodiment

Figure 51:
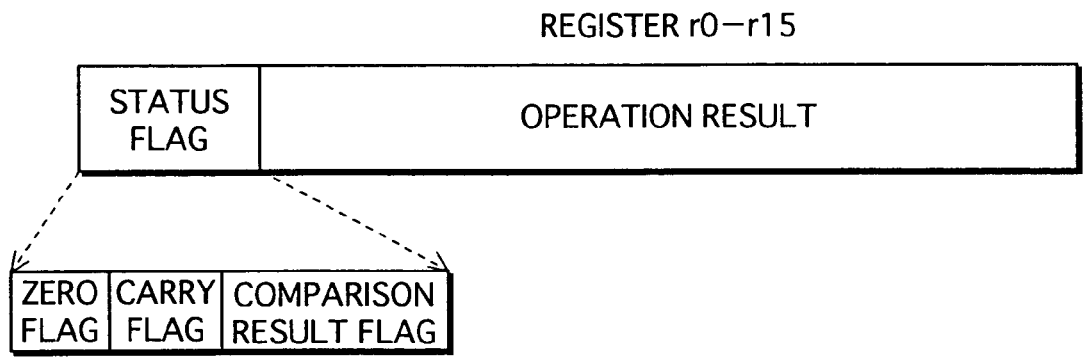
FIG. 51 shows an example of the storage contents of a RF which stores a status flag.

The fourteenth embodiment of the invention relates to improvements when a status flag showing the status of the ALU which has performed an operation is stored in a register in the RF of the same PE. FIG. 51 shows the storage contents of a register to which this embodiment relates. This register has a 16-bit length as in the first embodiment, but differs from the first embodiment in that the higher 3 bits are assigned to a status flag. The status flag is made up of a zero flag showing whether the result of the operation performed by the ALU is zero, a carry flag showing whether a carry is generated in the operation of the ALU, and a comparison result flag showing a comparison result when the operation of the ALU is a comparison operation.

Each time the ALU performs an operation, the ALU writes a result of the operation and a status flag to a register in the RF of the same PE as one word. Since the status flag is written to the register together with the operation result, it is possible to achieve cooperative processing between the ALUs where the ALU of one PE performs an operation in accordance with a result of an operation performed by the ALU of another PE.

Figure 52:
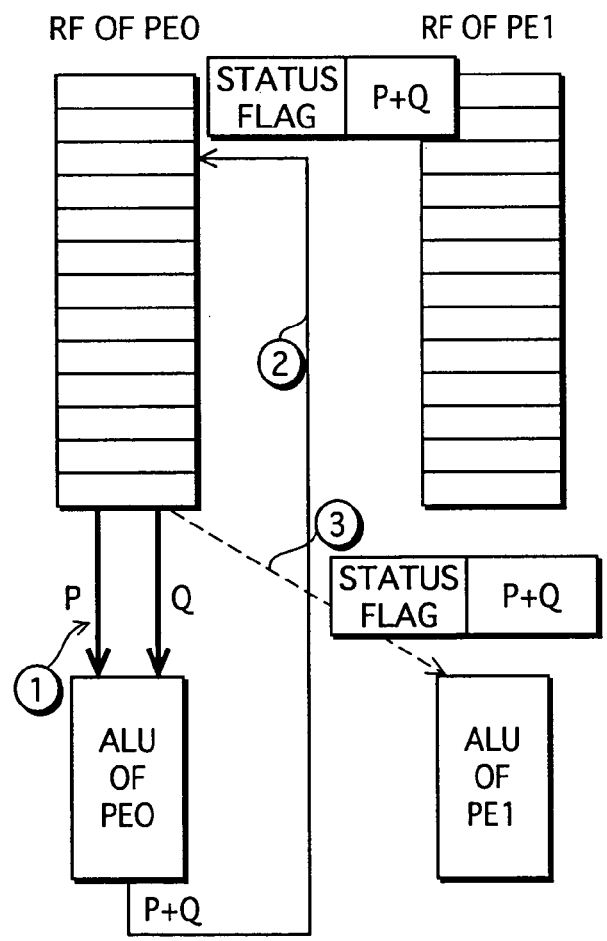
FIG. 52 shows operations of ALUs using a status flag.

FIG. 52 shows operations of the ALUs of PE0 and PE1 in this embodiment. In the drawing, the ALU of PE0 reads P and Q from the RF of PE0 and performs an operation of P+Q, as indicated by ①. The ALU then writes the operation result P+Q and a carry flag showing whether a carry is generated in the operation result to the RF of PE0, as indicated by ②. Since the status flag is written in the RF of PE0 in this way, the ALU of PE1 can check whether a carry is generated in the operation of the ALU of PE0 by referring to the status flag stored in the RF of PE0 as indicated by ③, and perform an operation accordingly.

According to this embodiment, cooperative processing between the ALUs can be achieved.

Fifteenth Embodiment

Figure 53:
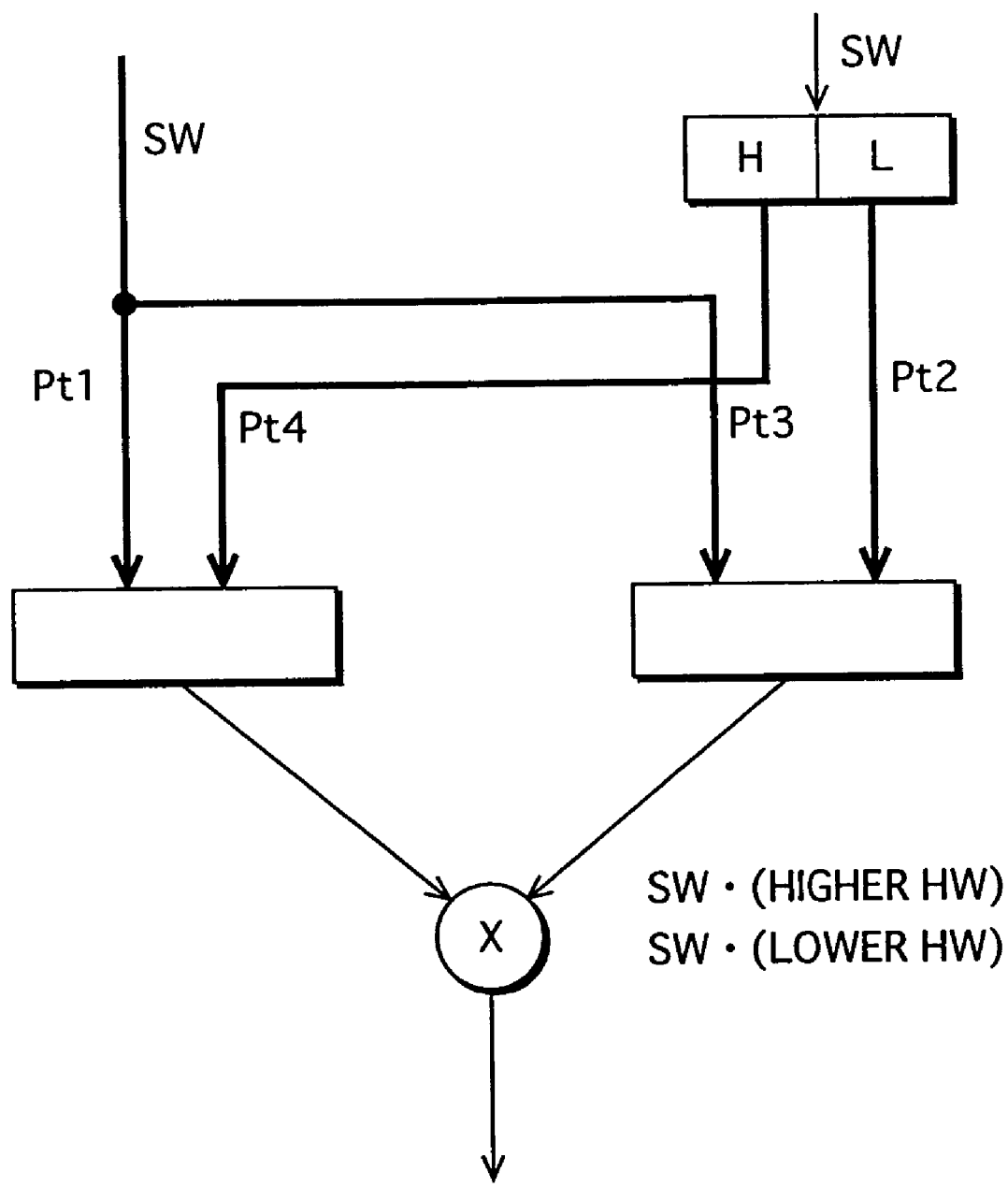
FIG. 53 shows a construction of a multiplier capable of multiplying a single word and a half word.

The fifteenth embodiment of the invention relates to improvements when processing is performed in units of half words. When the data processor performs image processing described in the second embodiment, pixel values and filter coefficients are stored in the RFs. Here, the data length of one filter coefficient corresponds to the word length of one register (a single word), whereas the data length of a pixel value sometimes corresponds only to half the word length of one register (a half word). In such a case, it is possible to store two pixel values in each of registers r0 to r15 of the RF of each PE. In other words, 16×2 pixel values can be stored in the RF of each PE. Likewise, if the ALU of each PE can simultaneously execute two multiplications between half-word pixel values and single-word filter coefficients, the processing efficiency increases. FIG. 53 shows a construction of the multiplier 24 that can perform a multiplication between a single word and a half word. In the drawing, the multiplier 24 performs two multiplications. One multiplication is between a single-word filter coefficient input via path Pt1 and a lower half-word (L) pixel value input via path Pt2. The other multiplication is between a single-word filter coefficient input via path Pt3 and a higher half-word (H) pixel value input via path Pt4.

The following explains a construction around the multiplier 24 in the ALU. The adder 23 adds two half-word pixel values input via input port C, and also adds two half-word pixel values input via input port D. The adder 23 then outputs the higher half of each of the two single-word sums to path Pt4 and the lower half to path Pt2. The multiplier 24 simultaneously performs two multiplications between the single words and the half words. Two products obtained as a result (SW×(higher HW) and SW×(lower HW)) are added up by the accumulator 25.

According to this embodiment, the RF of each PE stores two half-word pixel values in each register, and the ALU of each PE simultaneously performs two filtering operations on these pixel values. This enables image processing for many pixel values to be conducted more efficiently.

Sixteenth Embodiment

In the fifteenth embodiment of the invention, the RF of each PE stores half-word pixel values, and the ALU of each PE performs multiplications of half-word pixel values. The sixteenth embodiment of the invention relates to improvements to the network unit 20 associated with the construction of the fifteenth embodiment.

Figure 54:
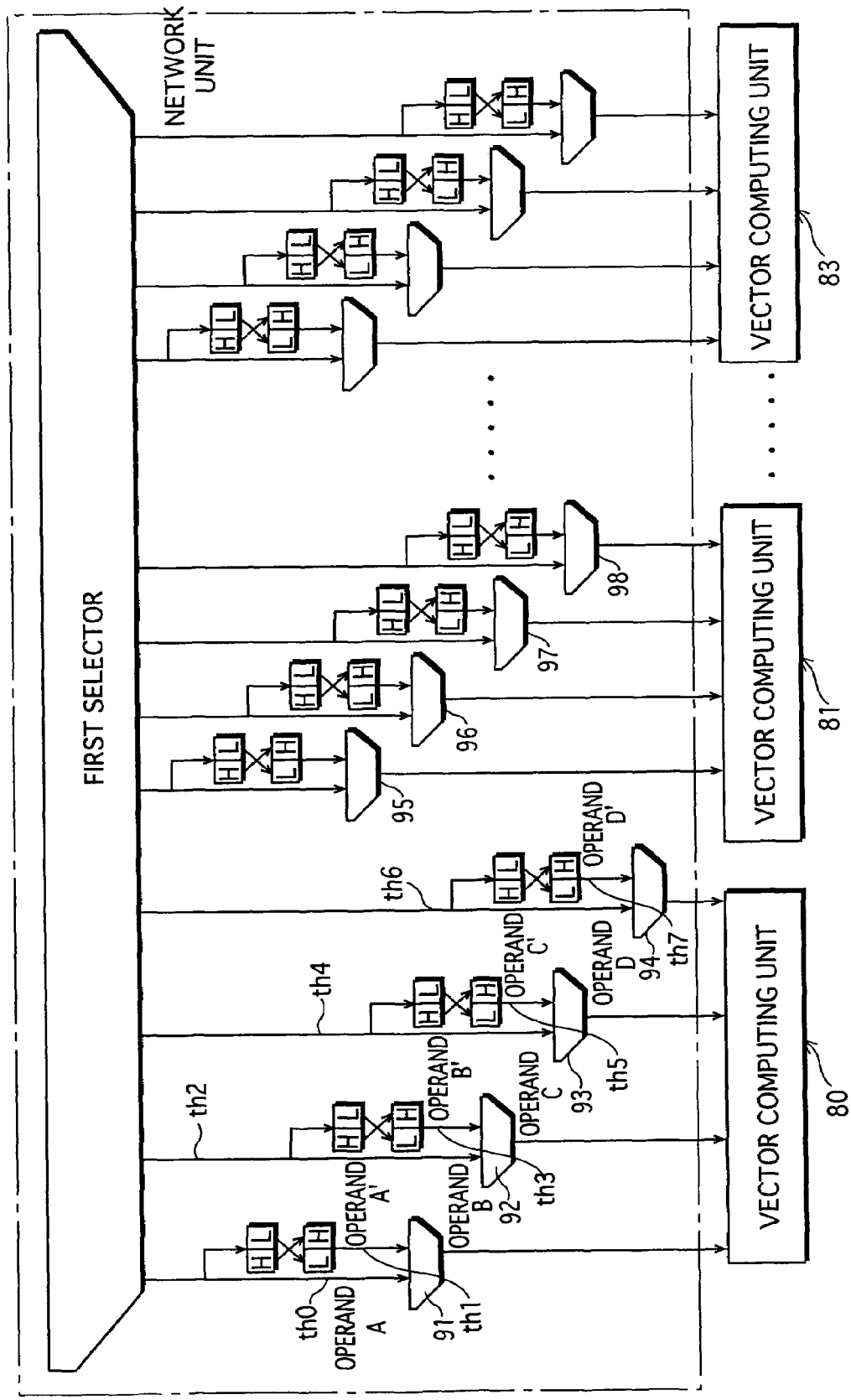
FIG. 54 shows an inner construction of a network unit that can interchange higher and lower half words.

FIG. 54 shows an inner construction of the network unit 20 to which this embodiment relates. In the drawing, the first selector 21 has the sixteen output ports as shown in the first embodiment, and transfers sixteen data elements simultaneously to the ALUs of the sixteen PEs. Paths th0, th2, th4, and th6 are each a connecting line for transferring a data element stored in the RF of one PE to the ALU of another PE without a change. Meanwhile, paths th1, th3, th5, and th7 are each a connecting line for transferring an inverted data element obtained by interchanging the higher and lower half words of a data element stored in the RF of one PE, to the ALU of another PE. Selectors 91, 92, 93, 94, 95, 96, 97, and 98 each selectively output the data element transferred via path th0, th2, th4, or th6 or the data element transferred via path th1, th3, th5, or th7.

According to this embodiment, single words in which the higher and lower half words have been interchanged can be transferred to the ALUs through the network unit 20. This increases the variety of single words that can be used by the ALUs as operands.

This embodiment may be modified so that the network unit 20 includes a 2·n-input/n-output selector which has 2·n input ports and n output ports. This selector receives both (i) a data element stored in a register and (ii) an inverted data element in which the higher and lower half words of the data element have been interchanged, from the RF of each PE.

Also, though this embodiment describes an example of processing a combination of two half words read from the same register in the RF of each PE, a combination of a half word read from one register in the RF and a half word read from another register in the RF may also be processed.

Seventeenth Embodiment

Figure 55:
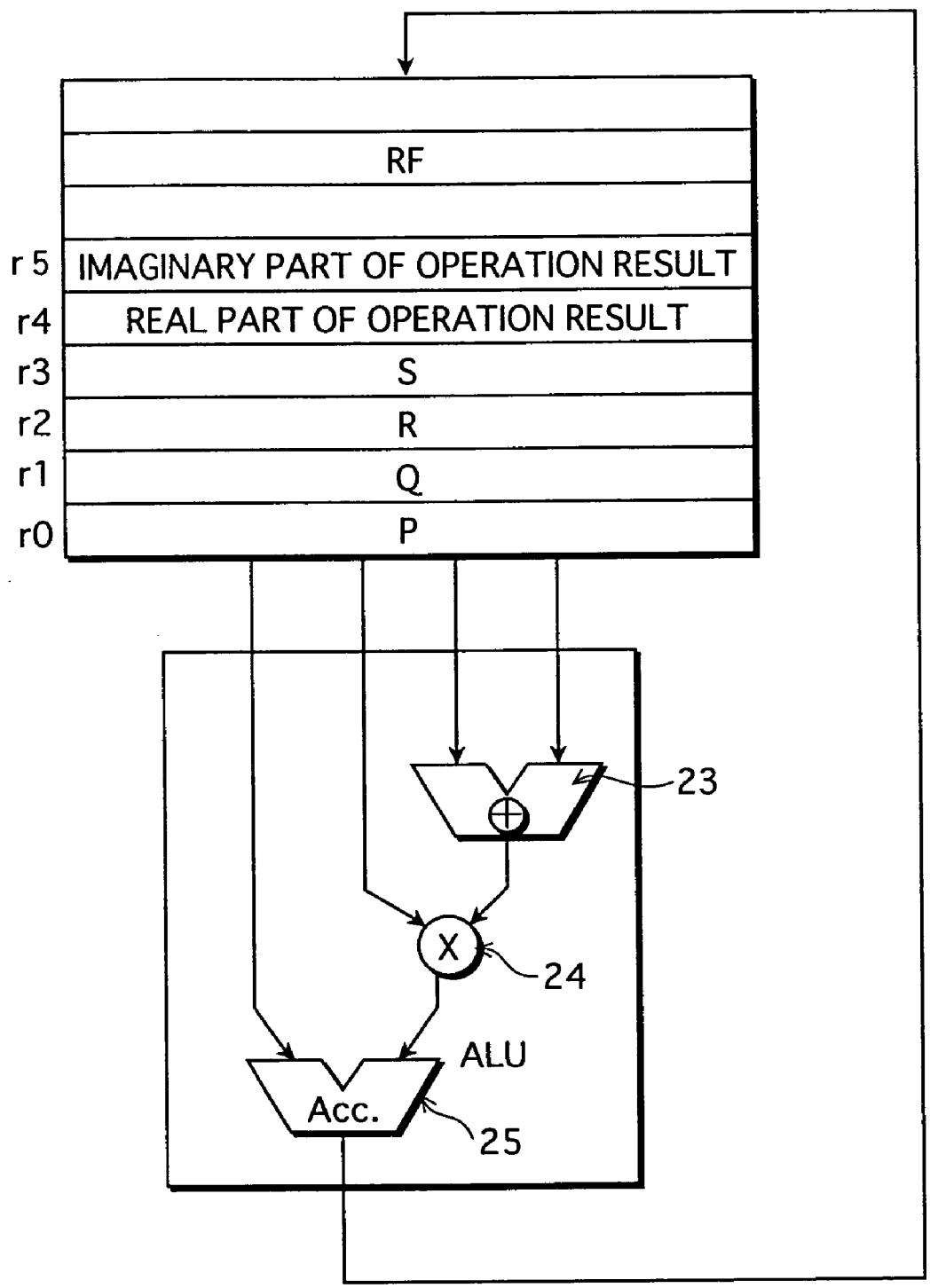
FIG. 55 shows an example of the storage contents of a RF when performing a complex number operation.

The seventeenth embodiment of the invention performs a complex number operation using the data processor shown in the first embodiment. In general, a complex number is made up of a real part and an imaginary part. A sum of complex number P+Qi and complex number R+Si is (P+R)+(Q+S)i. A product of complex number P+Qi and complex number R+Si is (P·R−S·Q)+(Q·R+S·P)i. In other words, it is necessary to perform additions separately on real parts and imaginary parts, to compute a sum of complex numbers. Also, it is necessary to perform a subtraction and an addition separately on real parts and imaginary parts, to compute a product of complex numbers. In this embodiment, complex number operations having such constraints are carried out using the data processor. FIG. 55 shows an example of the storage contents of the RF of one PE when a complex number operation is performed. Real part P, imaginary part Q, real part R, and imaginary part S which are used as operands are respectively stored in registers r0 to r3. Meanwhile, register r4 is used for storing a real part of an operation result, and register r5 is used for storing an imaginary part of the operation result. The ALU has the same inner construction as that shown in the second embodiment.

Figure 56B:
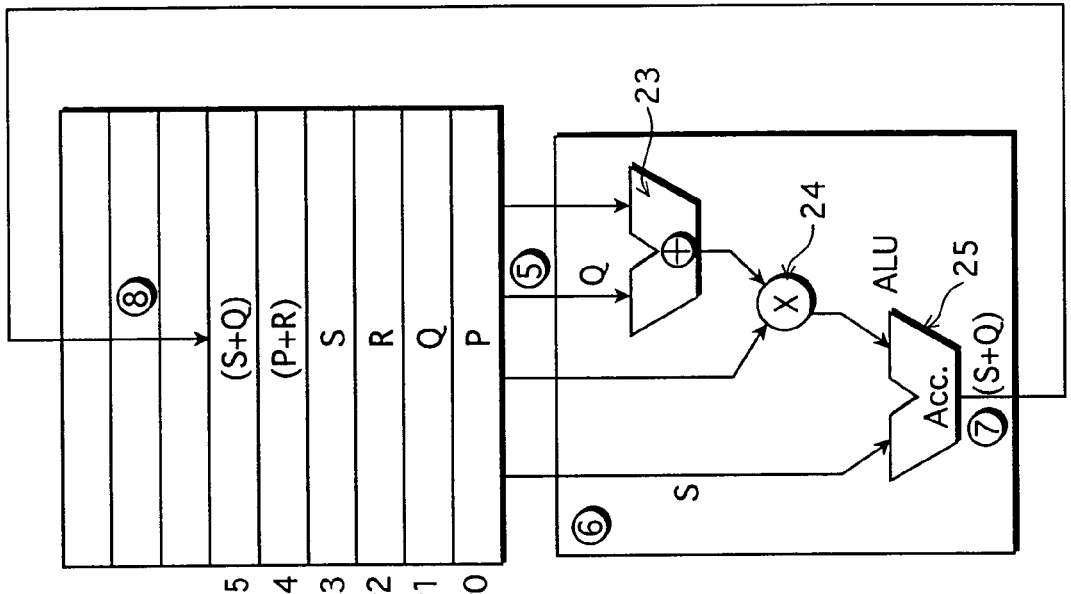
FIG. 56 shows an operation of an ALU on the storage contents shown in FIG. 55.
Figure 56A:
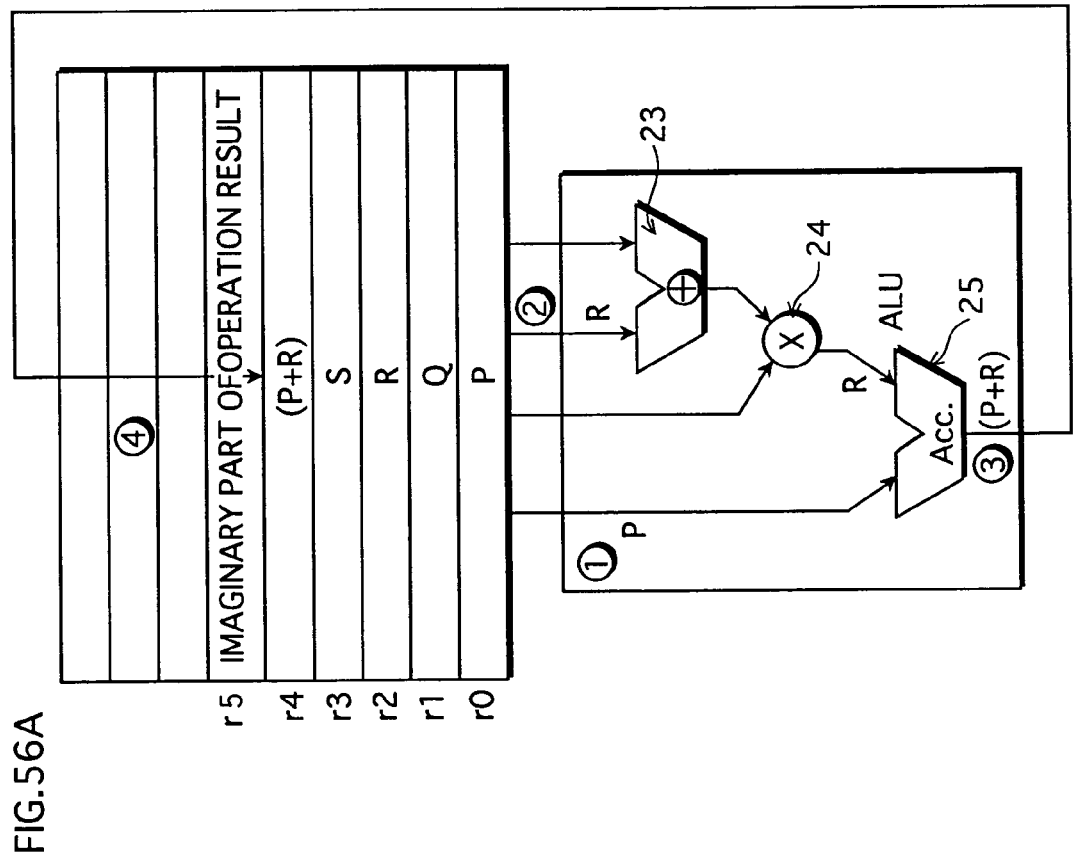

FIG. 56 shows how the ALU performs an addition on the storage contents shown in FIG. 55. Real part P and real part R are transferred from the RF, as indicated by ① and ②. They are added by the accumulator 25, as indicated by ③. The sum P+R is then written to register r4 of the RF, as indicated by ④. Following this, imaginary part Q and imaginary part S are transferred from the RF, as indicated by ⑤ and ⑥. They are added by the accumulator 25, as indicated by ⑦. The sum S+Q is then written to register r5 of the RF, as indicated by ⑧.

Figure 57A:
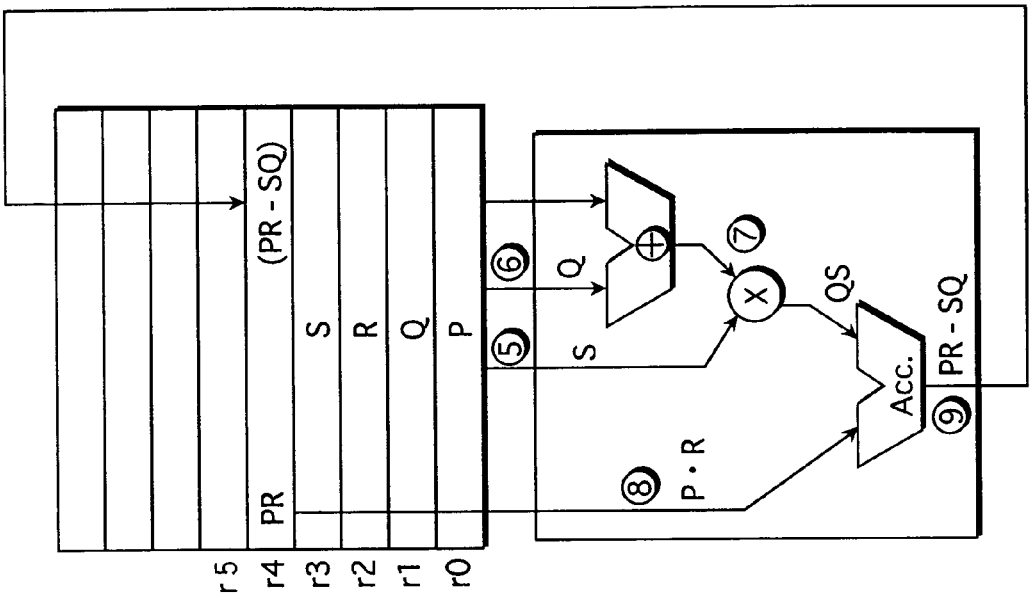
FIG. 57 shows an operation of multiplying complex numbers.
Figure 57B:
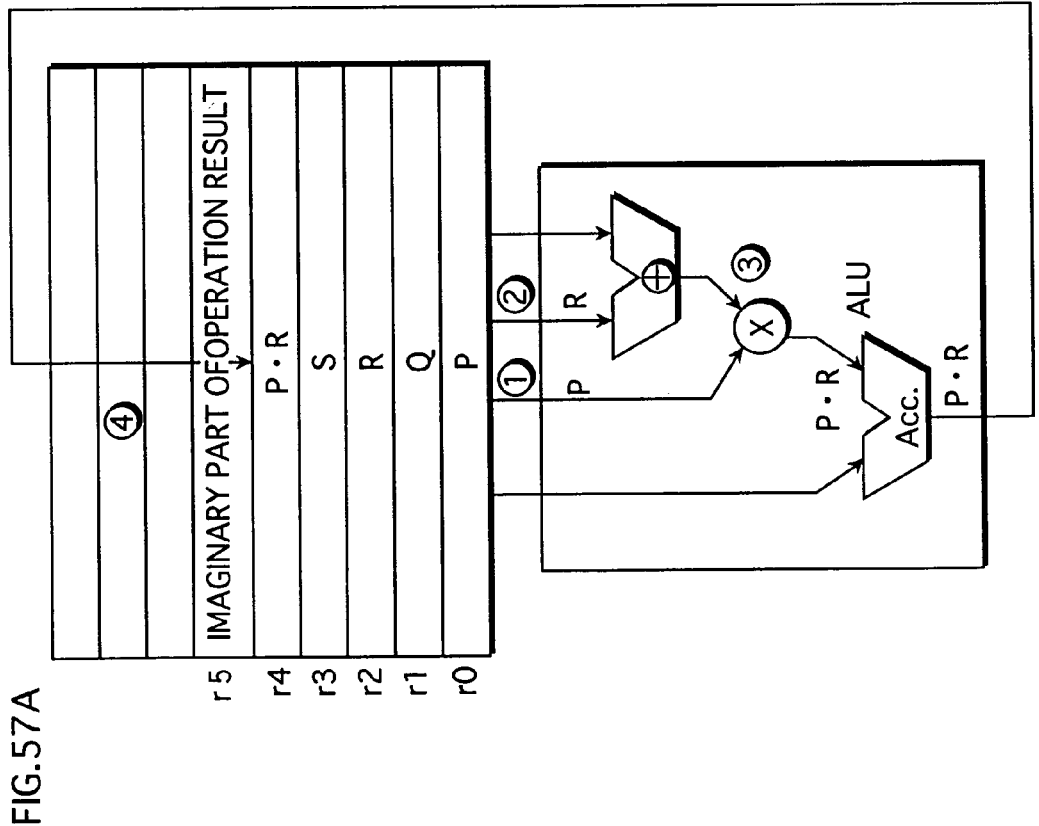
Figure 58B:
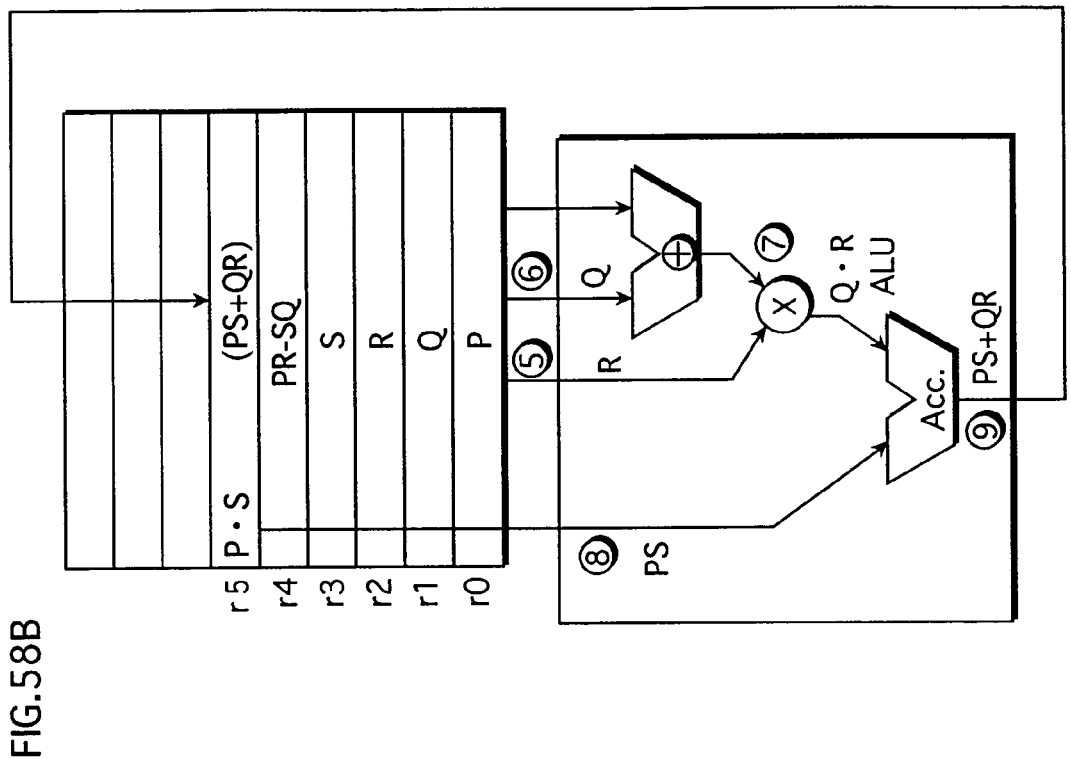
FIG. 58 shows an operation of multiplying complex numbers.
Figure 58A:
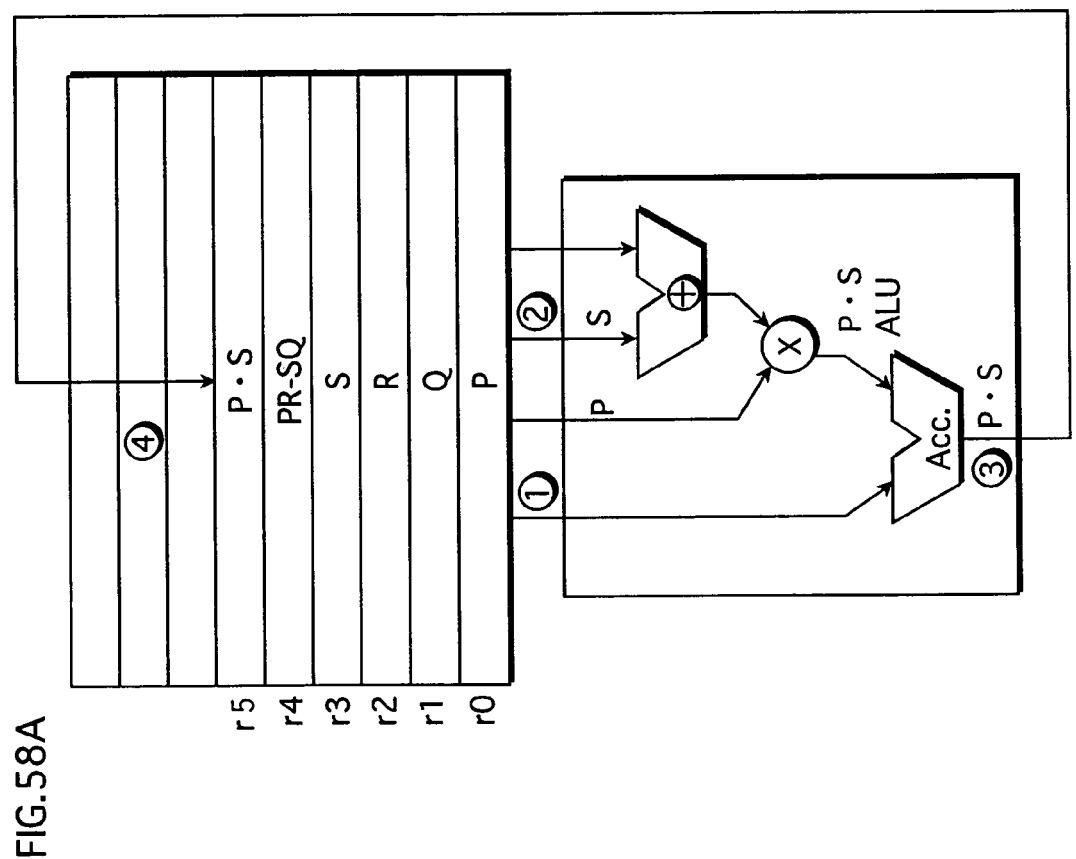

FIGS. 57 and 58 show how the ALU performs a multiplication on the storage contents shown in FIG. 55. First, real parts P and R are transferred from the RF to the ALU, as indicated by ① and ② in FIG. 57A. They are multiplied by the multiplier 24, as indicated by ③. The product P·R is then written to register r4 in the RF, as indicated by ④. Following this, imaginary parts S and Q are transferred from the RF to the ALU, as indicated by ⑤ and ⑥ in FIG. 57B. They are multiplied by the multiplier 24, as indicated by ⑦. Also, the product P·R is read from the RF to the ALU, as indicated by ⑧.

The accumulator 25 subtracts S·Q from P·R, as indicated by ⑨. This yields (P·R−S·Q), which is written to register r4 of the RF. After this, real part P and imaginary part S are read from the RF to the ALU, as indicated by ① and ② in FIG. 58A. They are multiplied by the multiplier 24, as indicated by ③. The product P·S is then written to register r5 of the RF, as indicated by ④. Following this, real part R and imaginary part Q are read from the RF to the ALU, as indicated by ⑤ and ⑥ in FIG. 58B. They are multiplied by the multiplier 24, as indicated by ⑦. Also, the product P·S is read form register r5 of the RF to the ALU, as indicated by ⑧. The accumulator 25 adds Q·R and P·S, as indicated by ⑨. This yields Q·R+S·P, which is written to register r5 of the RF. In this way, the multiplication result (P·R−S·Q)+(Q·R+S·P)i is obtained.

According to this embodiment, the data processor of the first embodiment is applied to perform additions/multiplications on complex numbers. This enables the data processor to be used for media processing in communication systems, such as n/4QPSK modulation.

Eighteenth Embodiment

Figure 59B:
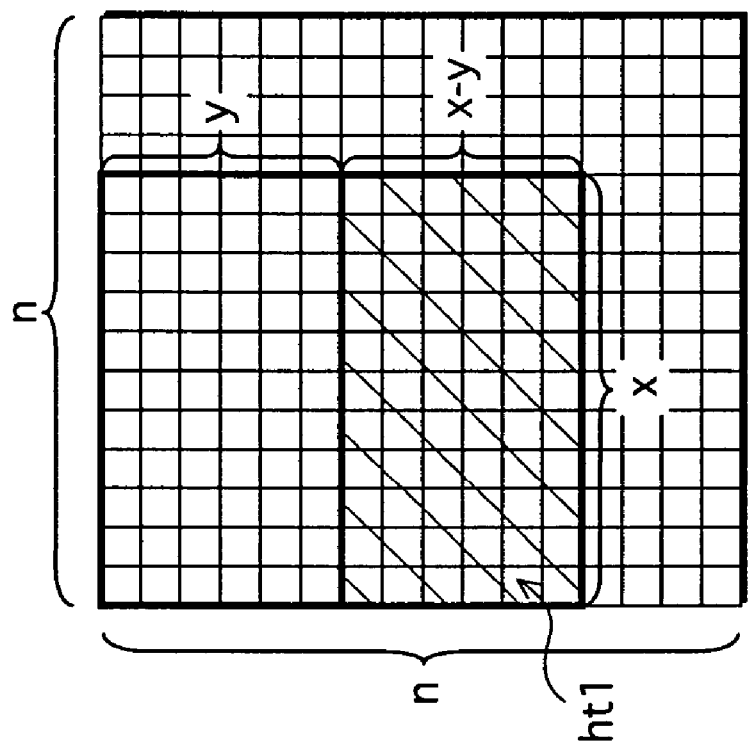
FIGS. 59A and 59B illustrate a process of adding up data elements in a row direction, to which the eighteenth embodiment of the invention relates.
Figure 59A:
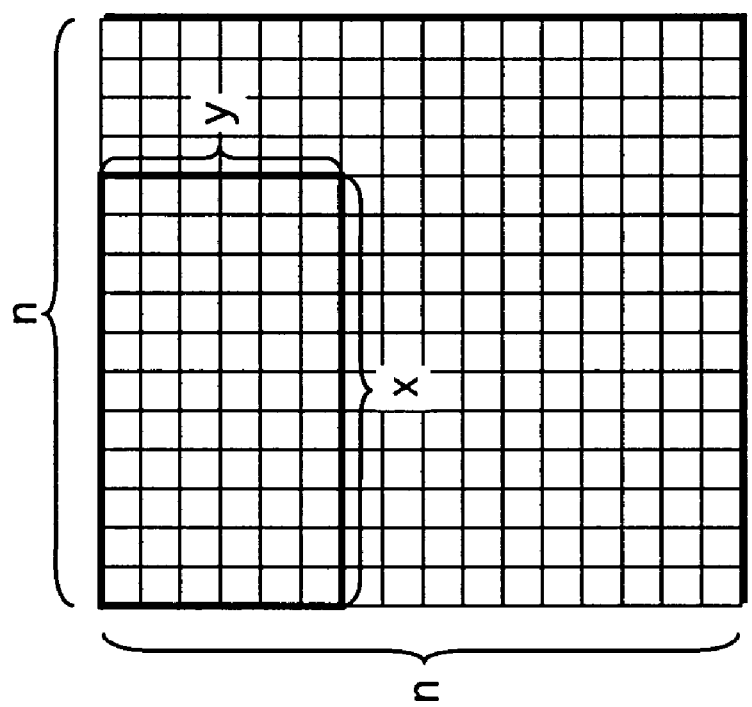

In the eighth embodiment of the invention, a row-direction addition is performed on an n by n matrix, that is, a matrix having equal numbers of rows and columns. The eighteenth embodiment of the invention is a modification to the eighth embodiment. In the eighteenth embodiment, a row-direction addition is performed on a matrix having different numbers of rows and columns. FIG. 59A shows a matrix with y rows and x columns, which is contained in a matrix with n rows and n columns. In the drawing, x≦n and y≦n. Also, x>y. A row-direction addition is performed on such a matrix.

The row-direction addition shown in FIGS. 32 and 33 in the eighth embodiment is directed to a matrix having equal numbers of rows and columns, and therefore cannot be used for the matrix with y rows and x columns shown in FIG. 59A. This being so, hatched part ht1 with x-y rows and x columns is added to the matrix shown in FIG. 59A, to form a matrix with x rows and x columns as shown in FIG. 59B. This matrix can be subjected to the procedure of the eighth embodiment. Here, data elements in hatched part ht1 are all 0. Accordingly, the result of performing the procedure of the eighth embodiment on this x by x matrix is equivalent to the result of performing a row-direction addition on the y by x matrix.

Here, when applying the procedure of the eighth embodiment, equation 7 need be altered as follows:

$$j = mod((i+k-1)/z)$$

where z is a larger one of x and y.

It should be noted that this embodiment is equally applicable when x<y or x=y.

Nineteenth Embodiment

Figure 60C:
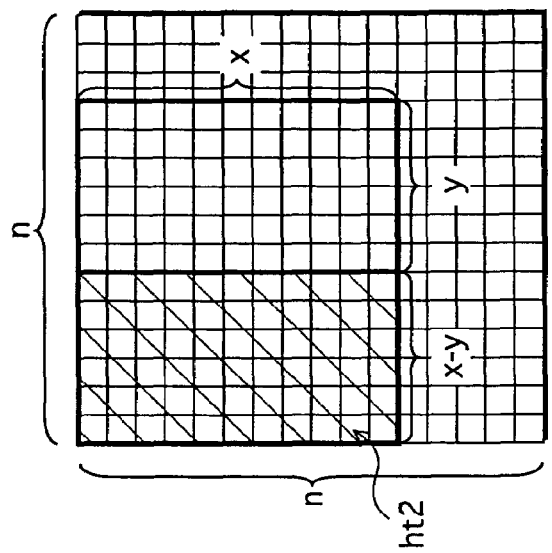
FIGS. 60A-60C illustrate a process of transposing a matrix, to which the nineteenth embodiment of the invention relates.
Figure 60B:
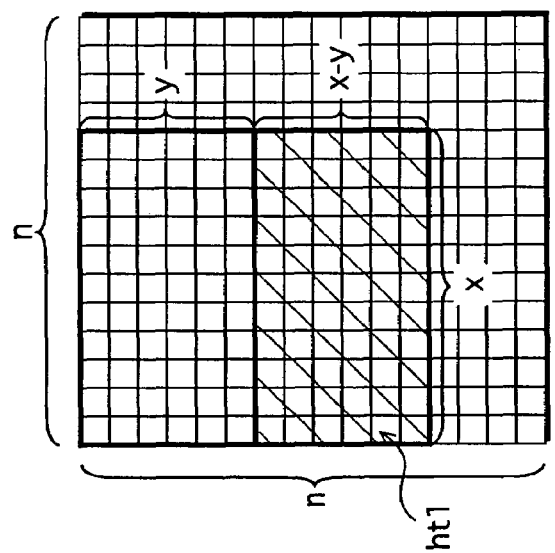
Figure 60A:
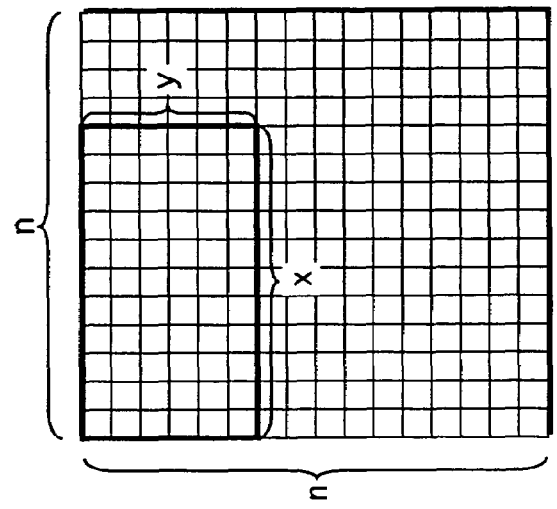

In the ninth embodiment of the invention, a transposition is performed on an n by n matrix, that is, a matrix having equal numbers of rows and columns. The nineteenth embodiment of the invention is a modification to the ninth embodiment. In the nineteenth embodiment, a transposition is performed on a matrix having different numbers of rows and columns. FIG. 60A shows a matrix having y rows and x columns, which is present in a matrix having n rows and n columns. In the drawing, x≦n and y≦n. Also, x>y. A transposition is performed on such a matrix.

The transposition shown in FIGS. 36 to 38 in the ninth embodiment is directed to a matrix having equal numbers of rows and columns, and therefore cannot be used for the matrix with y rows and x columns shown in FIG. 60A. Accordingly, the same approach as the eighteenth embodiment is employed in this embodiment. Which is to say, hatched part ht1 with x-y rows and x columns is added to the y by x matrix shown in FIG. 60A, to form a matrix with x rows and x columns as shown in FIG. 60B. This matrix can be subjected to the procedure of the ninth embodiment. Here, data elements in hatched part ht1 are all 0. When the procedure of the ninth embodiment is performed on this x by x matrix, an x by x matrix shown in FIG. 60C is obtained. This matrix is made up of a matrix with x rows and y columns and a matrix with x rows and x-y columns. Removing the matrix with x rows and x-y columns from the x by x matrix shown in FIG. 60C produces a transpose of the y by x matrix shown in FIG. 60A.

Here, when applying the procedure of the ninth embodiment to the y by x matrix, equation 8 need be altered as follows:

$$j = mod((i+k)/z)$$

where z is a larger one of x and y.

It should be noted that this embodiment is equally applicable when x<y or x=y.

Twentieth Embodiment

The twentieth embodiment of the invention relates to improvements when the data processor is employed in a wireless communication system through the use of shift operations in the RFs of the sixteen PEs. In more detail, the data processor is used for deinterleaving in a wireless communication system.

In a wireless communication system, random errors or burst errors may occur in an encoded signal of a bit sequence transmitted from the transmitter, due to random noise or fading. To reduce the adverse effects of such errors that occur in bunches during transmission, the bit sequence is interleaved, i.e., shuffled out of its naturally occurring order, prior to transmission so that erroneous bits appear to be uniformly distributed in the deinterleaved bit sequence produced at the receiver.

Block interleaving is one typical interleave technique. Block interleaving is to shuffle bits in a bit sequence out of their natural order so that adjacent two bits are separated from each other by a fixed number of bits. For example, a bit sequence is "B1, B2, B3, B4, B5, . . . , B288" before block interleaving. Then the block interleaved bit sequence is "B1, B17, B33, B49, B65, B81, B97, B113, B129, B145, B161, B177, B193, B209, B225, B241, B257, B2, B18, . . . , B288", where adjacent two bits in the original bit sequence (e.g. B1 and B2, B17 and B18) are separated with an interval of 17 bits. FIG. 61 shows bit sequences before and after block interleaving. In the drawing, each bit is expressed by a number for the sake of simplicity. As illustrated, the order of bits in the horizontal direction of the table is the order of bits before block interleaving, whereas the order of bits in the vertical direction of the table is the order of bits after block interleaving.

Depending on a method of transmitting a bit sequence, there are cases where bits at specific positions in the transmission order have a particularly high likelihood of occurrence of an error. For instance, it is experimentally acknowledged that bits at even numbers of positions in the transmission order are highly likely to become errors when a bit sequence is transmitted according to 16 QAM.

In such a case, even if the bit sequence is deinterleaved at the receiver, erroneous-bits appear adjacent to each other in the deinterleaved bit sequence. It is difficult to correct such adjacent errors by an error correction function, when decoding the deinterleaved bit sequence.

To avoid this problem, the block-interleaved bit sequence is divided into blocks of a predetermined number of bits, and the bits in each block are rearranged according to a predetermined rotation rule.

FIG. 62 shows a bit sequence as a result of rearranging the block-interleaved bit sequence according to the rotation rule. In the drawing, the block-interleaved bit sequence is divided into 3-bit blocks, and the bits in each of these blocks are rearranged in the order of any of rotations 1, 2, and 3 which alternate in units of six blocks, so that rotations 1, 2, and 3 make a round in every sixteen blocks. Here, rotation 1 maintains the original order. Rotation 2 rotates a block so that the first bit becomes the third bit, the second bit becomes the first bit, and the third bit becomes the second bit. Rotation 3 rotates a block so that the first bit becomes the second bit, the second bit becomes the third bit, and the third bit becomes the first bit.

In so doing, the above problem can be overcome. The receiver in the wireless communication system stores an address showing the original position of each received bit in a memory, and reorders the received bits according to the addresses in the memory to reconstruct the bit sequence in its original order.

However, the use of memory to store such addresses causes an increase in power consumption and hardware scale. In view of this, the data processor of the twentieth embodiment performs deinterleaving without using a memory for storing an address which shows the original position of each demodulated bit.

The data processor of the twentieth embodiment is described in detail below, by referring to drawings.

The data processor is used in a wireless communication system. The data processor receives a bit sequence that is modulated by 64 QAM (quadrature amplitude modulation).

In 64 QAM, the in-phase signal (I signal) and the quadrature signal (Q signal) are amplitude-modulated. The I signal and the Q signal are obtained by converting each 3-bit block (also called a "mapping bit") of an interleaved and rearranged bit sequence into data that shows a phase and an amplitude (data composed of the in-phase component I and the quadrature component Q) and performing an IFFT (inverse fast Fourier transform) on the converted data. Here, an interleaved and rearranged bit sequence is obtained through the following three processes (1) to (3).

(1) A bit sequence is interleaved so that adjacent bits are separated with an interval of 17 bits.

(2) The interleaved bit sequence is divided into 3-bit blocks.

(3) The bits in each block are rearranged in any of the original order of 1-2-3, the order of 2-3-1 (the second, third, and first bits are shifted respectively to the first, second, and third positions), and the order of 3-1-2 (the third, first, and second bits are shifted respectively to the first, second, and third positions), the three orders alternating in units of six blocks.

In more detail, the bits in each of blocks 1 to 6 are unchanged. The bits in each of blocks 7 to 12 are rearranged in the order of 2-3-1. The bits in each of blocks 13 to 18 are rearranged in the order of 3-1-2. The same is repeated for block 19 and subsequent blocks.

In this embodiment, each block is made up of 3 bits for convenience's sake. However, the invention is not limited to such. Likewise, the interval used in interleaving is not limited to 17 bits, so long as it is "(an integral multiple of the number of bits in one block)−1". Furthermore, the rearrangements are not limited to the above three rotations, so long as they correspond to the number of bits in one block.

Figure 63:
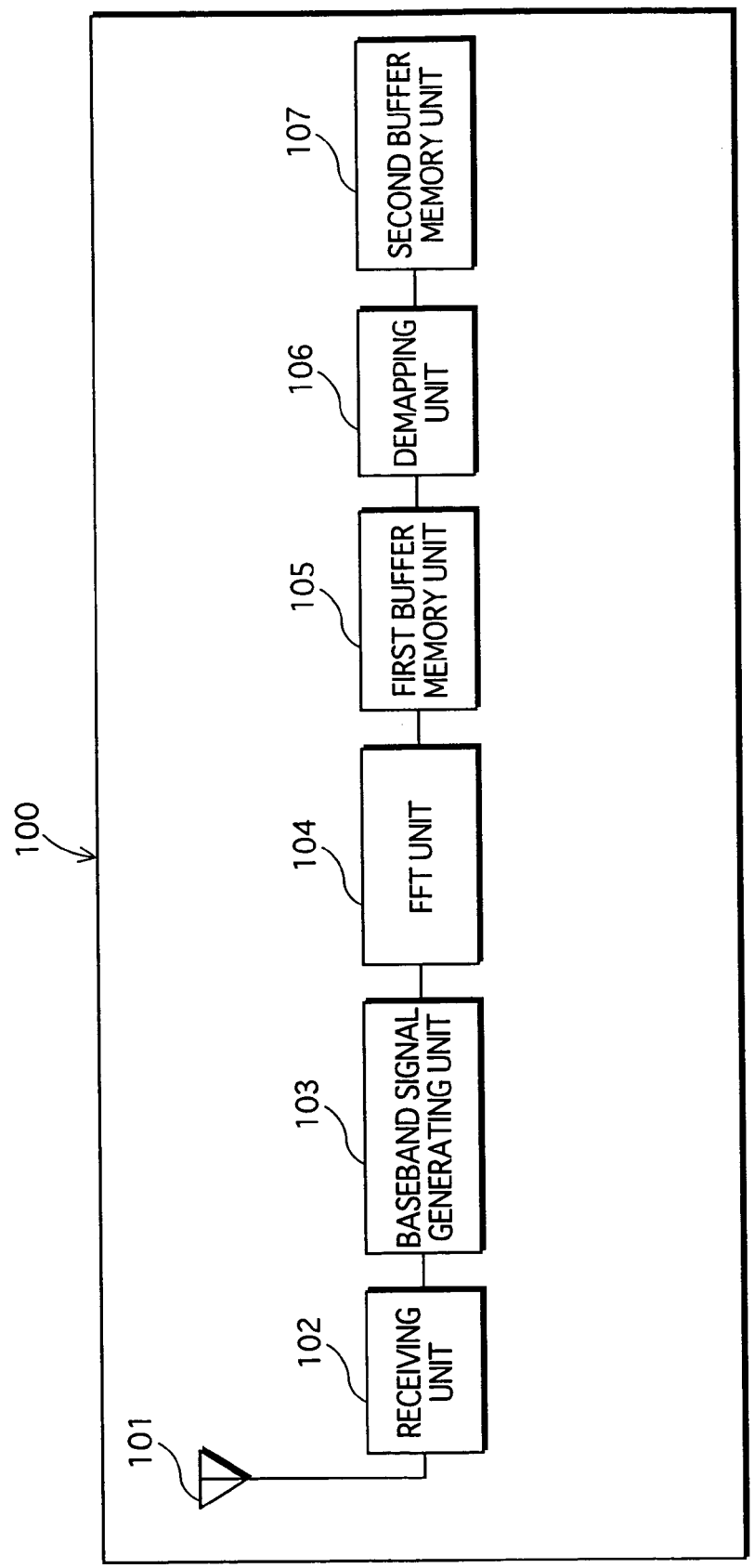
FIG. 63 is a functional block diagram showing a main construction of a data processor to which the twentieth embodiment of the invention relates.

FIG. 63 is a functional block diagram showing a main construction of the data processor of this embodiment. The data processor 100 is roughly made up of an antenna 101, a receiving unit 102, a baseband signal generating unit 103, a FFT unit 104, a first buffer memory unit 105, a demapping unit 106, and a second buffer memory unit 107.

The receiving unit 102 receives an OFDM (orthogonal frequency division multiplex) signal through the antenna 101, and outputs the OFDM signal to the baseband signal generating unit 103.

The baseband signal generating unit 103 performs an IDFT (inverse discrete Fourier transform) on the OFDM signal to generate a baseband signal, and outputs it to the FFT unit 104.

The FFT unit 104 demodulates the baseband signal to obtain mapping bits. This is done by converting the baseband signal to a digital signal in the output order, separating it into the I signal and the Q signal, and performing a FFT on each separated signal.

Here, the bits in each mapping bit within the baseband signal are each subjected to soft judgment. The result of the soft judgment is expressed by a soft judgment value showing, in 4 bits, whether the bit to be demodulated is closer to 0 or 1. As a result of the soft judgment, each mapping bit of 3 bits in the baseband signal is converted to a bit unit block of 12 bits. The obtained bit unit blocks are stored in the first buffer memory unit 105.

Figure 64:
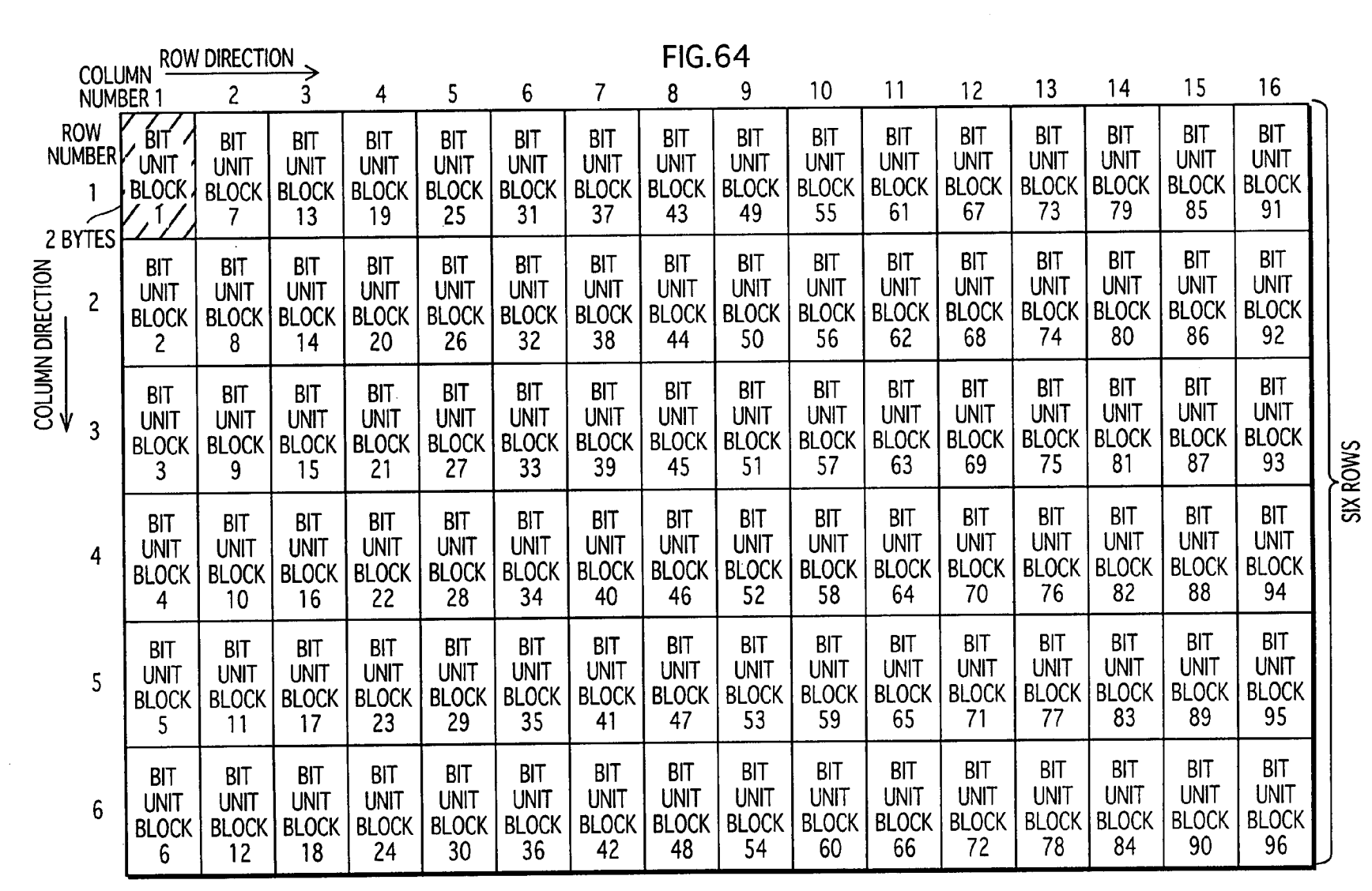

The first buffer memory unit 105 has a plurality of 2-byte storage units. In the first buffer memory unit 105, sixteen storage units arranged in a horizontal direction form one row. FIG. 64 shows an example of the first buffer memory unit 105. Six rows of storage units form a 6 by 16 matrix. This 6 by 16 matrix has a capacity of 192 bytes. One bit unit block is stored in each 2-byte storage unit. Six bit unit blocks are stored in six storage units which form one column. In this example, the number of bit unit blocks in one column is 6. The number of bit unit blocks in one column is determined by W/S where W−1 is the interval used in the interleaving and S is the number of bits in one block (W and S are natural numbers). The first buffer memory unit 105 also stores the PE numbers of the sixteen PEs included in the demapping unit 106 in correspondence with the RF numbers of the RFs in the PEs.

The demapping unit 106 reads sixteen horizontal bit unit blocks from storage units of the first buffer memory unit 105, and performs bit unit output processing for each bit unit block. The demapping unit 106 writes the output bit units to the second buffer memory unit 107.

The second buffer memory unit 107 has a storage area in the form of a matrix with 18 rows and 16 columns, where one row is 64 (16×4) bits.

The bit unit output processing performed by the demapping unit 106 is explained in detail below.

Figure 65:
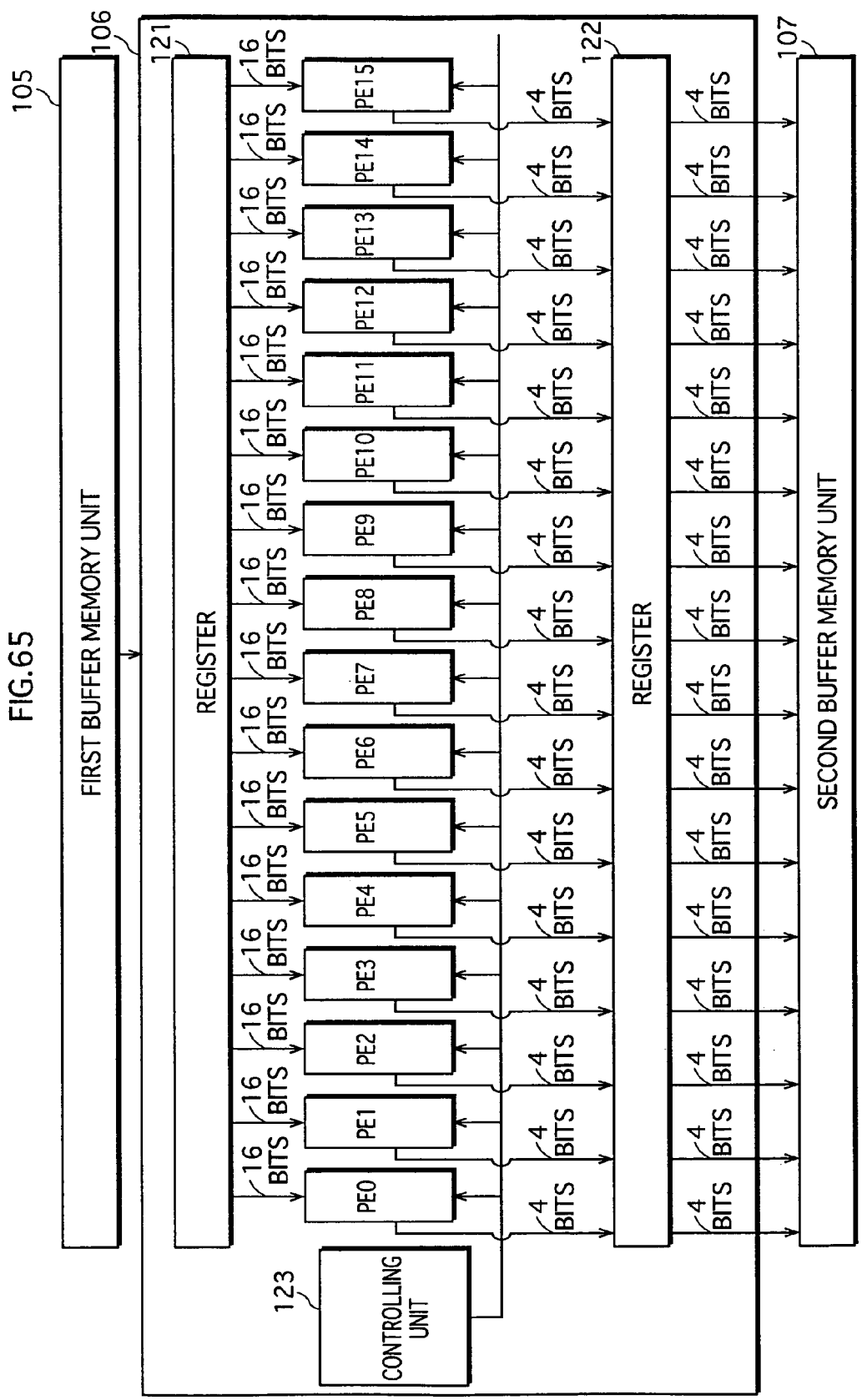
FIG. 65 is a block diagram showing a construction of a demapping unit shown in FIG. 63.

FIG. 65 is a block diagram showing a construction of the demapping unit 106. As illustrated, the demapping unit 106 includes registers 121 and 122, a controlling unit 123, and PE0 to PE15.

The register 121 stores sixteen horizontal bit unit blocks read from the first buffer memory unit 105. In the register 121, a storage unit of 16 bits is assigned to each bit unit block. Of the sixteen horizontal bit unit blocks stored in the register 121, bit unit block 1 which belongs to column 1 is associated with PE0, bit unit block 7 which belongs to column 2 is associated with PE1, and bit unit block 13 which belongs to column 3 is associated with PE2.

The register 122 is connected to each PE via a bus for transferring 4-bit data. The register 122 stores bit units of 4 bits output from the PEs, in the arrangement order of the PEs outputting the bit units. For example, the bit unit output from PE0, the bit unit output from PE1, and the bit unit output from PE2 are stored in the register 122 in this order.

The controlling unit 123 reads the sixteen horizontal bit unit blocks from the sixteen horizontal storage units in the first buffer memory unit 105, and stores them to the register 121. The controlling unit 123 also reads the PE numbers from the first buffer memory unit 106, and assigns them to the RFs of the corresponding PEs. As a result, the PE numbers are assigned to the RFs of the PEs, such that the PE number 0 is assigned to the RF of PE0, the PE number 1 is assigned to the RF of PE1, and the PE number 2 is assigned to the RF of PE2. The controlling unit 123 then instructs each PE to execute an operation, using a SIMD instruction. SIMD makes one instruction operate at the same time on multiple data items.

Each time sixteen bit units are output from the PEs to the register 122, the controlling unit 123 reads the sixteen bit units from the register 122, and writes them to the second buffer memory unit 107. Here, the controlling unit 123 starts a new row each time sixteen bit units are written to the second buffer memory unit 107. As a result, a 18 by 16 matrix with one row being made up of 64 (16×4) bits is created on the second buffer memory unit 107.

Figure 66:
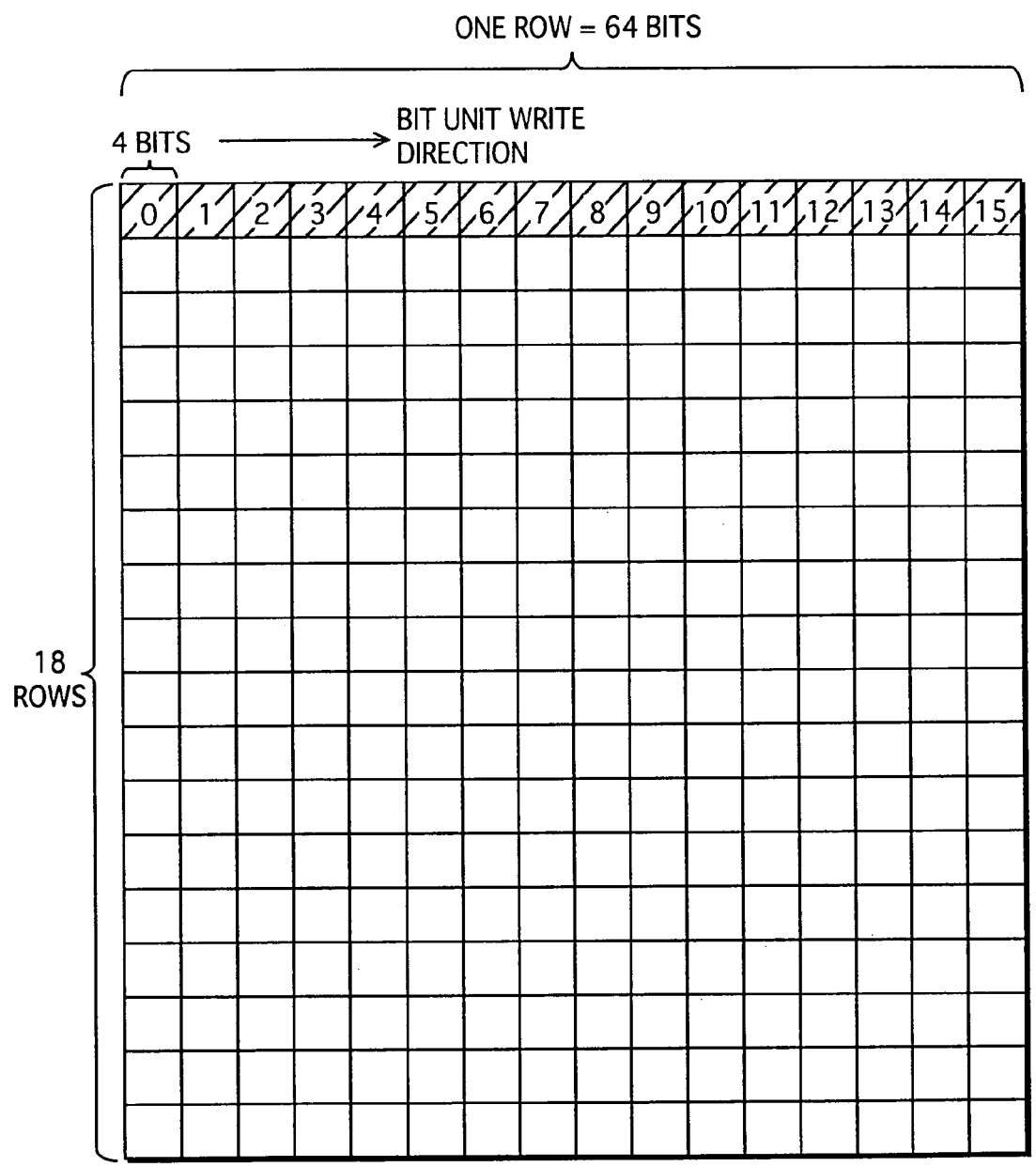
FIG. 66 shows an example structure of storage units of a second buffer memory unit shown in FIG. 63.

FIG. 66 shows an example of the second buffer memory unit 107. The diagonally shaded area represents a state where sixteen bit units of 4 bits output from the PEs have been written in the first row of the second buffer memory unit 107 in accordance with the arrangement order of the PEs. The numbers written in the diagonally shaded area are the PE numbers of the PEs that output the bit units.

Figure 67:
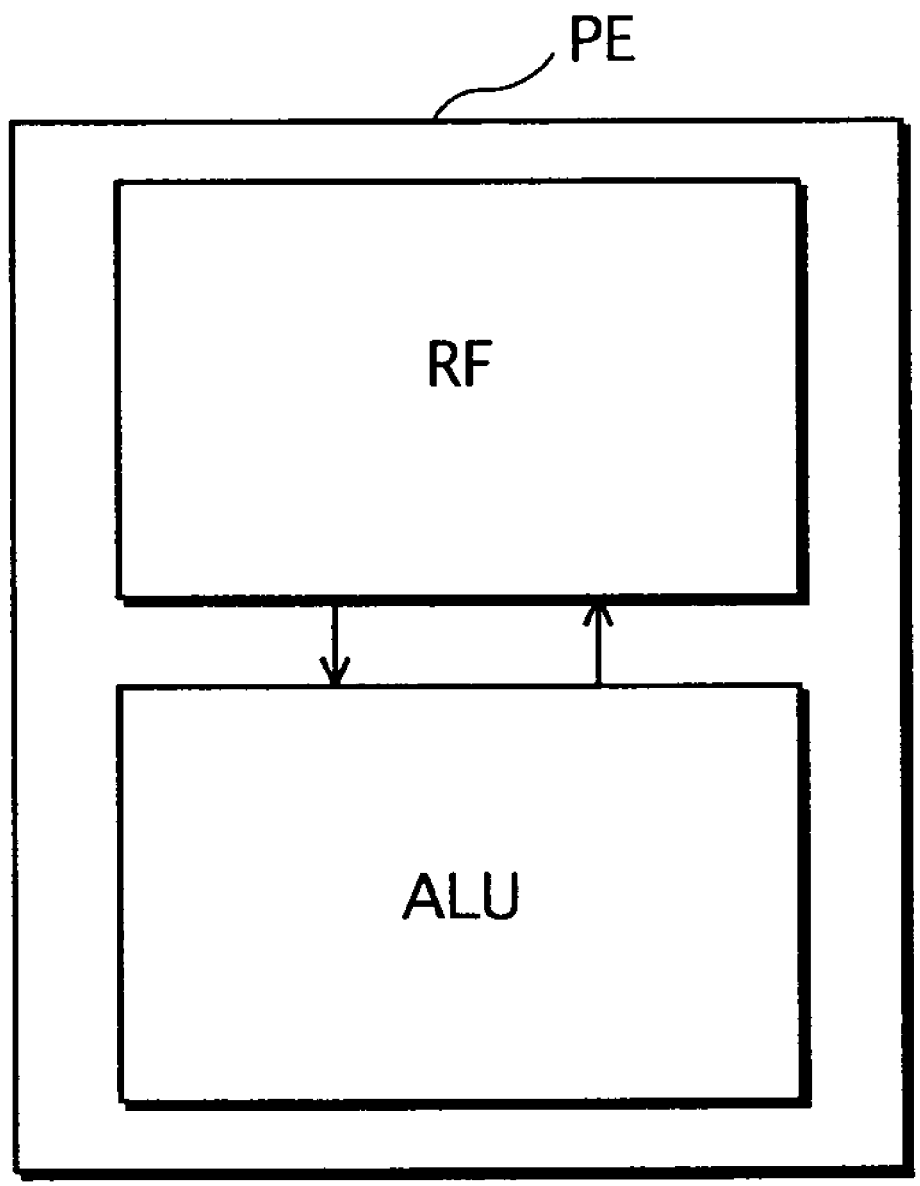
FIG. 67 is a block diagram showing a construction of a PE.

FIG. 67 shows an inner construction of each of PE0 to PE15. As illustrated, each PE has a RF and an ALU. The RF stores the PE number showing the position of the PE in the PE arrangement order. In more detail, the PE number 0 is stored in the RF of PE0, and the PE number 1 is stored in the RF of PE1. Thus, the PE numbers are stored in the RFs of the PEs in accordance with the PE arrangement order. As an alternative, each PE may include a nonvolatile memory device storing the corresponding PE number beforehand.

The ALU performs an operation according to an instruction by the controlling unit 123.

The operation performed by the ALU is "(X+L)MOD S" where X is the PE number stored in the RF. The result of this operation is denoted by Z0, and the value obtained by multiplying Z0 by 4 is demoted by Z1.

Also, L is a variable showing the number of operations, and S is the number of bits in one block in the original bit sequence. Here, S=3. "(X+L)MOD S" is an operation of computing the remainder when X+L is divided by S.

Once Z1 has been obtained, the ALU left shifts the bit unit block stored in the register 121 by Z1, and then right shifts it by 12 bits. The lower 4 bits of the shift result are output to the register 122 as a bit unit.

After this, the above operation is repeated with variable L being incremented by 1 (i.e., L=2), thereby updating Z0. This Z0 is multiplied by 4, to yield new Z1. By repeatedly updating Z0 in this way, the three bits units included in the bit unit block are output to the register 122 in the order of bits in the corresponding block in the original bit sequence.

The following explains a procedure performed by each construction element of this data processor, with reference to flowcharts.

Figure 68:
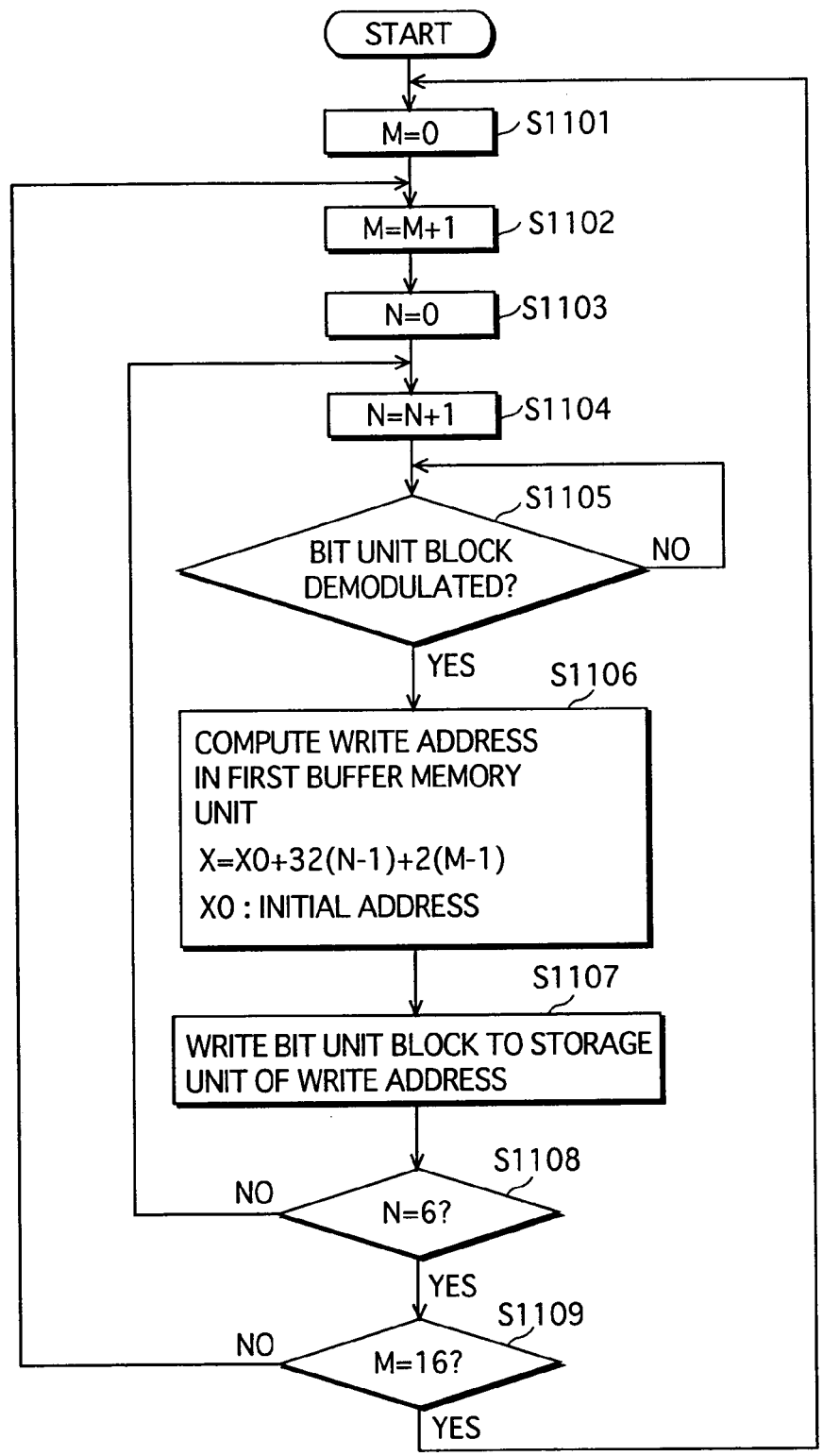
FIG. 68 is a flowchart showing a procedure performed by a FFT unit shown in FIG. 63, to store each demodulated bit unit block to the first buffer memory unit.

FIG. 68 is a flowchart showing a procedure of the FFT unit 104. The FFT unit 104 initializes variable M (S1101) and increments variable M by 1 (S1102). The FFT unit 104 also initializes variable N (S1103) and increments variable N by 1 (S1104).

After one bit unit block is demodulated (S1105:YES), the FFT unit 104 computes address X for writing the bit unit block to the first buffer memory unit 105, according to an equation "X=X0+32(N−1)+2(M−1)" shown in step S1106 in FIG. 68 (S1106). Here, X0 is an initial address of the first buffer memory unit 105.

This equation is set based on an assumption that a 2-byte storage unit is assigned for each bit unit block.

Next, the FFT unit 104 writes the bit unit block to a storage unit of the first buffer memory unit 105 specified by the address computed in step S1106 (S1107). The FFT unit 104 then judges whether N=6 (S1108).

If N≠6 (S1108:NO), the FFT unit 104 increments variable N by 1 (S1104), and repeats steps S1105 to S1108 until N=6.

If N=6 (S1108:YES), the FFT unit 104 judges whether M=16 (S1109). If M≠16 (S1109:NO), the FFT unit 104 repeats steps S1102 to S1109 until M=16.

If M=16 (S1109:YES), the FFT unit 104 initializes variable M (S1101), and repeats steps S1102 to S1109.

In this way, a 6 by 16 matrix of demodulated bit unit blocks is formed on the first buffer memory unit 105.

Figure 69:
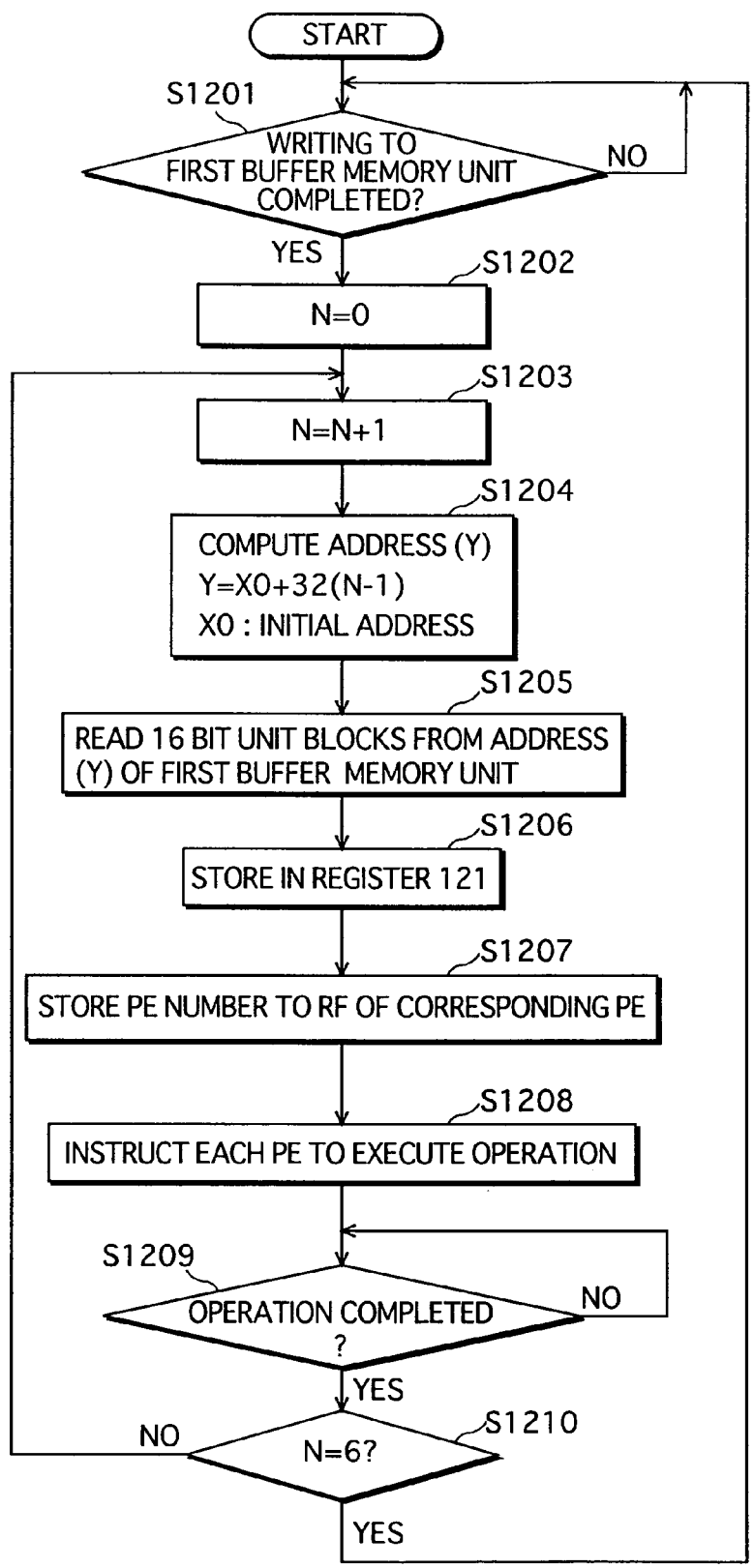
FIG. 69 is a flowchart showing a procedure performed by a controlling unit shown in FIG. 65, to output bit units from bit unit blocks.

FIG. 69 is a flowchart showing the bit unit output processing of the demapping unit 106. This processing is executed by the controlling unit 123 to output three bit units from each bit unit block.

When the FFT unit 104 has written 96 demodulated bit unit blocks to the storage units of the first buffer memory unit 105 (S1201), the controlling unit 123 initializes variable N (S1202) and increments variable N by 1 (S1203). The controlling unit 123 computes address Y of the first bit unit block for reading sixteen bit unit blocks from the first buffer memory unit 105, according to an equation "Y=X0+32(N−1)" shown in step S1204 in FIG. 69 (S1204). Here, X0 is an initial address of the first buffer memory unit 105. The controlling unit 123 then reads sixteen bit unit blocks starting from a storage unit of the first buffer memory unit 105 specified by address Y (S1205), and stores them to the register 121 in the demapping unit 106 (S1206).

Next, the controlling unit 123 reads the PE numbers from the first buffer memory unit 105, and stores the PE numbers to the RFs of the corresponding PEs (S1207). The controlling unit 123 instructs each PE to execute an operation on a corresponding bit unit block stored in the register 121, based on a SIMD instruction (S1208). Note here that SIMD makes one instruction operate on multiple data items. Once the operation for the sixteen bit unit blocks has been completed (S1209:YES), the controlling unit 123 judges whether N=6 (S1210).

If N=6 (S1210:YES), the controlling unit 123 repeats steps S1201 to S1210. If N≠6 (S1210:NO), the controlling unit 123 repeats steps S1203 to S1210.

Figure 71:
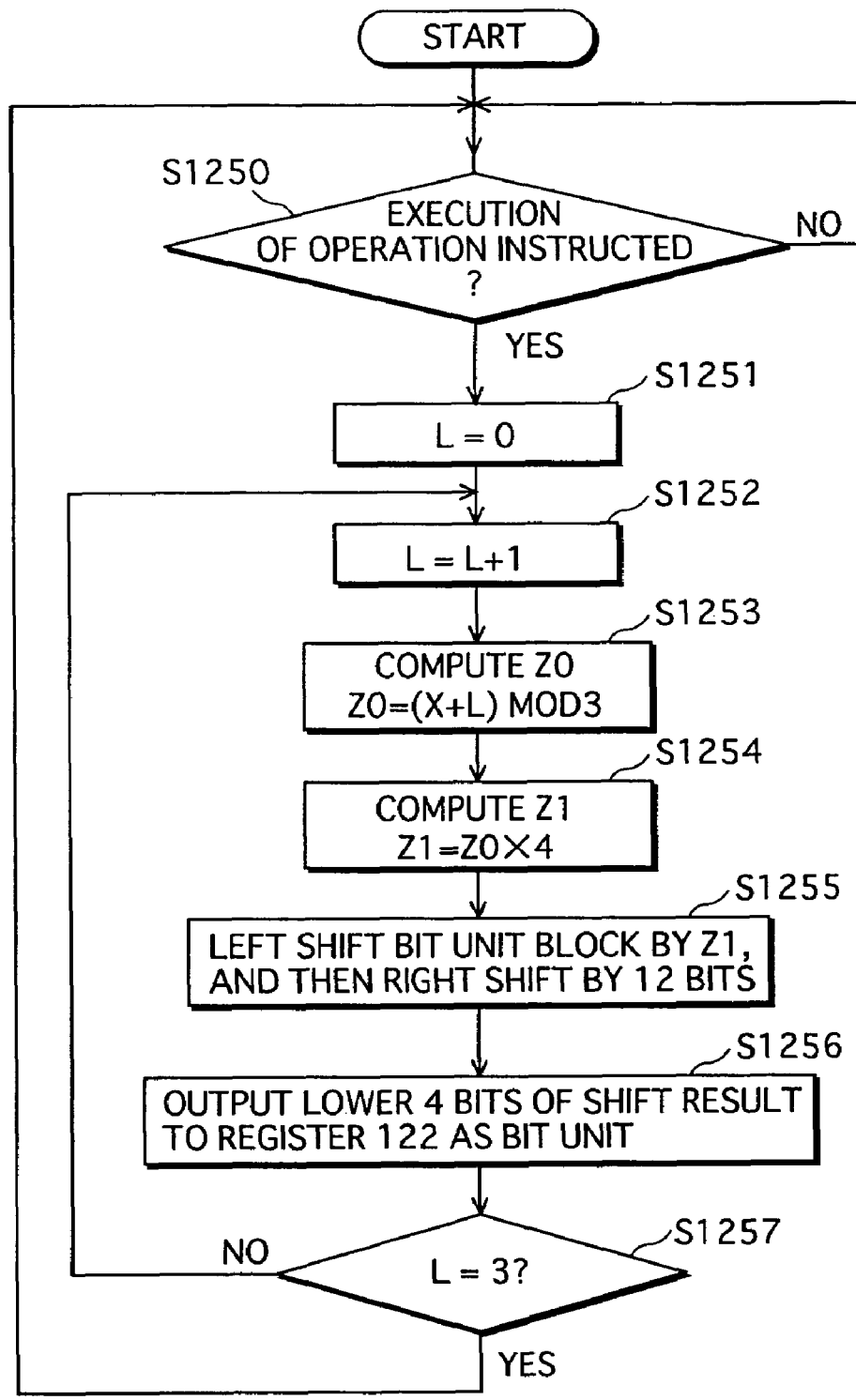
FIG. 71 is a flowchart showing an operation performed by each PE.

FIG. 71 is a flowchart showing the operation performed by each PE according to the instruction from the controlling unit 123.

When the instruction to execute the operation is issued from the controlling unit 123 (S1250:YES), each PE initializes variable L (S1251) and increments variable L by 1 (S1252). The PE then reads PE number X from the RF, and performs an operation "(X+L) MOD 3" to find Z0 (S1253). The PE further multiplies Z0 by 4 to obtain Z1 (S1254).

Following this, the PE executes the following shift operation (S1255).

The PE reads a corresponding bit unit block from the register 121. The PE left shifts the bit unit block by Z1, and then right shifts it by 12 bits.

The PE outputs the lower 4 bits of the shift result to the register 122 as a bit unit (S1256). After this, the PE judges whether L=3 (S1257).

If L=3 (S1257:YES), the PE repeats steps S1250 to S1257. If L≠3 (S1257:NO), the PE repeats steps S1252 to S1257.

Figure 70:
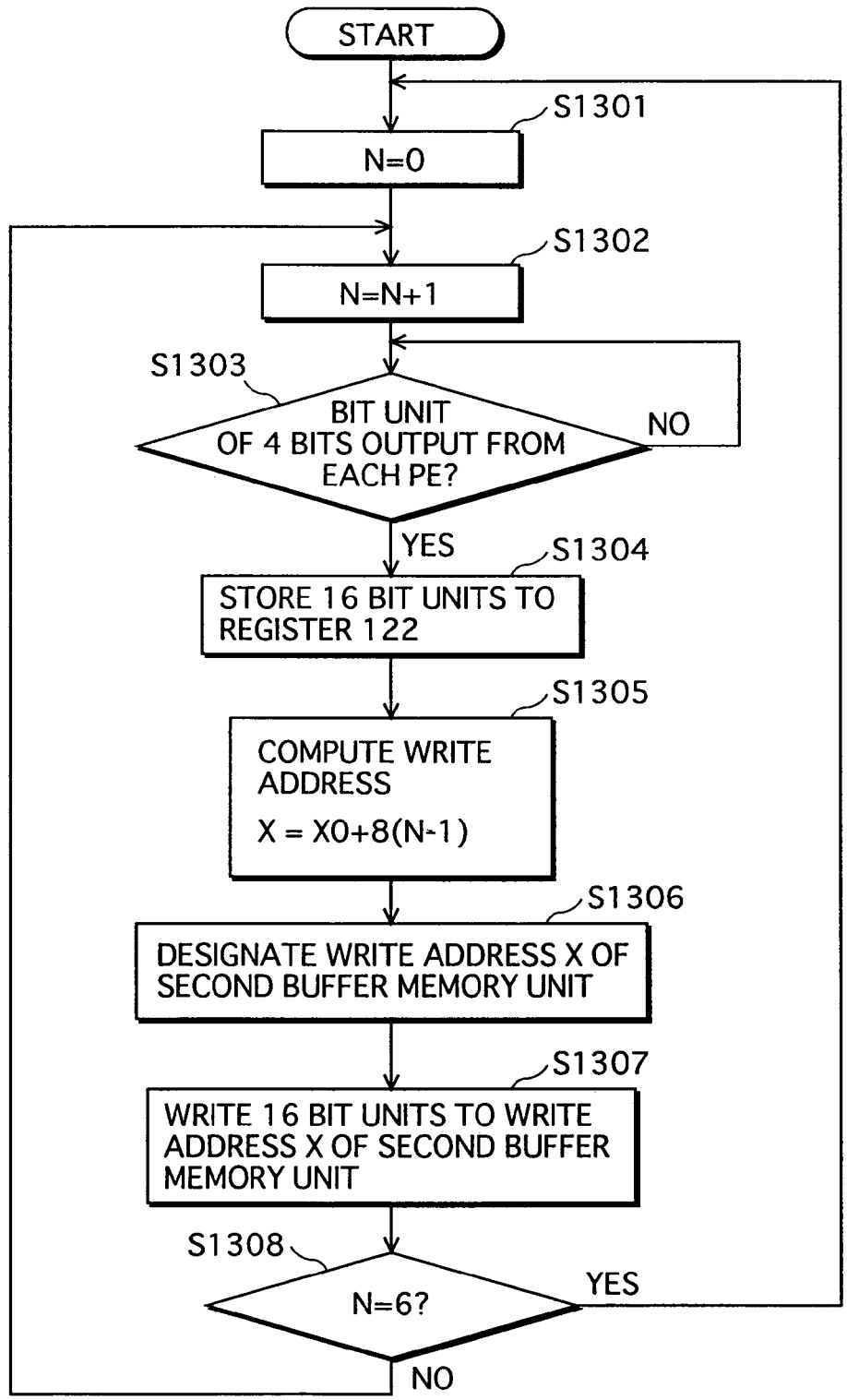
FIG. 70 is a flowchart showing a procedure performed by the demapping unit, to write output bit units to the second buffer memory unit.

FIG. 70 is a flowchart showing a procedure of writing bit units to the second buffer memory unit 107 by the demapping unit 106.

The controlling unit 123 initializes variable N (S1301), and increments variable N by 1 (S1302). When a bit unit of 4 bits is output from each PE (S1303:YES), the controlling unit 123 writes the output sixteen bit units to the register 122 (S1304). The controlling unit 123 then computes address X for writing the bit units to the second buffer memory unit 107, according to an equation "X=X0+8(N−1)" shown in step S1305 in FIG. 70. Here, X is an address expressed in bytes, and X0 is an initial address of the second buffer memory unit 107. Accordingly, the sixteen bit units in the register 122 are written to the second buffer memory unit 107 starting with a storage unit specified by address X, in the arrangement order of the PEs that output the bit units (S1307). The controlling unit 123 then judges whether N=6 (S1308).

If N≠6 (S1308:NO), the controlling unit 123 repeats steps S1302 to S1308.

If N=6 (S1308:YES), the controlling unit 123 returns to step S1301.

According to this embodiment, it is possible to reorder the bits in each block of a received bit sequence to their original order, without using a memory for storing an address which shows the original position of each bit. This contributes to lower power consumption and smaller hardware scale.

This embodiment describes the case where a mapping bit of 3 bits is demodulated as a bit unit block of 12 bits as a result of soft judgment, but a mapping bit may instead be demodulated as a bit unit block of 3 bits without performing soft judgment. Even if soft judgment is employed, the number of demodulated bits is not limited to 12.

This embodiment describes the case where the number of PEs in the demapping unit 106 is 16, but the number of PEs is not limited to such.

The computation of Z0 is not limited to the equation shown in step S1253 in FIG. 71. For example, an equation that varies a flag may be set so that Z1 is read from a register which stores S values of Z1 depending on the status of the flag.

This embodiment describes the case where the register 121 is connected to each PE via a bus for transferring data of 16 bits, but the register 121 may be connected to each PE via a bus for transferring data of 12 bits. In this case, the procedure shown in FIG. 71 is modified such that "X+L" is changed to "X+L−1" and a right shift of 12 bits is changed to a right shift of 8 bits.

Twenty-First Embodiment

The twenty-first embodiment of the invention is a modification to the twentieth embodiment, and aims to omit the first buffer memory unit 105.

Figure 72:
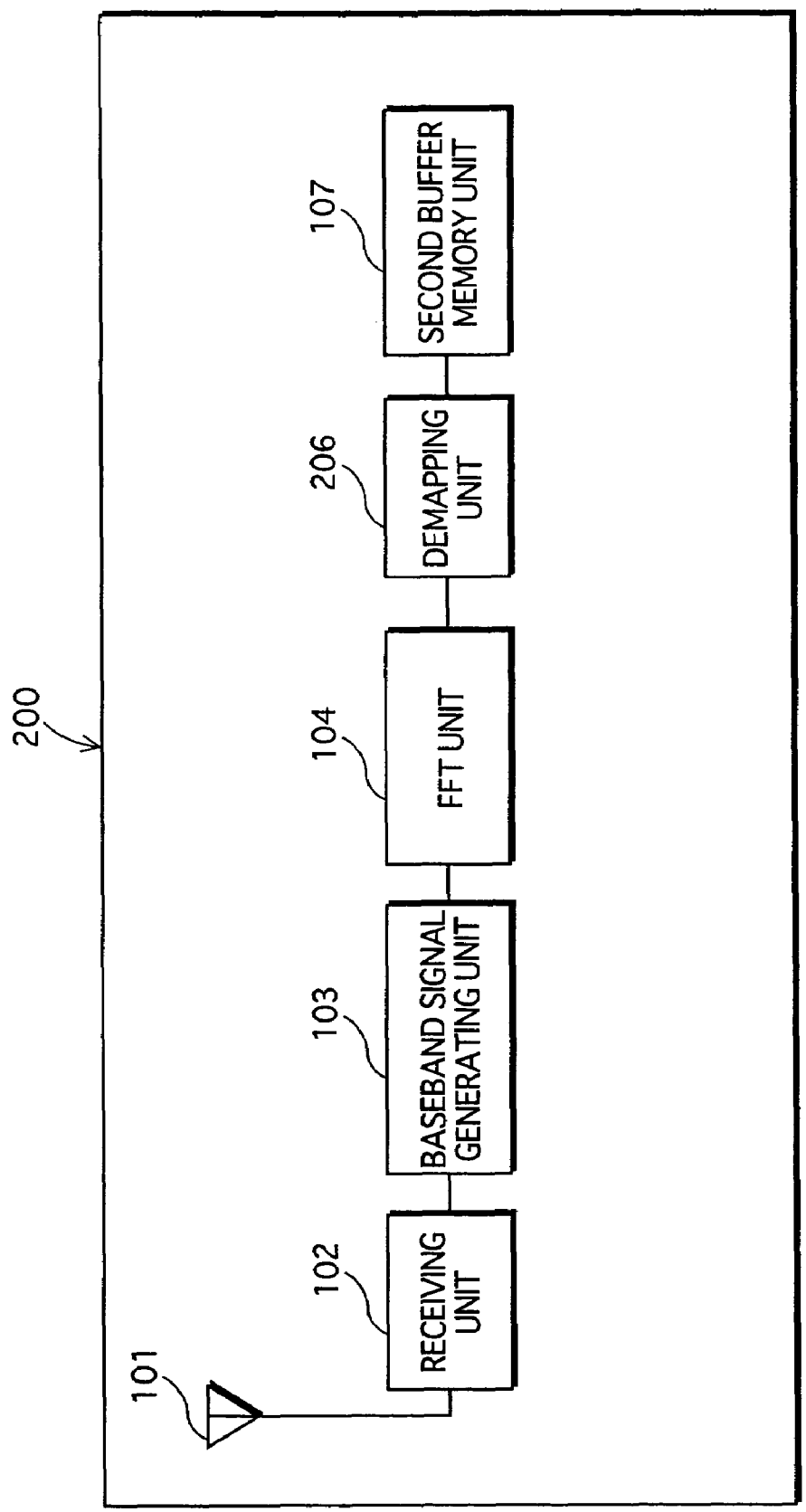
FIG. 72 is a functional block diagram showing a main construction of a data processor to which the twenty-first embodiment of the invention relates.

FIG. 72 is a functional block diagram showing a main construction of a data processor to which this embodiment relates. The data processor 200 is roughly made up of the antenna 101, the receiving unit 102, the baseband signal generating unit 103, the FFT unit 104, a demapping unit 206, and the second buffer memory unit 107.

The data processor of this embodiment differs from that of the twentieth embodiment in that the first buffer memory unit 105 has been omitted and the demapping unit 206 has replaced the demapping unit 106. The other construction elements are the same as those in the twentieth embodiment.

The FFT unit 104 converts a baseband signal output from the baseband signal generating unit 103 to a digital signal in the output order, and separates it into the I signal and the Q signal. The FFT unit 104 performs a FFT on each separated signal, to obtain demodulated mapping bits (bit unit blocks).

Figure 73:
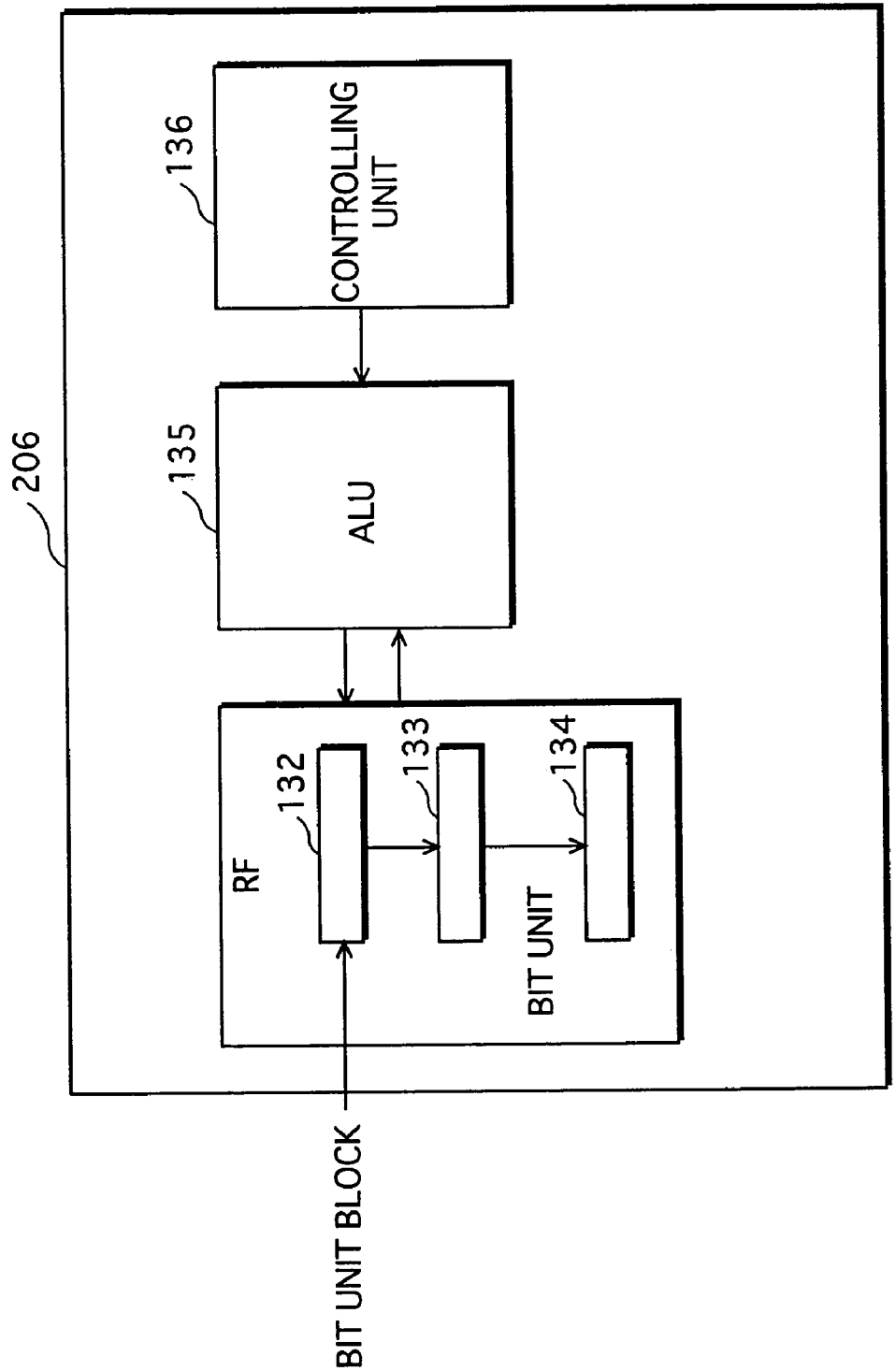
FIG. 73 is a functional block diagram showing a construction of a demapping unit shown in FIG. 72.

FIG. 73 shows an inner construction of the demapping unit 206. The demapping unit 206 includes at least one PE. The PE includes an RF which is made up of 16-bit registers 132 to 134, an ALU 135, and a controlling unit 136.

The register 132 stores a bit unit block read from the FFT unit 104.

The register 133 stores the bit unit block shifted by the register 132.

The register 134 stores three bit units (each of which is 4 bits) obtained by the ALU 135. The lower 4 bits of the register 134 are read as a bit unit.

The ALU 135 performs an operation on the bit unit block stored in the register 133. This operation is a preprogrammed operation "floor((N−1)/(W/S)) MOD S". Here, "floor" is a floor function. A floor function is a function that gives the integer part of the quotient "(N−1)/(W/S)". Hence this operation computes the remainder when the integer part is divided by S. N is a variable showing the position of the bit unit block in an order in which bit unit blocks are written to the register 132.

W−1 is the interval with which the original bit sequence is interleaved, whilst S is the number of bits in one block. This being so, W/S=(17+1)/3=6. Accordingly, the ALU 135 alternately computes 0, 1, and 2 each time six bit unit blocks are written to the register 132.

In more detail, the ALU 135 computes 0 when the first to sixth bit unit blocks are written to the register 132, 1 when the seventh to twelfth bit unit blocks are written to the register 132, and 2 when the thirteenth to eighteenth bit unit blocks are written to the register 132. The ALU 135 computes 0 again when the nineteenth to twenty-fourth bit unit blocks are written to the register 132.

After the computation, the ALU 135 performs shifting in accordance with an order indicated by the controlling unit 136.

Here, the indicated order is an order in which three operations 1, 2, and 3 defined below should be executed.

Operation 1 is to left shift the bit unit block stored in the register 133 by 4 and then right shift it by 8. This produces a bit unit of the higher 4 bits of the bit unit block.

Operation 2 is to left shift the bit unit block stored in the register 133 by 8 and then right shift it by 12. This produces a bit unit of the middle 4 bits of the bit unit block.

Operation 3 is to left shift the bit unit block stored in the register 133 by 12 and then right shift it by 12. This produces a bit unit of the lower 4 bits of the bit unit block.

The ALU 135 performs these three operations 1, 2, and 3 in an order indicated by the controlling unit 136.

In more detail, the ALU 135 performs operations 1, 2, and 3 in this order when Z=0. The ALU 135 performs operations 2, 3, and 1 in this order when Z=1. The ALU 135 performs operations 3, 1, and 2 in this order when Z=2. In this way, the three bit units contained in the bit unit block are output in the order of bits in the original bit sequence.

Figure 74:
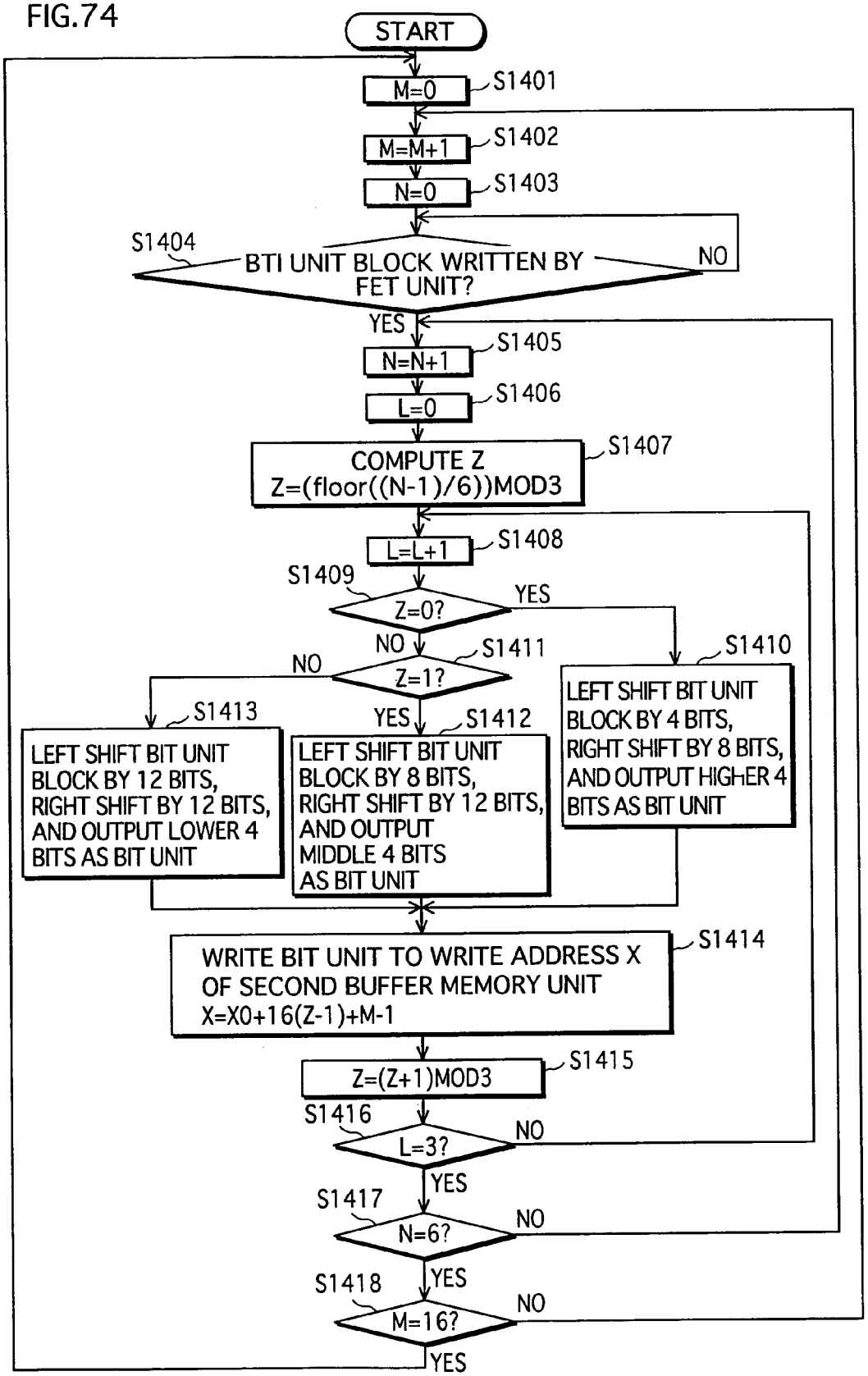
FIG. 74 is a flowchart showing a procedure performed by the demapping unit to output and write bit units.

FIG. 74 is a flowchart showing a control procedure of outputting and writing bit units by the controlling unit 136.

The controlling unit 136 initializes variable M (S1401), and increments variable M by 1 (S1402). The controlling unit 136 also initializes variable N (S1403). When the FFT unit 104 writes a bit unit block to the register 132 (S1404: YES), the controlling unit 136 shifts the bit unit block to store it to the register 133. The controlling unit 136 then increments variable N by 1 (S1405), and initializes variable L (S1406). The controlling unit 136 instructs the ALU 135 to compute the equation shown in step S1407 in FIG. 74, to find Z (S1407). The controlling unit 136 increments variable L by 1 (S1408), and judges whether Z=0 (S1409).

If Z=0 (S1409:YES), the controlling unit 136 instructs the ALU 135 to execute operation 1 on the bit unit block stored in the register 133 (S1410).

If Z=1 (S1409:NO, S1411:YES), the controlling unit 136 instructs the ALU 135 to execute operation 2 on the bit unit block stored in the register 133 (S1412).

If Z=2 (S1409:NO, S1411:NO), the controlling unit 136 instructs the ALU 135 to execute operation 3 on the bit unit block stored in the register 133 (S1413).

The bit unit produced by the operation performed by the ALU 135 is output to the register 134. The controlling unit 136 then instructs the ALU 135 to compute address X for writing the bit unit to the second buffer memory unit 107, according to a preprogrammed equation "X=X0+16(Z−1)+M−1". The controlling unit 136 then writes the bit unit of 4 bits to a 1-byte storage unit of the second buffer memory unit 107 specified by address X (S1414).

Following this, the controlling unit 136 instructs the ALU 135 to compute a preprogrammed equation "Z=(Z+1) MOD 3" (S1415). After having the ALU 135 output Z to the register 134, the controlling unit 136 judges whether L=3 (S1416).

If L≠3 (S1416:NO), the controlling unit 136 repeats steps S1408 to S1416. If L=3 (S1416:YES), the controlling unit 136 judges whether N=6 (S1417).

If N≠6 (S1417:NO), the controlling unit 136 repeats steps S1405 to S1417. If N=6 (S1417:YES), the controlling unit 136 judges whether M=16 (S1418).

If M≠16 (S1418: NO), the controlling unit 136 repeats steps S1402 to S1418. If M=16 (S1418:YES), the controlling unit 136 returns to step S1401.

According to this embodiment, it is possible to reorder the bits in each block of a received bit sequence to their original order, without using a memory for storing an address which shows the original position of each bit. This contributes to lower power consumption and smaller hardware scale.

Note that the computation of Z is not limited to the equation used in this embodiment, so long as S different values of Z corresponding to the number of bits in one block can be cyclically generated.

This embodiment describes the case where the demapping unit 206 includes the three registers 132 to 134, but the demapping unit 206 may include only the register 132. In this case, the controlling unit 136 instructs the ALU 135 to perform an operation on the bit unit block stored in the register 132 depending on Z, and directly writes the lower 4 bits of the operation result to the storage unit of the second buffer memory unit 107 specified by address X.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. A data processor comprising:
n processing elements which respectively include n register files and n operation units, n being an integer no less than 2, the n register files storing a data matrix having x rows and y columns, x and y being integers that satisfy $1 \leq x \leq n$ and $1 \leq y \leq n$;
a block decoder operable to decode a command and output a read instruction and a write instruction to the register file in each processing element; and
a network unit including a first selector and a second selector which are each operable to simultaneously perform n transfers, each of the n transfers being a transfer of data from a register file in one processing element to an operation unit in another processing element,
wherein when the read instruction is output from the block decoder, the register file in each processing element reads two pieces of data belonging to a same column in the data matrix and outputs the two pieces of data respectively to the first selector and the second selector,
the first selector and the second selector each simultaneously perform the n transfers, to change a horizontal position of a piece of data output from the register file in each processing element,
the operation unit in each processing element receives a piece of data output from the first selector and a piece of data output from the second selector, and
when the write instruction is output from the block decoder, the register file in each processing element writes two pieces of data output from the operation unit in the same processing element into any two of a plurality of registers included in the register file.

2. The data processor of claim 1,
wherein the operation unit in each processing element includes: a digital differential analyzer, and
an operation result of the digital differential analyzer designates a processing element from whose register file each of the first selector and the second selector should transfer data to the operation unit.

3. The data processor of claim 2,
wherein if the operation result of the digital differential analyzer is t+β where t is an integer and β is a proper fraction, the first selector and the second selector transfer data from a register file in a t-th processing element to the operation unit and transfer data from a register file in a (t+1)-th processing element to the operation unit, and
the operation unit further includes:
a multiplier operable to multiply the data transferred from the register file in the t-th processing element by β, and multiply the data transferred from the register file in the (t−1)-th processing element by 1−β.

4. The data processor of claim 1,
wherein the register file in each processing element stores data made up of a higher half word and a lower half word,
the operation unit in each processing element performs an operation using a higher half word or a lower half word as an operand, and
the data processor further comprises:
a converting unit connected with the first selector and the second selector, and operable to interchange a higher half word and a lower half word.

5. The data processor of claim 1, wherein each processing element includes:
an adder operable to add an offset to a register number that is a result of decoding by the block decoder, and
the register file in each processing element reads data from a register designated by a sum of the register number and the offset.

6. The data processor of claim 1 further comprising:
a branch decoder operable to decode a branch instruction in a different cycle from the block decoder.

7. The data processor of claim 1,
wherein the n processing elements transpose the data matrix in z cycles, z being x, y, or a larger one of x and y, and
in a k-th cycle, (a) a register file in an i-th processing element reads data stored in a j-th register, (b) the first selector transfers the read data to an operation unit in j-th processing element, (c) the operation unit in the j-th processing element outputs the transferred data to a register file in the j-th processing element, and (d) the register file in the j-th processing element writes the output data in an i-th register, where i and k being integers that satisfy $1 \leq i \leq z$ and $1 \leq k \leq z$, and j being a remainder when i+k is divided by z, in the k-th cycle, (a) the register file in the j-th processing element reads data stored in the i-th register at the same time as the reading by the register file in the i-th processing element, (b) the second selector transfers the read data to an operation unit in the i-th processing element, (c) the operation unit in the i-th processing element outputs the transferred data to the register file in the i-th processing element, and (d) the register file in the i-th processing element writes the output data to the j-th register.

8. The data processor of claim 1 being connected to a memory device having p banks where p is an integer satisfying p<n, and further comprising:
an additional selector operable to simultaneously perform p transfers, each of the p transfers being a transfer of data from any of the p banks to a register file in any of p processing elements out of the n processing elements.

9. A data processor comprising:
n processing elements which respectively include n register files and n operation units, n being an integer no less than 2, the n register files each comprising n registers and storing a data matrix having x rows and columns, x and being integers that satisfy $1 \leq x \leq n$ and $1 \leq y \leq n$;
a block decoder operable to decode a command and output a read instruction and a write instruction to the register file in each processing element; and
a network unit including a first selector and a second selector which are each operable to simultaneously perform n transfers, each of the n transfers being a transfer of data from a register file in one processing element to an operation unit in another processing element,
wherein when the read instruction is output from the block decoder, the register file in each processing element reads two pieces of data belonging to a same column in the data matrix and outputs the two pieces of data respectively to the first selector and the second selector,
the first selector and the second selector each simultaneously perform the n transfers, the first selector and the second selector both have n inputs and n outputs such that any piece of data in one processing element may be transferred to any other processing element,
the operation unit in each processing element receives a piece of data output from the first selector and a piece of data output from the second selector, and
when the write instruction is output from the block decoder, the register file in each processing element writes two pieces of data output from the operation unit in the same processing element into any two of a plurality of registers included in the register file.

10. The data processor of claim 9,
wherein the operation unit in each processing element includes: a digital differential analyzer, and
an operation result of the digital differential analyzer designates a processing element from whose register file each of the first selector and the second selector should transfer data to the operation unit.

11. The data processor of claim 10,
wherein if the operation result of the digital differential analyzer is $t+\beta$ where t is an integer and $\beta$ is a proper fraction, the first selector and the second selector transfer data from a register file in a t-th processing element to the operation unit and transfer data from a register file in a (t+1)-th processing element to the operation unit, and the operation unit further includes:
a multiplier operable to multiply the data transferred from the register file in the t-th processing element by $\beta$, and multiply the data transferred from the register file in the (t+1)-th processing element by $1-\beta$.

12. The data processor of claim 9,
wherein the register file in each processing element stores data made up of a higher half word and a lower half word,
the operation unit in each processing element performs an operation using a higher half word or a lower half word as an operand, and
the data processor further comprises:
a converting unit connected with the first selector and the second selector, and operable to interchange a higher half word and a lower half word.

13. The data processor of claim 9, wherein each processing element includes:
an adder operable to add an offset to a register number that is a result of decoding by the block decoder, and
the register file in each processing element reads data from a register designated by a sum of the register number and the offset.

14. The data processor of claim 9 further comprising:
a branch decoder operable to decode a branch instruction in a different cycle from the block decoder.

15. The data processor of claim 9,
wherein the n processing elements transpose the data matrix in z cycles, z being x, y. or a larger one of x and y, and
in a k-th cycle, (a) a register file in an i-th processing element reads data stored in a j-th register, (b) the first selector transfers the read data to an operation unit in j-th processing element, (c) the operation unit in the j-th processing element outputs the transferred data to a register file in the j-th processing element, and (d) the register file in the j-th processing element writes the output data in an i-th register, where i and k being integers that satisfy $1 \leq i \leq z$ and $1 \leq k \leq z$, and j being a remainder when i+k is divided by z,
in the k-th cycle, (a) the register file in the j-th processing element reads data stored in the i-th register at the same time as the reading by the register file in the i-th processing element, (b) the second selector transfers the read data to an operation unit in the i-th processing element, (c) the operation unit in the i-th processing element outputs the transferred data to the register file in the i-th processing element, and (d) the register file in the i-th processing element writes the output data to the j-th register.

16. The data processor of claim 9 being connected to a memory device having p banks where p is an integer satisfying p<n, and further comprising:
an additional selector operable to simultaneously perform p transfers, each of the p transfers being a transfer of data from any of the p banks to a register file in any of p processing elements out of the n processing elements.

17. The data processor of claim 9 wherein n is an integer no less than 8 such that the n processing elements which respectively include n register files and operation units, store a data matrix having x rows and columns, x and being integers that satisfy $1 \leq x \leq n$ and $8 \leq y \leq n$.

* * * * *

UNITED STATES PATENT AND TRADEMARK OFFICE
CERTIFICATE OF CORRECTION

PATENT NO. : 7,315,934 B2  
APPLICATION NO. : 10/377328  
DATED : January 1, 2008  
INVENTOR(S) : Morishita et al.

It is certified that error appears in the above-identified patent and that said Letters Patent is hereby corrected as shown below:

In Claim 7, Column 38, line 56, "x, y. or" should be --x, y, or--  
In Claim 9, Column 39, line 22, "x rows and columns" should be --x rows and y columns--  
In Claim 9, Column 39, line 23, "x and being" should be --x and y being--  
In Claim 15, Column 40, line 31, "x, y. or" should be --x, y, or--  
In Claim 17, Column 40, line 64, "x and being" should be --x and y being--

Signed and Sealed this

Thirteenth Day of May, 2008

JON W. DUDAS  
*Director of the United States Patent and Trademark Office*